United States Patent
Ohta et al.

(10) Patent No.: US 10,419,909 B2
(45) Date of Patent: Sep. 17, 2019

(54) WIRELESS COMMUNICATION SYSTEM, METHOD FOR WIRELESS COMMUNICATION, AND WIRELESS STATION

(71) Applicant: FUJITSU CONNECTED TECHNOLOGIES LIMITED, Kawasaki-shi, Kanagawa (JP)

(72) Inventors: Yoshiaki Ohta, Yokohama (JP); Yoshihiro Kawasaki, Kawasaki (JP); Yoshinori Tanaka, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 381 days.

(21) Appl. No.: 15/013,467

(22) Filed: Feb. 2, 2016

(65) Prior Publication Data
US 2016/0150584 A1    May 26, 2016

Related U.S. Application Data

(63) Continuation of application No. PCT/JP2013/071501, filed on Aug. 8, 2013.

(51) Int. Cl.
*H04W 4/00* (2018.01)
*H04W 4/70* (2018.01)
(Continued)

(52) U.S. Cl.
CPC ......... *H04W 4/70* (2018.02); *H04W 52/0216* (2013.01); *H04W 76/14* (2018.02);
(Continued)

(58) Field of Classification Search
CPC ........ H04W 76/14; H04W 8/005; H04W 4/70
See application file for complete search history.

(56) References Cited

U.S. PATENT DOCUMENTS

| | | |
|---|---|---|
| 5,903,618 A | 5/1999 | Miyake et al. |
| 2009/0017797 A1 | 1/2009 | Li et al. |

(Continued)

FOREIGN PATENT DOCUMENTS

| | | |
|---|---|---|
| JP | 9-107583 A1 | 4/1997 |
| JP | 2009-523392 A | 6/2009 |

(Continued)

OTHER PUBLICATIONS

3GPP TS 36.211 V11.3.0, "3rd Generation Partnership Project; Technical Specification Group Radio Access Network; Evolved Universal Terrestrial Radio Access (E-UTRA); Physical Channels and Modulation (Release 11)", Jun. 2013.

(Continued)

*Primary Examiner* — Romani Ohri
(74) *Attorney, Agent, or Firm* — Myers Wolin, LLC

(57) ABSTRACT

A wireless communication system includes a plurality of wireless stations including a first wireless station, a second wireless station, and a third wireless station. The wireless communication system further includes a first controller that obtains a transmission timing at which the third wireless station transmits first notification information to the second wireless station, the first notification information indicating that the third wireless station is to communicate with the second wireless station; and a first communicator that transmits second notification information to the second wireless station at the obtained transmission timing, the second notification information indicating that the first wireless station is to directly communicate with the second wireless station.

9 Claims, 51 Drawing Sheets

(51) Int. Cl.
*H04W 52/02* (2009.01)
*H04W 76/14* (2018.01)
*H04W 92/18* (2009.01)

(52) U.S. Cl.
CPC ............ *H04W 92/18* (2013.01); *Y02D 70/00* (2018.01); *Y02D 70/1262* (2018.01); *Y02D 70/1264* (2018.01); *Y02D 70/146* (2018.01); *Y02D 70/21* (2018.01); *Y02D 70/24* (2018.01)

(56) References Cited

U.S. PATENT DOCUMENTS

| | | | |
|---|---|---|---|
| 2013/0003629 A1 | 1/2013 | Jeong et al. | |
| 2013/0012244 A1 | 1/2013 | Lee et al. | |
| 2014/0003373 A1* | 1/2014 | Hakola | H04W 48/16 370/329 |
| 2014/0120934 A1* | 5/2014 | Kishiyama | H04W 76/023 455/452.1 |
| 2014/0241262 A1* | 8/2014 | Novak | H04W 72/042 370/329 |
| 2015/0131556 A1* | 5/2015 | Kalhan | H04L 1/1607 370/329 |
| 2015/0131566 A1* | 5/2015 | Seo | H04B 1/3838 370/329 |
| 2015/0156692 A1* | 6/2015 | Kim | H04W 8/02 455/436 |
| 2015/0222401 A1* | 8/2015 | Xu | H04W 8/005 370/329 |
| 2015/0304969 A1* | 10/2015 | Morita | H04W 76/14 455/522 |
| 2015/0327046 A1* | 11/2015 | Lee | H04W 56/002 370/338 |
| 2015/0334756 A1* | 11/2015 | Lu | H04W 76/023 370/329 |
| 2015/0365994 A1* | 12/2015 | Yu | H04W 72/1268 370/336 |
| 2016/0150584 A1 | 5/2016 | Ohta et al. | |

FOREIGN PATENT DOCUMENTS

| | | |
|---|---|---|
| JP | 2010-93441 A | 4/2010 |
| JP | 2010-533434 A | 10/2010 |
| JP | 2010-533440 A1 | 10/2010 |
| JP | 2012-507975 A | 3/2012 |
| JP | 2013-34165 A | 2/2013 |
| WO | 2007/082281 A1 | 7/2007 |
| WO | 2009/009394 A1 | 1/2009 |
| WO | 2010/053688 A1 | 5/2010 |
| WO | 2011/135794 A1 | 11/2011 |
| WO | 2013/002206 A1 | 1/2013 |
| WO | 2015/019465 A1 | 2/2015 |

OTHER PUBLICATIONS

3GPP TS 36.212 V11.3.0, "3rd Generation Partnership Project; Technical Specification Group Radio Access Network; Evolved Universal Terrestrial Radio Access (E-UTRA); Multiplexing and channel coding (Release 11)", Jun. 2013.

3GPP TS 36.213 V11.3.0, 3rd Generation Partnership Project; Technical Specification Group Radio Access Network; Evolved Universal Terrestrial Radio Access (E-UTRA); Physical layer procedures (Release 11), Jun. 2013.

3GPP TS 36.214 V11.1.0 "3rd Generation Partnership Project; Technical Specification Group Radio Access Network; Evolved Universal Terrestrial Radio Access (E-UTRA); Physical layer; Measurements (Release 11)", Dec. 2012.

3GPP TS 36.300 V11.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Sep. 2012.

3GPP TS 36.321 V11.3.0, "3rd Generation Partnership Project; Technical Specification Group Radio Access Network; Evolved Universal Terrestrial Radio Access (E-UTRA); Medium Access Control (MAC) protocol specification (Release 11)", Jun. 2013.

3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.

3GPP TS 36.323 V11.3.0, "3rd Generation Partnership Project; Technical Specification Group Radio Access Network; Evolved Universal Terrestrial Radio Access (E-UTRA); Packet Data Convergence Protocol (PDCP) specification (Release 11)", Jun. 2014.

3GPP TS 36.331 V11.3.0, "3rd Generation Partnership Project; Technical Specification Group Radio Access Network; Evolved Universal Terrestrial Radio Access (E-UTRA); Radio Resource Control (RRC); Protocol specification (Release 11)", Mar. 2013.

3GPP TS 36.304 V11.4.0, "3rd Generation Partnership Project; Technical Specification Group Radio Access Network; Evolved Universal Terrestrial Radio Access (E-UTRA); User Equipment (UE) procedures in idle mode (Release 11)", Jun. 2013.

3GPP TS 23.122 V11.4.0, "3rd Generation Partnership Project; Technical Specification Group Core Network and Terminals; Non-Access-Stratum (NAS) functions related to Mobile Station (MS) in idle mode (Release 11)", Dec. 2012.

International Search Report issued for corresponding International Patent Application No. PCT/JP2013/071501, dated Sep. 10, 2013.

Extended European search report with supplementary European search report and the European search opinion issued by the European Patent Office for corresponding European Patent Application No. 13891028.6, dated Dec. 14, 2016.

Extended European search report with supplementary European search report and the European search opinion issued by the European Patent Office for corresponding European Patent Application No. 17202391.3, dated Mar. 6, 2018.

Notification of Reasons for Refusal issued by the Japan Patent Office for corresponding Japanese Patent Application No. 2017-103200, dated May 22, 2018, with an English translation.

* cited by examiner

FIG. 36

```
-- ASN1START
...
Paging-vXXXX-IEs ::=        SEQUENCE {
    d2d-Indication -r11     ENUMERATED {true}    OPTIONAL,  -- Need ON
    nonCriticalExtension    SEQUENCE {}          OPTIONAL-- Need OP
}
...
-- ASN1STOP
```

WIRELESS COMMUNICATION SYSTEM, METHOD FOR WIRELESS COMMUNICATION, AND WIRELESS STATION

CROSS-REFERENCE TO RELATED APPLICATION

This application is a continuation application of International Application PCT/JP2013/071501, filed on Aug. 8, 2013 and designated the U.S., the entire contents of which are incorporated herein by reference.

FIELD

The embodiments discussed herein are related to a wireless communication system, a method for wireless communication, and a wireless station.

BACKGROUND

A wireless communication system including multiple wireless stations has been known. One of the wireless communication systems of this type is configured such that a first wireless station communicates with a second wireless station via a third wireless station and also the first wireless station directly communicates with the second wireless station (see, for example, Patent Literature 1). For example, the first wireless station is a first mobile station; the second wireless station is a second mobile station; and the third wireless station is a base station.

Furthermore, such a communication system prepares a peer finding frame and a paging frame subsequent to the peer finding frame in a wireless resource. In a wireless communication system, on the basis of a peer finding signal transmitted through the peer finding frame, the first mobile station recognizes the presence of the second mobile station; and then the first mobile station transmits notification information (e.g., paging signal) through the subsequent paging frame to the second mobile station. This establishes direct communication between the first mobile station and the second mobile station.

PRIOR ART REFERENCES

Patent Literature

[Patent Literature 1] Japanese National Publication No. 2012-507975

Non-Patent Literature

[Non-Patent Literature 1] TS36.211, "Physical Channels and Modulation," V11.3.0, June, 2013
[Non-Patent Literature 2] TS36.212, "Multiplexing and channel coding," V11.3.0, June, 2013
[Non-Patent Literature 3] TS36.213, "Physical layer procedures," V11.3.0, June, 2013
[Non-Patent Literature 4] TS36.214, "Measurements," V11.1.0, December, 2012
[Non-Patent Literature 5] TS36.300, "Overall description," V11.3.0, June, 2013
[Non-Patent Literature 6] TS36.321, "Media Access Control (MAC) protocol specification," V11.3.0, June, 2013
[Non-Patent Literature 7] TS36.322, "Radio Link Control (RLC) protocol specification," V11.0.0, September, 2012
[Non-Patent Literature 8] TS36.323, "Packet Data Convergence Protocol (PDCP) specification," V11.3.0, June, 2013
[Non-Patent Literature 9] TS36.331, "Radio Resource Control (RRC) protocol specification," V11.3.0, June, 2013
[Non-Patent Literature 10] TS36.304, "User Equipment (UE) procedures in idle mode", V11.4.0, June, 2013
[Non-Patent Literature 11] TS23.122, "Non-Access-Stratum (NAS) functions related to Mobile Station (MS) in idle mode," V11.4.0, December, 2012

SUMMARY

A wireless communication system is frequently configured such that the base station transmits notification information (second notification information) representing execution (i.e., preparation) of direct communication and also transmits notification information (first notification information) representing execution (i.e., preparation) of communication except for the direct communication to a mobile station.

For example, the first notification information represents an event (intention) that another mobile station is to communicate with a second mobile station via the base station. An example of the first notification information is a paging signal with which the other mobile station pages the second mobile station via the base station. As another example, the first notification information represents an event that the base station transmits common information to multiple mobile stations using common wireless resource.

A wireless communication system may set a timing (first transmission timing) of transmitting first notification information and a timing (second transmission timing) of transmitting second notification information independently of each other. In this setting, the mobile station should be on standby in a state of being ready for receiving notification information at both the first and the second transmission timings. Consequently, this prolongs the standby time during which the mobile station is on standby in a state of being ready for receiving notification information and may excessively increase the electric power that the mobile station consumes to keep the mobile station in this state.

According to an aspect of the embodiments, there is provided a wireless communication system including a plurality of wireless stations including a first wireless station, a second wireless station, and a third wireless station. The wireless station system further includes: a first controller that obtains a transmission timing at which the third wireless station transmits first notification information to the second wireless station, the first notification information indicating that the third wireless station is to communicate with the second wireless station; and a first communicator that transmits second notification information to the second wireless station at the obtained transmission timing, the second notification information indicating that the first wireless station is to directly communicate with the second wireless station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 36 is a diagram schematically illustrating the format of a paging signal of an example of the fifth embodiment;

DESCRIPTION OF EMBODIMENTS

Description will now be made in relation to a wireless communication system, a method of wireless communication, and a wireless station according to the respective embodiments of the present invention that are intended to deal with at least one of the above problems with reference to accompanying drawings FIGS. 1-51.

First Embodiment

Figure 1:
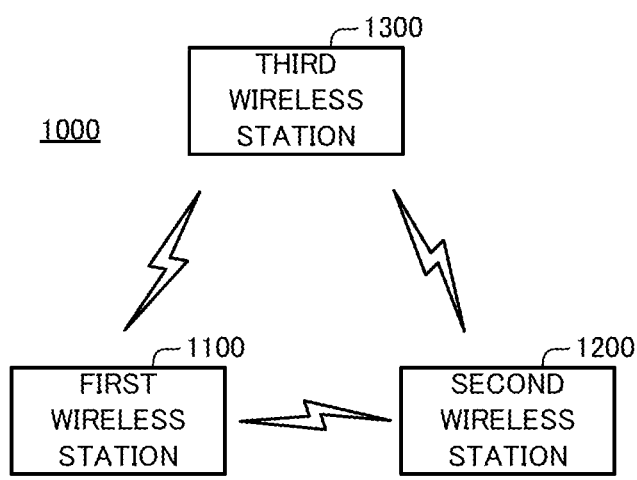
FIG. 1 is a diagram illustrating the configuration of a wireless communication system according to an example of a first embodiment.

As illustrated in FIG. 1, a wireless communication system 1000 of the first embodiment includes a first wireless station 1100, a second wireless station 1200, and a third wireless station 1300.

Examples of the first wireless station 1100 and the second wireless station 1200 are terminals. The first wireless station 1100 and the second wireless station 1200 may be mobile stations and each may be referred to as a wireless terminal or a user terminal. An example of the third wireless station 1300 is a base station and may be referred to as a wireless device.

Figure 2:
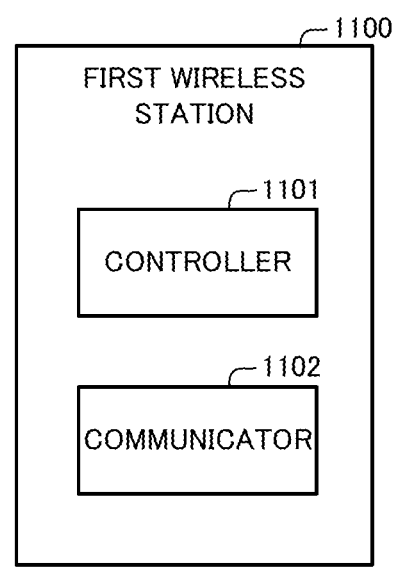
FIG. 2 is a diagram illustrating the configuration of a first wireless station of an example of the first embodiment.

As illustrated in FIG. 2, the first wireless station 1100 includes a controller (first controller) 1101 and a communicator (first communicator) 1102. The controller 1101 controls the first wireless station 1100. The communicator 1102 carries out wireless communication with the other wireless stations 1200 and 1300.

Figure 3:
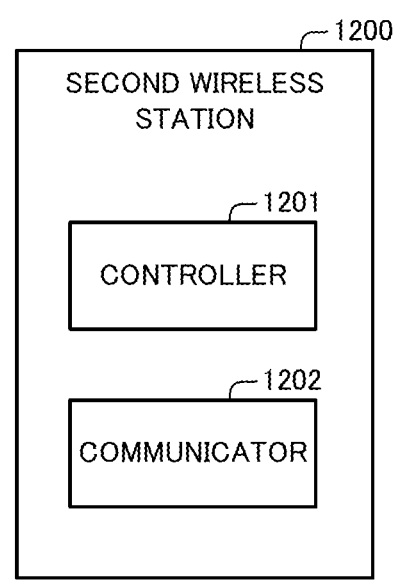
FIG. 3 is a diagram illustrating the configuration of a second wireless station of an example of the first embodiment.

As illustrated in FIG. 3, the second wireless station 1200 includes a controller 1201 and a communicator 1202. The controller 1201 controls the second wireless station 1200. The communicator 1202 carries out wireless communication with the other wireless stations 1100 and 1300.

Figure 4:
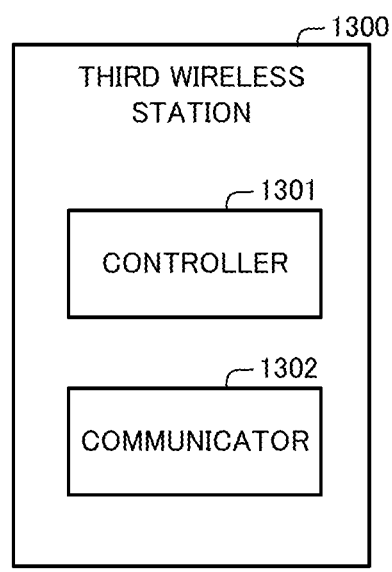
FIG. 4 is a diagram illustrating the configuration of a third wireless station of an example of the first embodiment.

As illustrated in FIG. 4, the third wireless station 1300 includes a controller (second controller) 1301 and a communicator (second controller) 1302. The controller 1301 controls the third wireless station 1300. The communicator 1302 conducts wireless communication with the other wireless stations 1100 and 1200.

Figure 5:
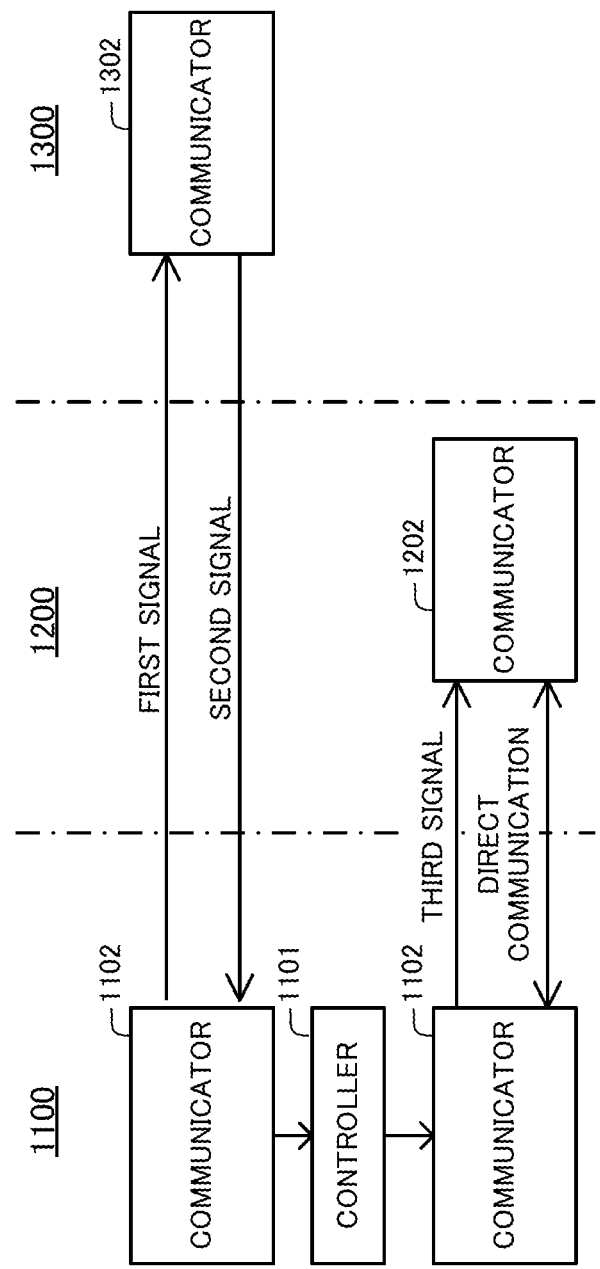
FIG. 5 is a diagram schematically illustrating a first function of a wireless communication system of an example of the first embodiment.

Next, description will now be made in relation to a first operation of the wireless communication system 1000 with reference to FIGS. 5 and 6 for understanding a first function of the wireless communication system 1000.

Figure 6:
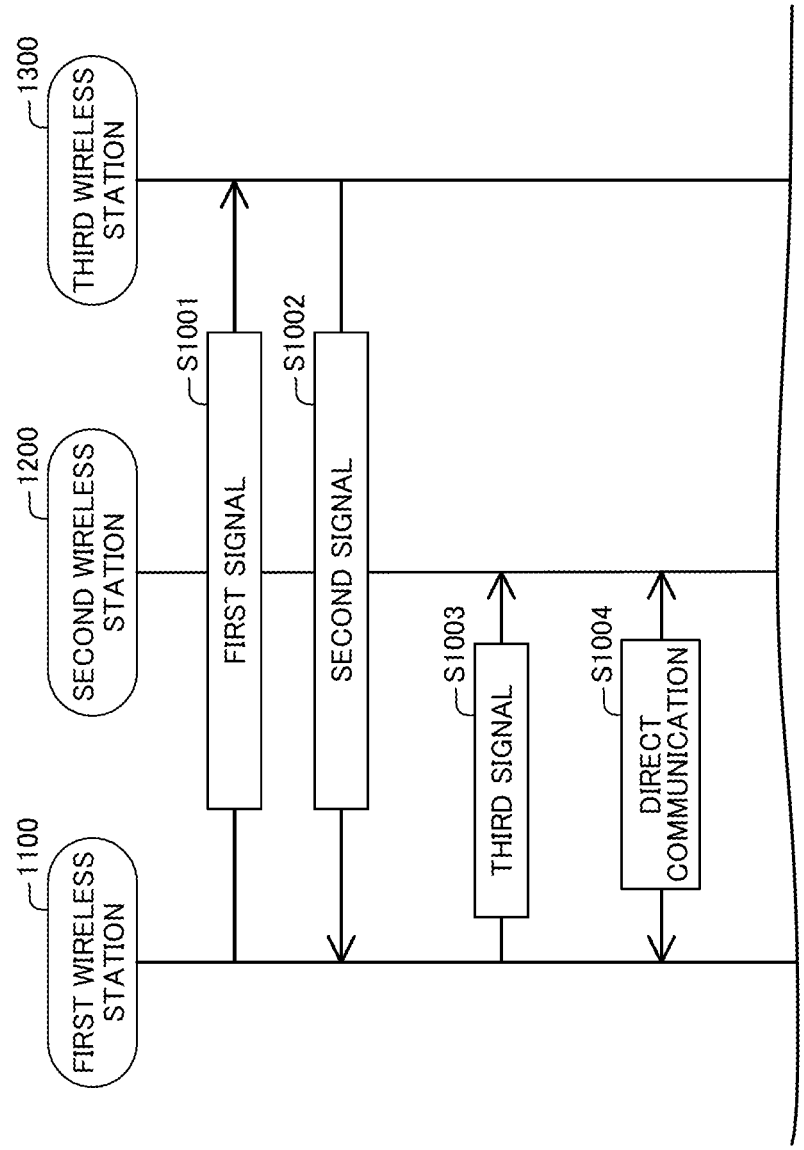
FIG. 6 is a sequence diagram illustrating a first operation of a wireless communication system of an example of the first embodiment.

At the beginning, the communicator 1102 of the first wireless station 1100 transmits a first signal to the third wireless station 1300 (step S1001 of FIG. 6). The first signal requests direct communication between the first wireless station 1100 and the second wireless station 1200. The first signal may be referred to as a first communication request information. The first signal of this embodiment includes wireless station identifying information to identify the second wireless station 1200. The wireless station identifying information of this embodiment identifies (specifies) the corresponding wireless station in a first wireless station group consisting of the first wireless station 1100 and the second wireless station 1200.

Upon receipt of the first signal, the communicator 1302 of the third wireless station 1300 transmits a second signal to the first wireless station, which is the sender of the first signal (step S1002 of FIG. 6). The second signal indicates that the third wireless station 1300 allows the direct communication. The second signal may be referred to as first communication response information, information related to direct communication, or D2D reception information.

Consequently, the communicator 1102 of the first wireless station 1100 receives the second signal. After that, the controller 1101 of the first wireless station 1100 obtains the transmission timing, at which a fourth signal (not illustrated) is transmitted to the second wireless station 1200. The fourth signal indicates that the third wireless station 1300 is to communicate with the second wireless station 1200. Alternatively, the fourth signal may indicate that the third wireless station 1300 is ready to communicate with the second wireless station 1200. The fourth signal may be referred to as first notification information.

Then the communicator 1102 of the first wireless station 1100 transmits a third signal to the second wireless station 1200 at the obtained transmission timing (step S1003 of FIG. 6). The third signal indicates that the first wireless station 1100 is to directly communicate with the second wireless station 1200. Alternatively, the third signal may indicate that the first wireless station 1100 is ready to directly communicate with the second wireless station 1200. The third signal may alternatively be referred to as second notification information.

Consequently, the communicator 1202 of the second wireless station 1200 receives the third signal, and the communicator 1102 of the first wireless station 1100 and the communicator 1202 of the second wireless station 1200 execute direct communication therebetween (step S1004 of FIG. 6).

Figure 7:
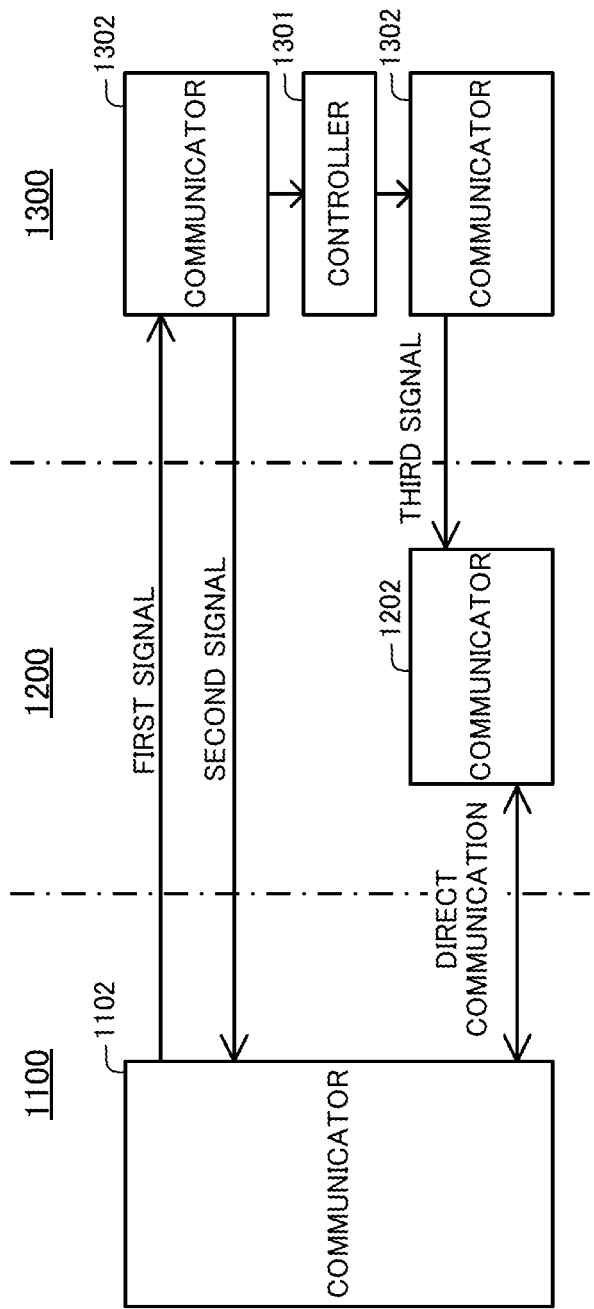
FIG. 7 is a diagram schematically illustrating a second function of a wireless communication system of an example of the first embodiment.

Next, description will now be made in relation to a second operation of the wireless communication system 1000 with reference to FIGS. 7 and 8 for understanding a second function of the wireless communication system 1000. The wireless communication system 1000 may have either the first function or the second function or may have both the first function and the second function.

Hereinafter, the second operation of the wireless communication system 1000 will now be described, focusing on the difference from the first operation.

Figure 8:
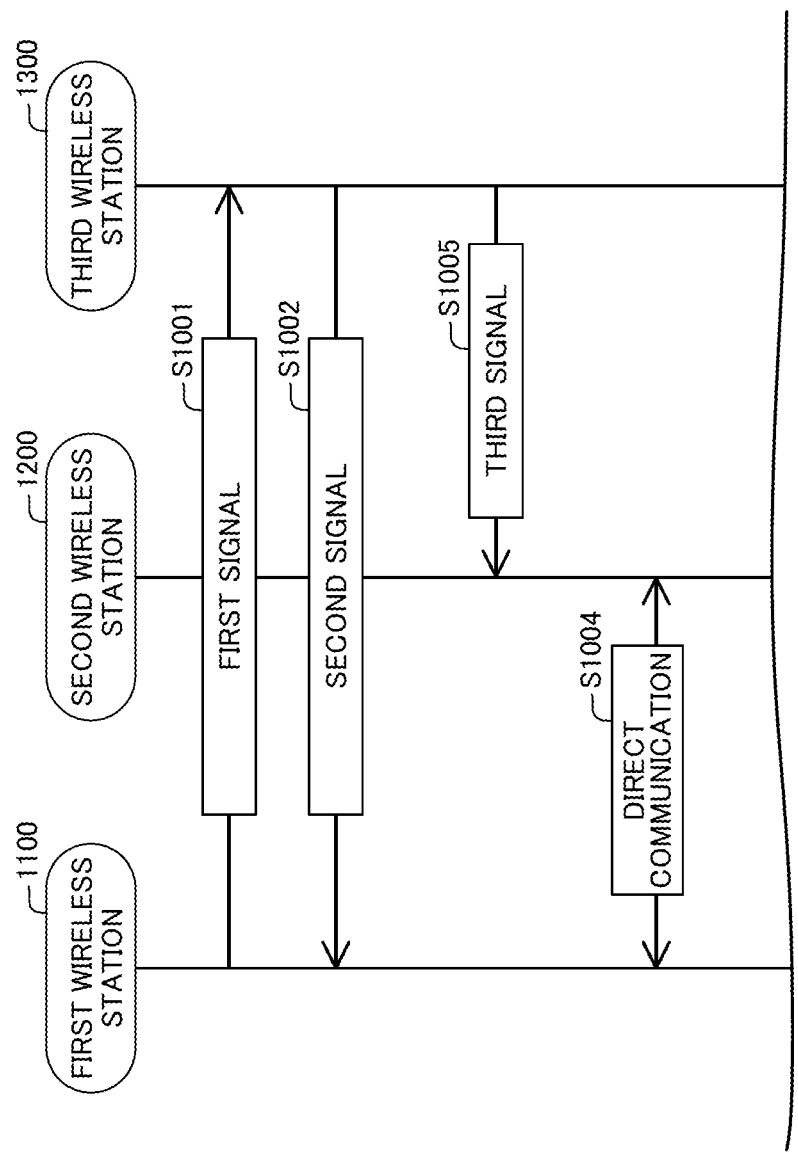
FIG. 8 is a sequence diagram illustrating a second operation of a wireless communication system of an example of the first embodiment.

Upon receipt of the first signal, the communicator 1302 of the third wireless station 1300 transmits the second signal to the first wireless station, which is the sender of the first signal (step S1002 of FIG. 8). Consequently, the communicator 1102 of the first wireless station 1100 receives the second signal.

The controller 1301 of the third wireless station 1300 obtains the transmission timing. Then, the communicator 1302 of the third wireless station 1300 transmits the third signal to the second wireless station 1200 at the obtained transmission timing (step S1005 of FIG. 8).

The communicator 1202 of the second wireless station 1200 receives the third signal, which causes the communicator 1102 of the first wireless station 1100 and the communicator 1202 of the second wireless station 1200 to execute direct communication therebetween (step S1004 of FIG. 8).

As explained above, the wireless communication system 1000 according to the first embodiment obtains the transmission timing, at which the third wireless station 1300 transmits the fourth signal to the second wireless station 1200. In addition, the first wireless station 1100 transmits the third signal to the second wireless station 1200 at the obtained transmission timing.

Thereby, the third signal is transmitted at the transmission timing at which the fourth signal is transmitted. This causes the second wireless station 1200 to consume less power than cases where the third signal is transmitted at a timing different from the transmission timing of the fourth signal. Otherwise, the wireless communication system 1000 can effectively start the direct communication.

Second Embodiment

The second embodiment may be regarded as a materialized example of the first embodiment. The feature of the communication scheme of the first embodiment can be used in combination with the method to be disclosed in the second embodiment. The feature of the device disclosed in the first embodiment is allowed to be incorporated in the device to be disclosed in the second embodiment.

Figure 9:
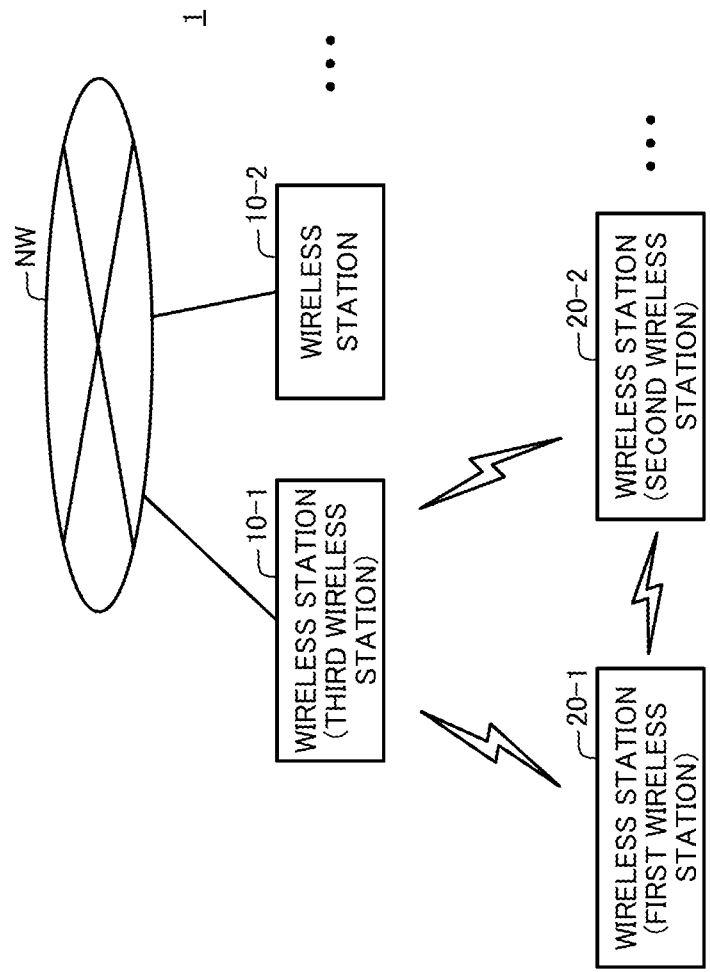
FIG. 9 is a diagram illustrating the configuration of a wireless communication system according to an example of a second embodiment.

As illustrated in FIG. 9, a wireless communication system 1 of the second embodiment includes multiple wireless stations 10-1, 10-2, . . . , 20-1, and 20-2, . . . .

Hereinafter, the wireless stations 10-*i* (where, i is a natural number) may sometimes be referred to simply as the wireless station 10 if not needing to be discriminated from one another. Similarly, the wireless stations 20-*j* (where, j is a natural number) may sometimes be referred to simply as the wireless station 20 if not needing to be discriminated from one another.

In the second embodiment, the wireless station 20-1 is an example of a first wireless station; the wireless station 20-2 is an example of a second wireless station; and the wireless station 10-1 is an example of a third wireless station. The wireless communication system 1 may include a single wireless station 10.

The wireless stations 10-1, 10-2, . . . are communicably connected to one another via a communication network NW.

Each wireless station 10 may include at least one cell. Each wireless station 10 is configured to be wirelessly communicable with a wireless station 20 positioned in the cell that the subject wireless station 10 has (provides). An example of each wireless station 10 is a base station. Each wireless station 10 may alternatively referred to as a wireless device.

Each wireless station 20 is configured to be wirelessly communicable with a wireless station 10 that has the cell where the subject wireless station 20 is located. Each wireless station 20 is configured to be wirelessly and directly communicable with another wireless station 20. An example of each wireless station 20 is a terminal. Each wireless station 20 may be a mobile station. Each wireless station 20 may be referred to as a wireless terminal or a user terminal. A terminal here is a device such as a mobile telephone, a smartphone, a sensor, or a meter (measuring device). The terminal may be carried by the user or may be carried by or installed in a mobile article such as a vehicle.

Figure 10:
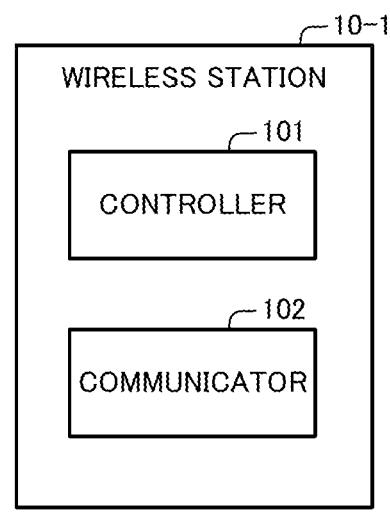
FIG. 10 is a diagram illustrating the configuration of a third wireless station of an example of the second embodiment.

As illustrated in FIG. 10, the wireless station 10-1 includes a controller (second controller) 101 and a communicator (second communicator) 102. The controller 101 controls the wireless station 10-1, and the communicator 102 wirelessly communicates with the wireless stations 20-1, 20-2, . . . .

The remaining wireless stations 10 (i.e., wireless stations 10-2, . . . ) except for the wireless station 10-1 have the same function as that of the wireless station 10-1.

Figure 11:
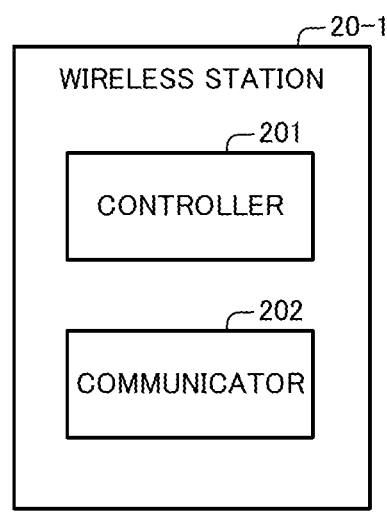
FIG. 11 is a diagram illustrating the configuration of a first wireless station of an example of the second embodiment.

As illustrated in FIG. 11, the wireless station 20-1 includes a controller (first controller) 201 and a communicator (first communicator) 202. The controller 201 controls the local wireless station 20-1. The communicator 202 wirelessly communicates with wireless terminals (wireless terminals 10-1, 10-2, . . . , 20-2, . . . ) except for the local wireless station 20-1.

The wireless stations 20 (wireless stations 20-2, . . . ) except for the wireless station 20-1 has the same function as the wireless station 20-1.

Figure 12:
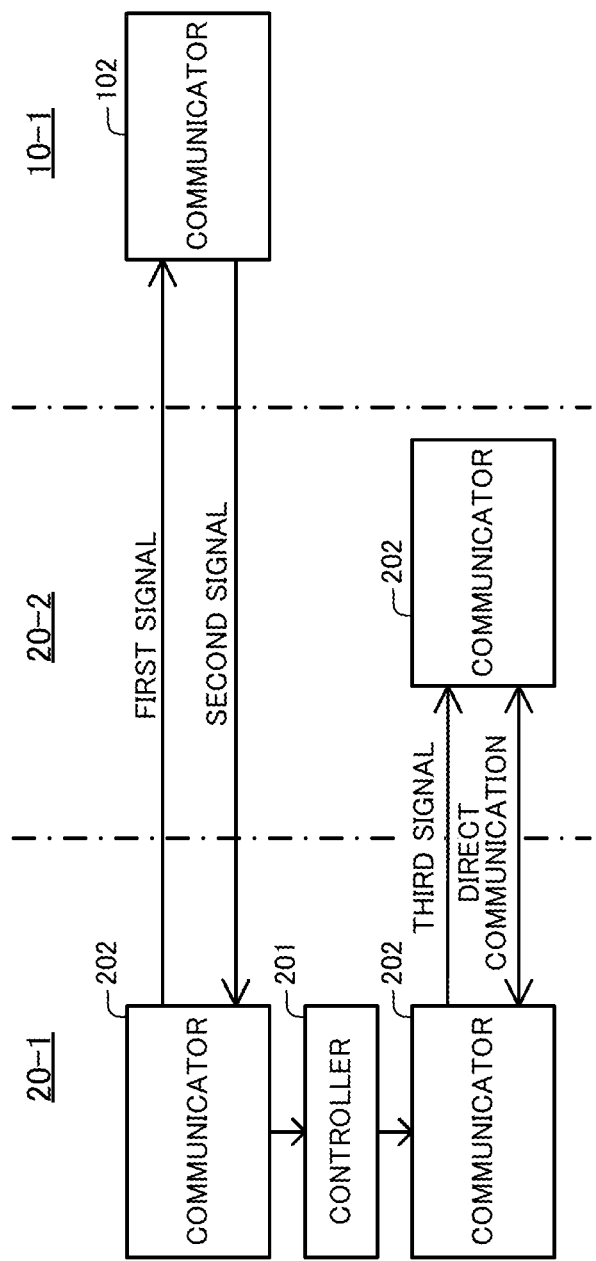
FIG. 12 is a diagram schematically illustrating a function of a wireless communication system of an example of the second embodiment.

Hereinafter, description will now be made in relation to an operation of the wireless communication system 1 with reference to FIGS. 12 and 13 for understanding a first function of the wireless communication system 1.

The second embodiment assumes that both the wireless stations 20-1 and 20-2 are communicably connected to the wireless station 10-1.

Figure 13:
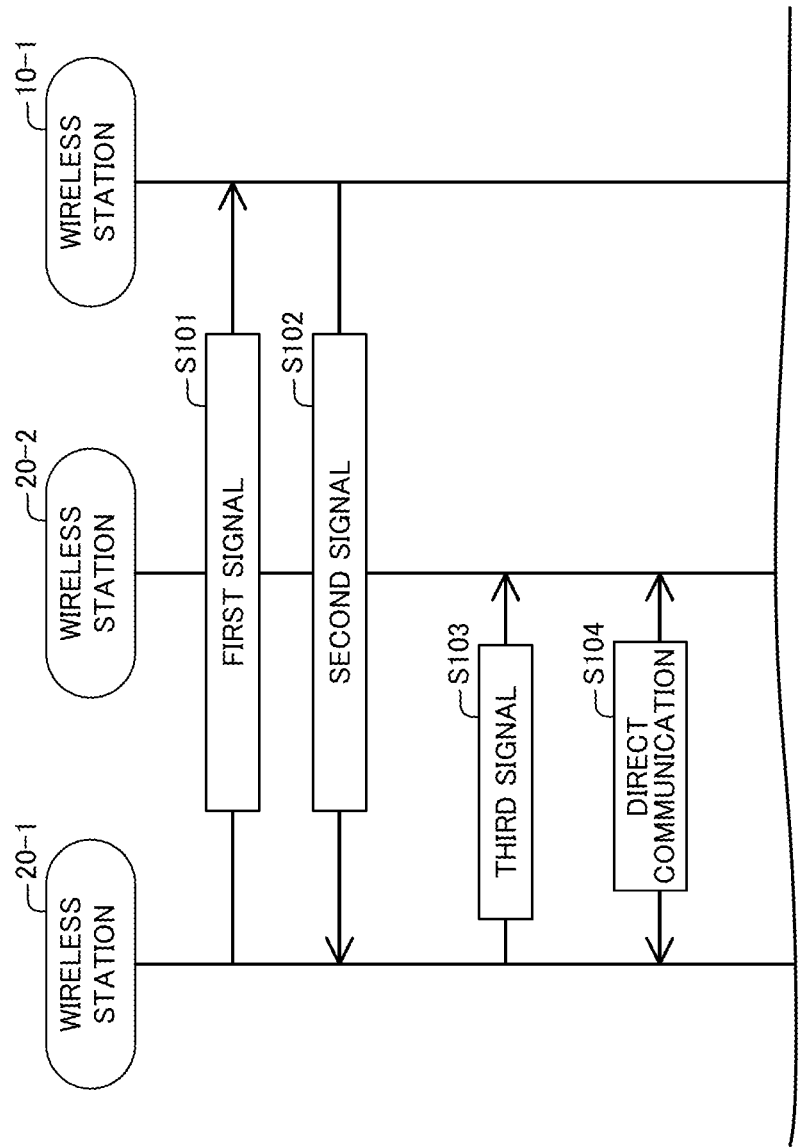
FIG. 13 is a sequence diagram illustrating an operation of a wireless communication system of an example of the second embodiment.

At the beginning, the communicator 202 of the wireless station 20-1 transmits a first signal to the wireless station 10-1 (step S101 of FIG. 13). The first signal requests direct communication between the wireless station 20-1 and the wireless station 20-2. The direct communication here may be regarded as direct communication between wireless stations 20 both belonging to a first wireless station group consisting of the wireless stations 20-1, 20-2, In this embodiment, the first signal may be referred to as first communication request information. The first signal of this example includes wireless station identifying information to identify the wireless station 20-2. The wireless station identifying information of this embodiment identifies (specifies) the corresponding wireless station in the first wireless station group.

Upon receipt of the first signal, the communicator 102 of the wireless station 10-1 transmits a second signal to the wireless station 20-1, which is the sender of the first signal (step S102 of FIG. 13). The second signal indicates that the wireless station 10-1 permits the direct communication. The second signal may be referred to as first communication response information, information related to direct communication, or D2D reception information.

Consequently, the wireless station 20-1 receives the second signal. After that, the controller 201 of the wireless station 20-1 obtains the transmission timing, at which the wireless station 10-1 transmits a fourth signal to the wireless station 20-2. The fourth signal indicates that the wireless station 10-1 is to communicate with the wireless station 20-2. Alternatively, the fourth signal may indicate the wireless station 10-1 is ready to communicate with the wireless station 20-2. The fourth signal may be referred to as first notification information.

For example, in cases where the entire fundamental information is notified by the wireless station 10-1, the wireless station 20-1 may obtain the transmission timing on the basis of the notified fundamental information and the wireless station identifying information that identifies the wireless station 20-2. The fundamental information is the basis of determining the transmission timing. The fundamental information may be transmitted to each individual terminal from a certain network node or from a wireless station 10 (e.g., the wireless station 10-1).

In cases where part of the fundamental information is not notified, the wireless station 10-1 may transmit the unnotified part of the fundamental information to the wireless station 20-1 by putting the unnotified part into the second signal. In this case, the wireless station 20-1 obtains the transmission timing on the basis of the received part of the fundamental information, the notified part (the remaining part) of the fundamental information, and the wireless station identifying information that identifies the wireless station 20-2.

Alternatively, the wireless station 10-1 may transmit transmission timing information representing the transmission timing to the wireless station 20-1 by putting the transmission timing information into the second signal. In this case, the wireless station 20-1 obtains the transmission timing represented by in the received transmission timing information.

Next, the communicator 202 of the wireless station 20-1 transmits the third signal to the wireless station 20-2 at the obtained transmission timing (step S103 of FIG. 13). The third signal indicates that the wireless station 20-1 is to directly communicate with the wireless station 20-2. Alternatively, the third signal may indicate that the wireless station 20-1 is ready to directly communicate with the wireless station 20-2. The third signal may be referred to as second notification information.

Thereby, the wireless station 20-2 receives the third signal, which causes the communicator 202 of the wireless station 20-1 and the communicator 202 of the wireless station 20-2 to execute wireless communication therebetween (step S104 of FIG. 13).

As explained above, in the wireless communication system 1 according to the second embodiment, the wireless station 20-1 obtains the transmission timing, at which the wireless station 10-1 transmits a fourth signal to the wireless station 20-2. In addition, the wireless station 20-1 transmits the third signal to the wireless station 20-2 at the obtained transmission timing.

Thereby, the third signal is transmitted at the transmission timing at which the fourth signal is transmitted. This causes the wireless station 20-2 to consume less power than cases where the third signal is transmitted at a timing different from the transmission timing of the fourth signal.

If receiving the third signal, the communicator 202 of the wireless station 20-2 may transmit a fifth signal to the wireless station 20-1. The fifth signal requests the start of the direct communication. The fifth signal may be referred to as second notification response information. In this case, if receiving the fifth signal, the communicator 202 of the wireless station 20-1 executes the direct communication.

Alternatively, the wireless communication system 1 of the second embodiment may have a configuration that the wireless station 10-1, in place of the wireless station 20-1, transmits the third signal to the wireless station 20-2.

Third Embodiment

The third embodiment may be regarded as a materialized example of the first or the second embodiment. The feature of the communication scheme of the first or the second embodiment can be used in combination with the method to be disclosed in the third embodiment. The feature of the device disclosed in the first or the second embodiment is allowed to be incorporated in the device to be disclosed in the third embodiment.

(Overview)

A wireless communication system according to the third embodiment includes multiple wireless stations. The first wireless station obtains a transmission timing, at which a third wireless station transmits, to the second wireless station, first notification information that indicates that the third wireless station is to communicate with the second wireless station. Furthermore, the first wireless station transmits, to the second wireless station at the obtained timing, second notification information that indicates that the first wireless station is to execute the direct communication with the second wireless station.

The second wireless station receives the first notification information or the second notification information at the transmission timing. If receiving the first notification information from the third wireless station, the second wireless station communicates with the third wireless station. Besides, if receiving the second notification information from the first wireless station, the second wireless station executes the direct communication with the first wireless station.

Here, multiple transmission timings are possible. The second notification information may be transmitted at any transmission timing.

With this configuration of the wireless communication system, the second notification is transmitted at the transmission timing, at which the first notification information is transmitted. This causes the second wireless station to consume less power than cases where the second notification information is transmitted at a timing different from the transmission timing of the first notification information.

Hereinafter, the third embodiment will now be detailed.

(Configuration)

Figure 14:
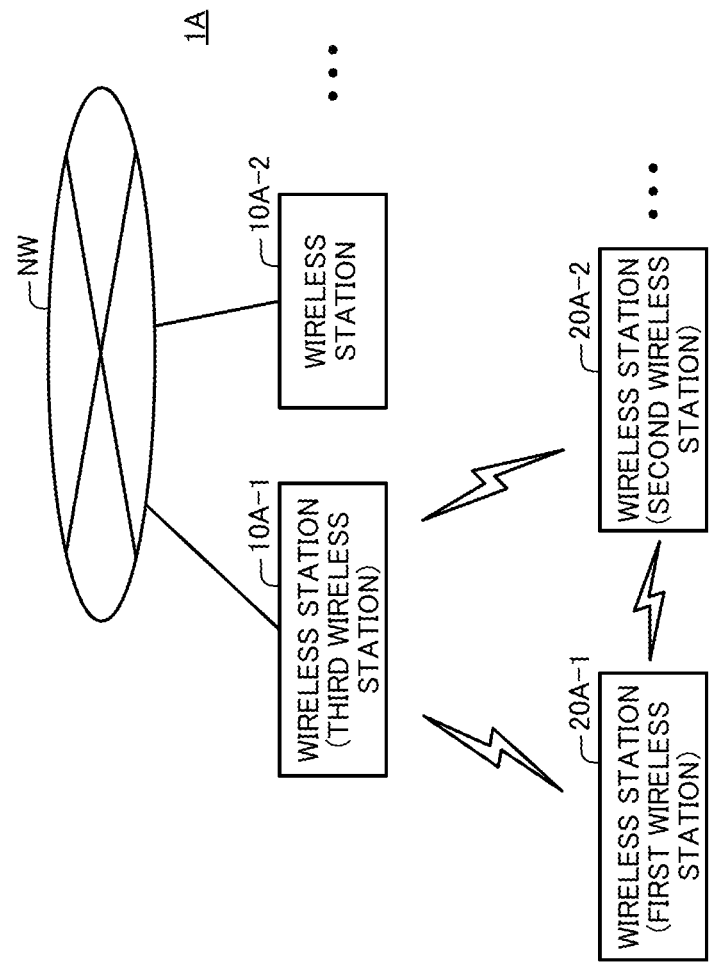
FIG. 14 is a diagram illustrating the configuration of a wireless communication system according to an example of a third embodiment.

As illustrated in FIG. 14, the wireless communication system 1A of the third embodiment includes multiple wireless stations 10A-1, 10A-2, . . . , 20A-1, 20A-2, . . . .

Hereinafter, the wireless stations 10A-i (where, i is a natural number) may sometimes be referred to simply as the wireless station 10A if not needing to be discriminated from one another. Similarly, the wireless stations 20A-j (where, j is a natural number) may sometimes be referred to simply as the wireless station 20A if not needing to be discriminated from one another.

In the third embodiment, the wireless station 20A-1 is an example of a first wireless station; the wireless station 20A-2 is an example of a second wireless station; and the wireless station 10A-1 is an example of a third wireless station. The wireless communication system 1 may include a single wireless station 10A.

The wireless communication system 1A functions as mobile communication system. In this example, the wireless communication system 1A is configured to perform communication in conformity with the scheme of Long Term Evolution (LTE). Alternatively, the wireless communication system 1A may adopt another communication scheme except for LTE, such as LTE advanced, Worldwide Interoperability for Microwave Access (WiMAX), 3rd Generation (3G), and 2nd Generation (2G).

In this embodiment, each wireless station 10A is a base station and is also referred to as an Evolved Node B (eNB). Examples of each wireless station 10A are an eNB, a femto base station, a macro base station, and a home base station (Home eNB or Home NB). Alternatively, each wireless station 10A may be a relay station (Relay Node). Each wireless station 10A may be referred to as a wireless device.

In this embodiment, each wireless station 20A is a terminal. Each wireless station 20A may be referred to as a user terminal (User Equipment (UE)) or a wireless terminal. Each wireless station 20A is a mobile station. A terminal here is a device such as a mobile telephone, a smartphone, a sensor, or a meter (measuring device). The terminal may be carried by the user or may be carried by or installed in a mobile article such as a vehicle.

The wireless stations 10A-1, 10A-2, . . . are communicably connected to one another via a communication network NW. In this embodiment, the wireless stations 10A-1, 10A-2, . . . are each wiredly and communicably connected to the communication network NW. At least one of the wireless stations 10A-1, 10A-2, . . . may be wirelessly-communicably connected to the communication network NW in place of the wired communication.

The part containing the wireless stations 10A-1, 10A-2, . . . and the entities closer to the communication network NW (i.e., upper side) than the wireless stations 10A-1, 10A-2, . . . in the wireless communication system 1A may be referred to as a Evolved Universal Terrestrial Radio Access Network (E-UTRAN).

Each wireless station 10A includes at least one cell. In this embodiment, examples of the cell are a macro cell, a micro cell, a macro cell, a nano cell, a pico cell, a femto cell, a home cell, and a sector cell. Each wireless station 10A is configured to be wirelessly communicable with a wireless station 20A positioned in the cell that the subject wireless station 10A has (provides).

Specifically, each wireless station 10A provides wireless resource (in this example, a time slot and a frequency band) in the cell that the subject wireless station 10A has. Each wireless station 10A communicates with a wireless station 20A positioned in a cell that the subject wireless station 10A has by using the wireless resource provided in the cell. In this embodiment, a wireless station 20A being communicable with the wireless station 10A by using the wireless resource provided in the cell that the same wireless stations 10A has is an example that the wireless station 20A being connected to the wireless station 10A.

Each wireless station 20A wirelessly communicates with the wireless station 10A that has a cell accommodating the subject wireless station 20A. Furthermore, each wireless station 20A wirelessly and directly communicates with another wireless station 20A except for the subject wireless station 20A. In this embodiment, each wireless station 20A communicates with another wireless station 20A by using the wireless resource that is provided in the cell provided by the wireless station 10A to which the subject wireless station 20A is connected.

Figure 15:
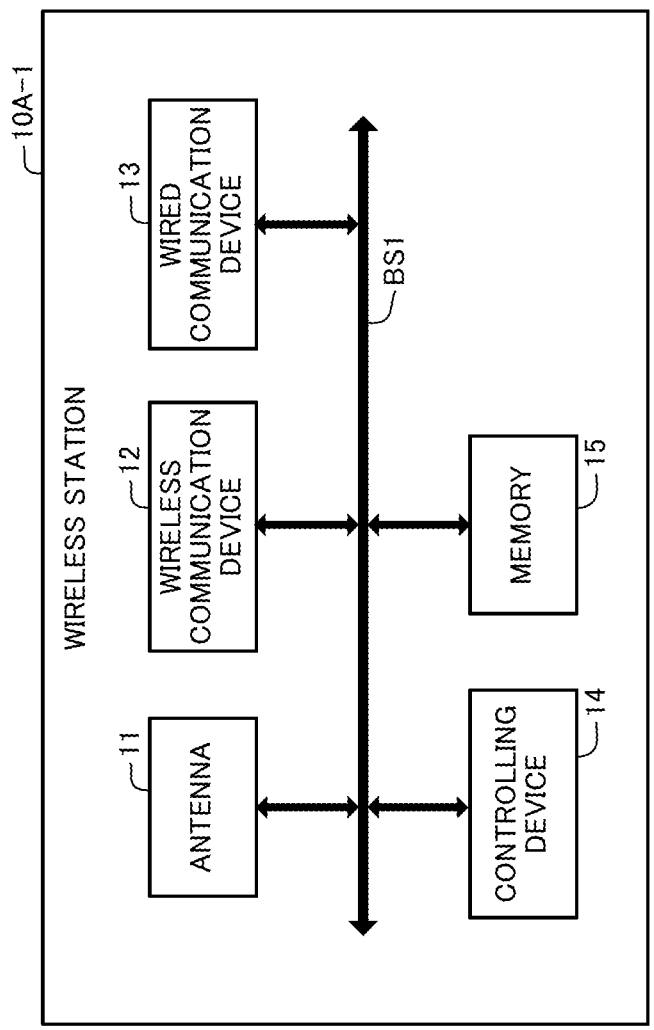
FIG. 15 is a diagram illustrating the configuration of a third wireless station of an example of the third embodiment.

As illustrated in FIG. 15, a wireless station 10A-1 includes an antenna 11, a wireless communication device 12, a wired communication device 13, a controlling device 14, and a memory 15, which are connected to one another via a bus BS1.

The wireless communication device 12 wirelessly communicates with a wireless station 20A positioned in a cell that the wireless station 10A-1 has through the antenna 11.

The wired communication device 13 has a communication port receivable a communication cable. When being connected to the communication network NW via a communication cable, the wired communication device 13 communicates with another station (e.g., the wireless stations 10A-2, . . . except for the local wireless stations 10A-1, or non-illustrated exchanger) connected to the communication network NW. Alternatively, the wireless stations 10A-1 may be wirelessly connected to the communication network NW.

The controlling device 14 controls the respective elements included in the wireless station 10A-1 in order to achieve the function to be detailed below. The controlling device 14 of this embodiment is formed of a Large Scale Integration (LSI). Alternatively, the controlling device 14 may be formed of a Programmable Logic Device (PLD). The controlling device 14 may include a processor such as a Central Processing Unit (CPU) and may achieve the following function by the processor executing a program stored in the memory 15.

The memory 15 readably and writably stores information. For example, the memory 15 includes at least one of a Random Access Memory (RAM), a Read Only Memory (ROM), a Hard Disk Drive (HDD), a Solid State Drive (SSD), a semiconductor memory, or an organic memory. The memory 15 may include a recording medium such as a flexible disk, an optical disk, a magneto-optical disk, and a semiconductor memory, and a reading device that can read information from the recording medium.

The wireless stations 10A-2, . . . except for the 10-1 are configured likewise the wireless station 10A-1.

Figure 16:
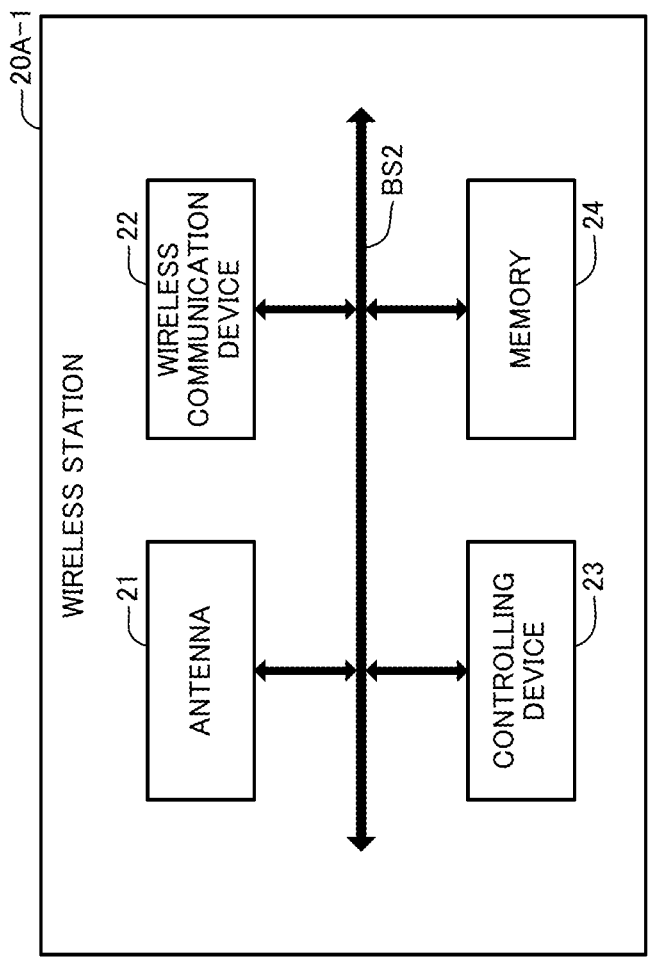
FIG. 16 is a diagram illustrating the configuration of a first wireless station of an example of the third embodiment.

As illustrated in FIG. 16, the wireless station 20A-1 includes an antenna 21, a wireless communication device 22, a controlling device 23, and a memory 24, which are connected to one another via a bus BS2.

The antenna 21 is configured the same as the antenna 11. The wireless communication device 22 is configured the same as the wireless communication device 12. The wireless communication device 22 communicates the wireless stations 10A-1, 10A-2, . . . and the wireless stations 20A-2, . . . except for the wireless station 20A-1. The controlling device 23 controls the respective elements included in the local wireless station 20A-1 in order to achieve the following function likewise the controlling device 14. The memory is configured the same as the memory 15.

The wireless stations 20A-2, . . . are configured the same as the wireless station 20A-1.

(Function)

Hereinafter, description will now be made in relation to the function of the wireless communication system 1A by referring to FIGS. 17-20.

Figure 17:
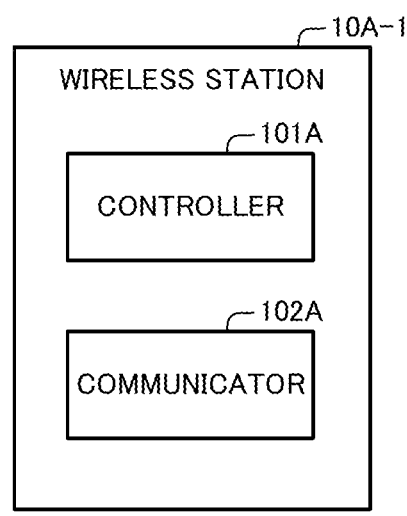
FIG. 17 is a diagram schematically illustrating a function of a third wireless station of an example of the third embodiment.
Figure 20:
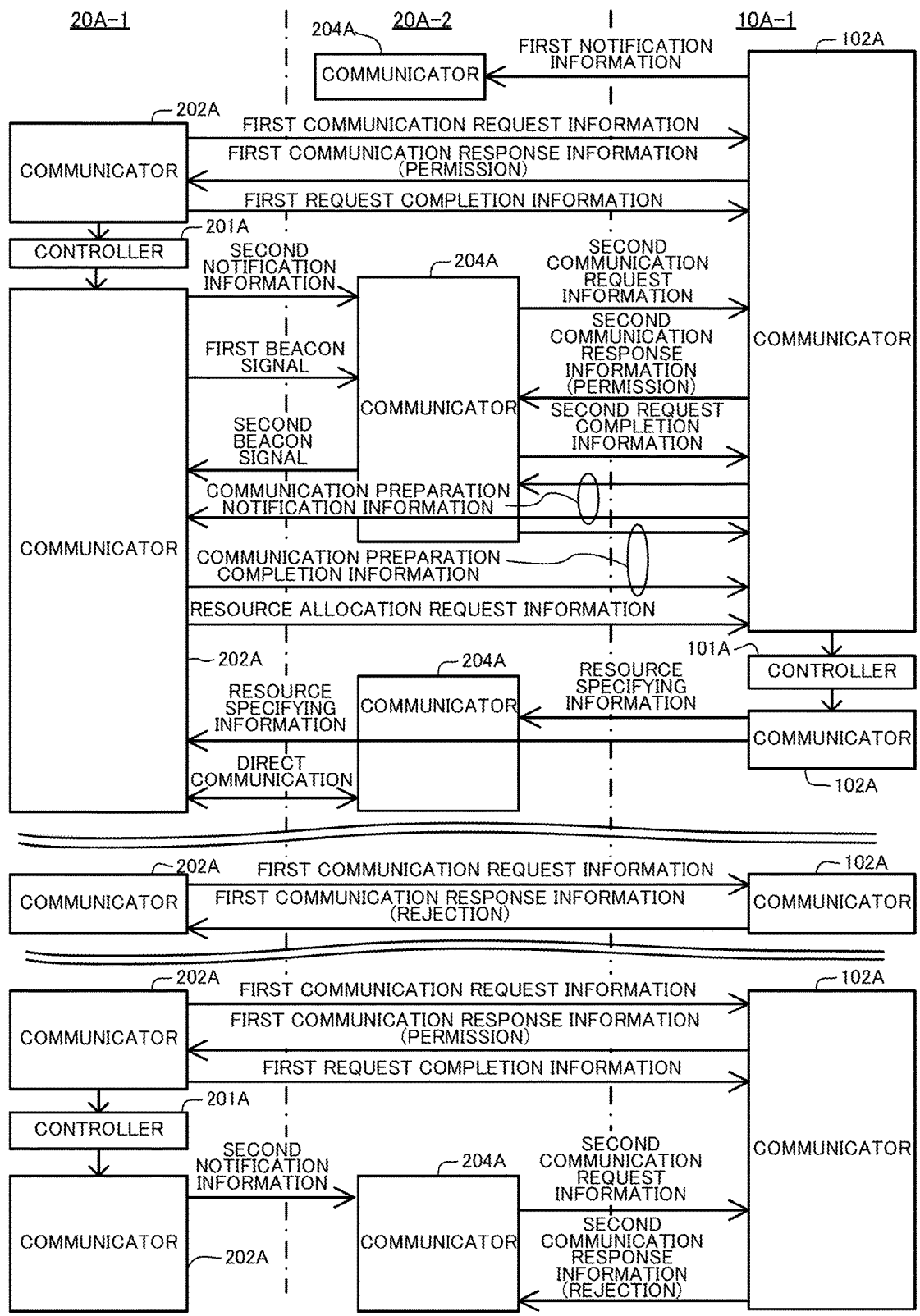
FIG. 20 is a diagram schematically illustrating a function of a wireless communication system of an example of the third embodiment.

As illustrated in FIGS. 17 and 20, the function of the wireless station 10A-1 includes a controller (second controller) 101A and a communicator (second communicator) 102A. In this embodiment, the communicator 102A consists of the antenna 11 and the wireless communication device 12; and the controller 101A consists of the controlling device 14 and the memory 15.

The controller 101A controls the local wireless station 10A-1. The communicator 102A transmits and receives information and signals to and from the wireless stations 10A-2, . . . except for the local the wireless station 10A-1, the wireless stations 20A-1, 20A-2, . . . , and an exchanger.

The controller 101A previously stores therein the fundamental information set for the local wireless station 10A-1. The fundamental information is the basis of determining the transmission timing. The fundamental information is set for each wireless station constituting a second wireless station group including the wireless station 10A-1, 10A-2, The fundamental information may be set by a person managing the wireless station 10A-1 or may be set by receiving from another device.

The controller 101A determines the transmission timing, for each wireless station 20A connected to the local wireless station 10A-1, on the basis of the stored fundamental information and the wireless station identifying information that identifies the wireless station 20A. The wireless station identifying information identifies (specifies) a single wireless station included in a second wireless station group including the wireless station 20A-1, 20A-2, . . . . Specifically, the controller 101A determines the transmission timing in conformity with a predetermined determination scheme (e.g., the scheme described in the Third Generation Partnership Project Technical Specification (3GPP) TS36.304). An example of the wireless station identifying information is International Mobile Subscriber Identity (IMSI).

In this embodiment, the transmission timing is specified by a Paging Frame (PF) and Paging Occasion (PO).

A PF is a wireless frame specified by a System Frame Number (SFN) satisfying the following Expression 1.

$$SFN \bmod T = (T \text{ div } N) \cdot (UE\_ID \bmod N) \qquad \text{[Expression 1]}$$

When the UE specific DRX is allocated to the wireless station 20A, T takes a value associated with a smaller one of a value of the defaultPagingCycle and a value of the UE specific DRX. In contrast, when the UE specific DRX is not allocated to the wireless station 20A, T takes a value of the defaultPagingCycle.

In this embodiment, the defaultPagingCycle represents the number of wireless frames; T represents the time corresponding to the defaultPagingCycle; and UE specific DRX is a Discontinuous (or intermittent) Reception period. An example of the DRX period is a time period for monitoring a paging signal.

N and UE_ID are represented by following Expressions 2 and 3, respectively. The element nB is 4·T, 2·T, T, T/2, T/4, T/8, T/16, or T/32.

$$N = \min(T, nB) \qquad \text{[Expression 2]}$$

$$UE\_ID = IMSI \bmod 1024 \qquad \text{[Expression 3]}$$

Po is determined on the basis of a table in which Ns, i_s, and PO are associated to one another. Ns and i_s are represented by following Expressions 4 and 5, respectively.

$$Ns = \max(1, nB/T) \qquad \text{[Expression 4]}$$

$$i\_s = \text{floor}(UE\_ID/N) \bmod Ns \qquad \text{[Expression 5]}$$

Accordingly, when the UE specific DRX is allocated to the wireless station 20A, the fundamental information includes defaultPagingCycle (first element information), nB (second element information), and UE specific DRX (third element information). On the other hand, when the UE specific DRX is not allocated to the wireless station 20A, the fundamental information includes the defaultPagingCycle (first element information) and the nB (second element information).

The communicator 102A transmits the first element information and the second element information to the wireless station 20A being connected to the local wireless station 10A-1. In this embodiment, the communicator 102A transmits common report information to each wireless stations 20A being connected to the local wireless station 10A-1 using a common (i.e., the same) wireless resource. The report information here includes the first element information and the second element information. In other words, the first element information and the second element information are notified to each wireless station 20A by means of the report information from the wireless station 10A-1.

The UE specific DRX (the third element information) is allocated to a wireless station 20A by means of an individual control signal transmitted from a network node to the same wireless station 20A. Here, an example of the network node is an upper exchanger or a Mobility Management Entity (MME).

The communicator 102A transmits first notification information to a wireless station 20A-2 serving as the transmission destination at the transmission timing determined by the controller 101A for the wireless station 20A-2. The first notification information indicates that the wireless station 10A-1 is to communicate with the wireless station 20A-2. Alternatively, the first notification information may indicate that the wireless station 10A-1 is ready to communicate with the wireless station 20A-2.

In this embodiment, the first notification information indicates that the wireless station 20A-1, . . . except for the transmission destination wireless station 20A-2, the wireless stations 10A-2, . . . except for the wireless station 10A-1, or the exchanger is to communicate with the transmission destination wireless station 20A-2 via the wireless station 10A-1. An example of the first notification information is a paging signal that pages the transmission destination wireless station 20A-2.

Specifically, when the communicator 102A is instructed to transmit a paging signal to the transmission destination wireless station 20A-2 being connected to the wireless station 10A-1 from the wireless station 20A-1, . . . except for the transmission destination wireless station 20A-2, the wireless station 10A-2, . . . except for the wireless station 10A-1, or an exchanger, the communicator 102A transmits the paging signal to the transmission destination wireless station 20A-2 at the transmission timing.

The communicator 102A may transmit the first notification information to the wireless stations 20A-1, . . . except for the wireless station 20A-2 in the same manner as the transmission of the first notification information to the wireless station 20A-1.

When receiving first communication request information from the wireless station 20A-1 being connected to the local wireless station 10A-1, the controller 101A determines whether a first execution condition is satisfied. Here, the first communication request information requests direct communication between the wireless station 20A-1 and the wireless station 20A-2. The direct communication can be regarded as direct communication between the wireless stations 20A constituting the first wireless station group. In this embodiment, the first communication request information includes wireless station identifying information that identifies the wireless station 20A-2. The first communication request information of this embodiment is a message called Radio Resource Control Device-to-Device (RRC D2D) Setup Request.

An example of the first execution condition is that the first notification information is not planned to be transmitted to the wireless station 20A-2. However, the first execution condition may be different from the above. Alternatively, the first execution condition may be a condition that the volume of available wireless resource in the cell, that the local wireless station 10A-1 has, is a predetermined threshold or more.

Further alternatively, the first execution condition may be that information related to the communication (e.g., Quality of Service) or information representing the type or kind of the bearer or the service that execute the communication) satisfies a predetermined condition (e.g., the QoS satisfies a predetermined condition; or the bearer or the service satisfies the standard for direct communication). The above condition setting appropriately selects a wireless station that is to carry out direct communication.

As described above, the first execution condition is a condition that the first notification information is not planned to be transmitted to the wireless station 20A-2. Setting such an execution condition allows the wireless station 20A-2 not to simultaneously receive notification information from the wireless station 20A-1 and notification information from the wireless station 10A-1. This reduces the signal processing by the wireless station 20A-2.

Reception of the notification information transmitted from the wireless station 20A-1 by the wireless station 20A-2 depends on the frequency that the wireless station 20A-1 uses. In cases where the wireless station 20A-1 uses the downlink frequency allocated by the wireless station 10A-1, the following redundant paging process is needed. This is because the wireless station 20A-2 always monitors a downlink signal that the wireless station 10A-1 transmits.

On the other hand, in cases where the wireless station 20A-1 uses the uplink frequency allocated by the wireless station 10A-1, the above redundant paging process does not occur. This is because the wireless station 10A-1 does not use the uplink frequency to transmit a wireless signal to the wireless station 20A-2. In the event of the above frequency allocation, no problem occurs even when the wireless station 10A-1 and the wireless station 20A-1 simultaneously transmit notification information to the wireless station 20A-2. If monitoring the uplink frequency, the wireless station 20A-2 receives the notification information from the wireless station 20A-1; while if monitoring the downlink frequency, the wireless station 20A-2 receives the notification information from the wireless station 10A-1.

In cases where the first execution condition is satisfied, the controller 101A obtains the fundamental information stored in association with the wireless station 20A-2 identified by the wireless station identifying information included in the first communication request received from the wireless station 20A-1.

The controller 101A obtains the transmission timing to the wireless station 20A-2 on the basis of the obtained fundamental information and the wireless station identifying information included in the first communication request information received from the wireless station 20A-1. In addition, the communicator 102A transmits first communication response information indicating that the direct communication is permitted to the wireless station 20A-1, which is the sender of the first communication request information. The first communication response information includes transmission timing information representing the obtained transmission timing. In this embodiment, the first communication response information representing the permission of the direct communication is a message called RRC D2D Setup.

On the other hand, if the first execution condition is not satisfied, the communicator 102A transmits first communication response information representing that the direct communication is rejected to the wireless station 20A-1. In this embodiment, the communication response information representing the rejection of the direct communication is a message called RRC D2D Reject.

When second communication information is received from the wireless station 20A-2 being connected to the local wireless station 10A-1, the controller 101A determines whether a second execution information is satisfied. Here, the second communication request information requests the direct communication. In this embodiment, the second communication request information includes wireless station identifying information (i.e., the wireless station identifying information to identify the wireless station 20A-1) included in second notification information that is to be detailed below. The second communication request information of this embodiment is a message called RRC D2D Setup Request.

For example, the second execution condition is that the volume of available wireless resource in the cell that the local wireless station 10A-1 has is a predetermined threshold or more. The second execution condition may be as the above alternatives.

In cases where the second execution condition is satisfied, the communicator 102A transmits second communication response information representing the permission of the direct communication to the wireless station 20A-2, which is the sender of the second communication request information. In this embodiment, the second communication response information representing the permission of the direct communication is a message called RRC D2D Setup.

On the other hand, when the second execution condition is not satisfied, the communicator 102A transmits second communication response information representing the rejection of the direct communication to the wireless station 20A-2, which is the sender of the second communication request information. In this embodiment, the second communication response information representing the rejection of the direct communication is the message called the RRC D2D Reject.

Upon receipt of second request completion information that is to be detailed below from the wireless station 20A-2, the communicator 102A transmits communication preparation notification information individually to the wireless station 20A-1 and the wireless station 20A-2. The communication preparation notification information of this embodiment includes direct communication identifying information that identifies direct communication. For example, the direct communication identifying information is also referred to as DD-RNTI, which is the abbreviation of Device-to-Device Radio Network Temporary Identifier. The communication preparation notification information of the present invention is a message called RRC D2D Invite.

When resource allocation request information that is to be described below is received from the wireless station 20A-1, the controller 101A allocates the wireless resource provided in the cell that the local wireless station 10A-1 has to the direct communication. Reception of the resource allocation request information is an example that, in cases where the second communication request information is received from the wireless station 20A-2, the second execution condition is satisfied.

The communicator 102A transmits resource specifying information that specifies the wireless resource allocated by the controller 101A individually to the wireless station 20A-1 and the wireless station 20A-2.

Specifically, the communicator 102A carries out a scrambling process on the resource specifying information that specifies the allocated wireless resource by masking the resource specifying information using the direct communication identifying information included in the communication preparation notification information. Furthermore, the communicator 102A transmits the resource specifying information having undergone the scrambling process individually to the wireless station 20A-1 and the wireless station 20A-2. The wireless station 20A-1 and the wireless station 20A-2 each monitor (blind-decode) the direct communication identifying information, and if the received resource specifying information is masked by the direct communication identifying information, determines that the received resource specifying information is destined for the subject wireless station and carries out receiving process in accordance with the resource specifying information.

The resource specifying information is transmitted through, for example, a PDCCH. Masking the CRC of a PDCCH by a DD-RNTI is an example of masking the resource specifying information using the direct communication identifying information.

In this embodiment, the communicator 102A transmits the resource specifying information by transmitting a message called UL (Uplink) Grant or a message called DL (Downlink) Assignment. These messages each include resource identifying information. In this embodiment, the resource specifying information is transmitted through the PDCCH.

The wireless station 20A-1 and the wireless station 20A-2 each carry out a descrambling process (damask process, demasking process) on the resource specifying information received from the wireless station 10A-1 on the basis of the direct communication identifying information included in the received communication preparation notification information. Furthermore, the wireless station 20A-1 and the wireless station 20A-2 each execute direct communication therebetween including data transmitting and receiving by using the wireless resource specified by the resource specifying information having undergone the descrambling process. In this embodiment, the wireless station 20A-1 and the wireless station 20A-2 achieve the direct communication with each other by using direct communication identifying information.

The controller 101A and communicator 102A exert the same function on the wireless stations 20A-2, . . . except for the wireless station 20A-1 as that on the wireless station 20A-1.

The controller 101A and communicator 102A exert the same function on the wireless stations 20A-1, . . . except for the wireless station 20A-2 as that on the wireless station 20A-2.

The wireless station 20A-1 and the wireless station 20A-2 execute the direct communication therebetween using the wireless resource specified by the resource specifying information received from the wireless station 10A-1.

The wireless stations 10A-2, . . . except for the wireless station 10A-1 have the same function as the wireless station 10A-1.

Figure 18:
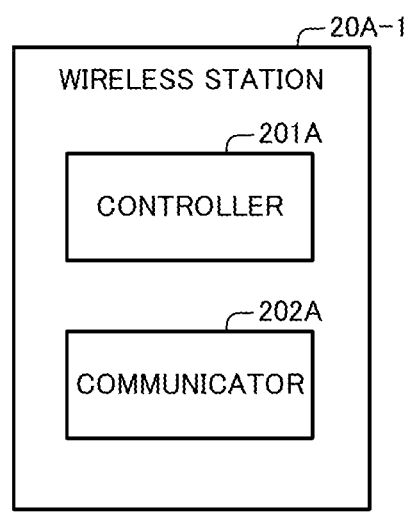
FIG. 18 is a diagram schematically illustrating a function of a first wireless station of an example of the third embodiment.

As illustrated in FIGS. 18 and 20, the function of the wireless station 20A-1 includes a controller (first controller) 201A and a communicator (first communicator) 202A. In this embodiment, the communicator 202A is formed of an antenna 21 and the wireless communication device 22, and the controller 201A is formed of a controlling device 23 and a memory 24.

The controller 201A controls the local wireless station 20A-1. The communicator 202A transmits and receives information and signals to and from the wireless station 10A-1 that the local wireless station 20A-1 is connected to and the wireless stations 20A-2, . . . except for the local wireless station 20A-1.

The communicator 202A transmits first communication request information to the wireless station 10A-1. In this embodiment, when the user of the wireless station 20A-1 inputs information representing the direct communication into the wireless station 20A-1, the communicator 202A transmits the first communication request information including wireless station identifying information associated with the input information to the wireless station 10A-1. This embodiment assumes that the first communication request information includes wireless station identifying information to identify the wireless stations 20A-2.

The controller 201A obtains a transmission timing at which the first notification information is transmitted to the wireless station 20A-2 (i.e., a transmission timing to the wireless station 20A-2). In this embodiment, the controller 201A obtains the transmission timing represented by transmission timing information included in the first communication response information received from the wireless station 10A-1.

Upon receipt of first communication response information that indicates the permission of direct communication from the wireless station 10A-1, the communicator 202A transmits first request completion information to the wireless station 10A-1. The first request completion information indicates that the preparation for the direct communication is completed. In this embodiment, the first request completion information is called RRC D2D Setup Complete.

In cases where the communicator 202A transmits the first request completion information, the controller 201A sets the local wireless station 20A-1 to be in the direct communication standby state. The direct communication standby state of this embodiment is also referred to as an RRC D2D IDLE mode. In this embodiment, at the time when the communicator 202A transmits the first request completion information, the controller 201A sets the local wireless station 20A-1 to be in the direct communication standby state.

The RRC D2D IDLE mode monitors at least beacon signal, but does not monitor the Physical Downlink Control Channel (PDCCH) (i.e., a communication channel through which the Cyclic Redundancy Check (CRC) processor transmits information masked by the Device-to-Device Radio Network Temporary Identification (D2D-RNTI)) that is needed for execution of the D2D communication.

For example, the RRC D2D IDLE mode has no need to receive downlink data allocation (DL assignment) needed for D2D communication and uplink data transmission (UL grant). The RRC D2D IDLE mode carries out various procedures (e.g., obtaining report information and monitoring CRS) needed for communication with a macro base station.

Furthermore, when transmitting the first request completion information, the communicator 202A transmits second notification information to the wireless station 20A-2 at the transmission timing obtained by the controller 201A. The second notification information indicate that the wireless station 20A-1 is to directly communicate (i.e., conducts D2D communication) with the wireless station 20A-2. Alternatively, the second notification information may indicate that the wireless station 20A-1 is ready to directly communicate with the wireless station 20A-2. In this embodiment, the second notification information includes wireless station identifying information to identify the wireless station 20A-1.

Specifically, during the time period from the transmission of the first request completion information to a predetermined transmission finishing time point, the communicator 202A repeatedly transmits second notification information to the wireless station 20A-2 each time a predetermined first transmission period elapses.

The predetermined transmission finishing time point may be determined by the wireless station 10A-1 or may be defined in advance in conformity with, for example, the communication standard.

The communicator 202A may measure the time that has elapsed since the reception of the first request completion information or since the start of the transmission of the second notification information and uses the time point when the measured time comes to be a predetermined threshold or more.

In this embodiment, the transmission finishing time point is a time period when a predetermined time period has elapsed since the transmission of the first completion information. Alternatively, the transmission finishing time point may be a time point when communication preparation notification information that is to be described below is received from the wireless station 10A-1.

A communicator 204A that is to be detailed below may be configured to, upon receipt of the second notification from the wireless station 20A-1, transmit fourth communication request information to the wireless station 20A-1. In this case, the transmission finishing time point may be the time point when the wireless station 20A-2 is identified by the information received from the wireless station 20A-2.

On the other hand, upon receipt of a first communication response information that indicates the direct communication is rejected from the wireless station 10A-1, the communicator 202A does not transmit the first request completion information to the wireless station 10A-1. In this case, the communicator 202A does not transmit the second notification information to the wireless station 20A-2.

If transmitting the first request completion information, the communicator 202A transmits a first beacon signal. The first beacon signal is used for synchronizing the communication with the wireless station 20A-2. Alternatively, the first beacon signal may be used to detect that the wireless station 20A-2 is positioned in a wirelessly communicable region (, which may be called "proximity"). The first beacon signal may be called a Discovery signal. In this embodiment, the first beacon signal includes wireless station identifying information to identify the sender wireless station 20A-1.

Specifically, after transmitting the first request completion information, the communicator 202A repeatedly transmits the first beacon signal each time predetermined second transmission period elapses. This means that the communicator 202A starts the transmission of the first beacon signal after the transmission of the first request completion information.

Upon receipt of a control signal conforming to the RRC protocol, a control signal conforming to the Medium Access Control (MAC) protocol, or a control signal through the PDCCH, the communicator 202A may start transmission of the first beacon signal.

When the communication preparation notification information is received from the wireless station 10A-1, the controller 201A sets the local wireless station 20A-1 to be in a direct communication connection state. In this embodiment, the direct communication connection state may be called an RRC D2D CONNECTED mode. In the present invention, the controller 201A sets the local wireless station 20A-1 to be in a direct communication connection state at the time point when communication preparation notification information is received from the wireless station 10A-1. The RRC D2D Connected mode monitors at least beacon signal and also monitors the PDCCH (a communication channel through which the CRC processor transmits information masked by the D2D-RNTI) needed for conducting the D2D communication.

Besides, upon receipt of the communication preparation notification information from the wireless station 10A-1, the communicator 202A transmits the communication response procedure information to the wireless station 10A-1. The communication response procedure information indicates that the preparation for direct communication is completed. Alternatively, the communication response procedure information may indicate that the direct communication identifying information is correctly received. In this embodiment, the communication response procedure information is a message called RRC D2D Invite Complete.

In addition, upon receipt of the communication preparation notification information from the wireless station 10A-1, the communicator 202A transmits the resource allocation request information to the wireless station 10A-1. The resource allocation request information requests allocation of wireless resource. In this embodiment, the resource allocation request information is a signal also called a Scheduling Request. In this embodiment, the resource allocation request information is transmitted through a Physical Uplink Control Channel (PUCCH) allocated to the wireless station 20A-1.

Even when the local wireless station 20A-1 is connected to the wireless stations 10A-2, . . . except for the wireless station 10A-1, the controller 201A and the communicator 202A function likewise the cases where the local wireless station 20A-1 is connected to the wireless station 10A-1.

As illustrated in FIGS. 18 and (sic, correctly through) 20, the function of the wireless station 20A-2 has a controller 203A and the communicator 204A. In this embodiment, the communicator 204A includes an antenna 21 and a wireless communication device 22, and the controller 203A includes a controlling device 23 and a memory 24.

The controller 203A controls the local wireless station 20A-2. The communicator 204A transmits and receives information and signal to and from the wireless station 10A-1 that the local wireless station 20A-2 is connected to and the wireless stations 20A-1, . . . except for the local wireless station 20A-2.

Upon receipt of the first notification information from the wireless station 10A-1, the communicator 204A transmits predetermined third communication request information to the wireless station 10A-1. In this embodiment, the third communication request information requests the start of the communication between the wireless station 10A-1 and the wireless station 20A-2.

Upon receipt of the second notification information from the wireless station 20A-1, the communicator 204A transmits the second communication request information to the wireless station 10A-1. If the second notification information is not received, since the direct communication is not established, the second communication request information is not transmitted to the wireless station 10A-1. Consequently, the direct communication fails.

In this case, the wireless station 10A-1 may grasp the failure of the direct communication. Specifically, after grasping that the wireless station 20A-1 wishes direct communication (for example after receipt of the first communication request information, or after receipt of the first request completion information), the wireless station 10A-1 starts a timer. If not receiving the second communication request information from the wireless station 20A-2 until the timer expires, the wireless station 10A-1 determines that the direct communication has failed and controls the wireless station 20A-1 to stop the transmission of the second notification information. For example, this control can be accomplished by de-configuring the direct communication.

Upon receipt of the second communication response information from the wireless station 10A-1, the communicator 204A transmits the second request completion information to the wireless station 10A-1. The second request completion information indicates that the preparation for the direct communication is completed. In this embodiment, the second request completion information is a message called RRC D2D Setup Complete.

When the communicator 204A transmits the second request completion information is transmitted, the controller 203A sets the local wireless station 20A-2 to be in the direct communication standby state. In this embodiment, the controller 203A sets the local wireless station 20A-2 to be in the direct communication standby state at the time when the communicator 204A transmits the second request completion information.

Upon transmission of the second request completion information, the communicator 204A transmits a second beacon signal. The second beacon signal is used for synchronizing the communication with the wireless station 20A-1. Alternatively, the second beacon signal may be used to detect that the wireless station 20A-1 is positioned in a wirelessly communicable region. The second beacon signal may be called a Discovery signal. In this embodiment, the second beacon signal includes wireless station identifying signal to identify the sender wireless station 20A-2.

Specifically, after transmitting the second request completion information, the communicator 204A repeatedly transmits the second beacon signal each time predetermined third transmission period elapses. This means that the communicator 204A starts the transmission of the second beacon signal after the transmission of the second request completion information. Upon receipt of a control signal conforming to the RRC protocol, a control signal conforming to the Medium Access Control (MAC) protocol, or a control signal through the PDCCH, the communicator 204A may start the transmission of the second beacon signal.

The communicator 202A and the communicator 204A synchronize the communication between wireless station 20A-1 and the wireless station 20A-2 on the basis of the first beacon signal and the second beacon signal.

The first beacon signal and the second beacon signal may be used to measure the quality of the direct communication. If the wireless station 20A-2 does not detect the first beacon signal or the intensity of the first beacon signal detected by the wireless station 20A-2 is equal to or lower than a predetermined threshold, the wireless station 20A-2 may be controlled not to carry out the direct communication. Likewise, if the wireless station 20A-1 does not detect the first beacon signal or the intensity of the second beacon signal detected by the wireless station 20A-1 is equal to or lower than a predetermined threshold, the wireless station 20A-1 may be controlled not to carry out the direct communication.

When the communication preparation notification information is received from the wireless station 10A-1, the controller 203A sets the local wireless station 20A-2 to be in the direct communication connection state. In this embodiment, the controller 203A sets the local wireless station 20A-2 to be in the direct communication connection state at the time point when the communication preparation notification information is received from the wireless station 10A-1.

Even when the local wireless station 20A-2 is connected to the wireless stations 10A-2, . . . except for the wireless station 10A-1, the controller 203A and the communicator 204A function likewise the cases where the local wireless station 20A-2 is connected to the wireless station 10A-1.

Figure 19:
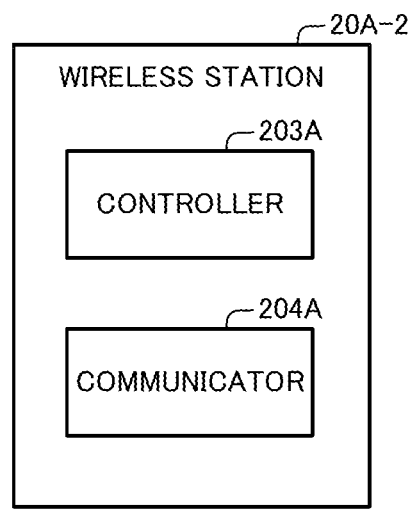
FIG. 19 is a diagram schematically illustrating a function of a second wireless station of an example of the third embodiment.

The wireless station 20A-1 has the same function as the wireless station 20A-2 illustrated in FIG. 19 in addition to the function illustrated in FIG. 18. The wireless station 20A-2 has the same function as the wireless station 20A-1 of FIG. 18 in addition to the function of FIG. 19. The wireless stations 20A except for the wireless stations 20A-1 and 20A-2 have the same functions as the wireless stations 20A-1 and 20A-2. The wireless station 20A-1 may have only the function of FIG. 18 and the wireless station 20A-2 may have only the function of FIG. 19.

(Operation)

Next, description will now be made in relation to the operation of the above wireless communication system 1A with reference to FIGS. 21 and 22.

This embodiment assumes that the wireless station 20A-1 and the wireless station 20A-2 are positioned in the cell that the wireless station 10A-1 has and both wireless station 20A-1 and the wireless station 20A-2 are connected to the wireless station 10A-1.

First of all, the wireless station 10A-1 is assumed to be instructed to transmit a paging signal that a wireless station 20A (another wireless station 20A) which is one of the wireless stations 20A-1, except for wireless station 20A-2 pages the wireless station 20A-2 via the wireless station 10A-1. In this case, the wireless station 10A-1 transmits the paging signal serving as the first notification information to the wireless station 20A-2 at the transmission timing to the wireless station 20A-2 (step S201 of FIG. 21).

Consequently, the wireless station 20A-2 receives first notification information from the wireless station 10A-1. Then the wireless station 20A-2 transmits third communication request information to the wireless station 10A-1 on the basis of the information input by the user of the wireless station 20A-2 (step S202 of FIG. 21). The third communication request information of this embodiment is a message called RRC Setup Request. Consequently, the wireless station 10A-1 receives the first (sic, correctly third) communication request information from the wireless station 20A-2.

Figure 21:
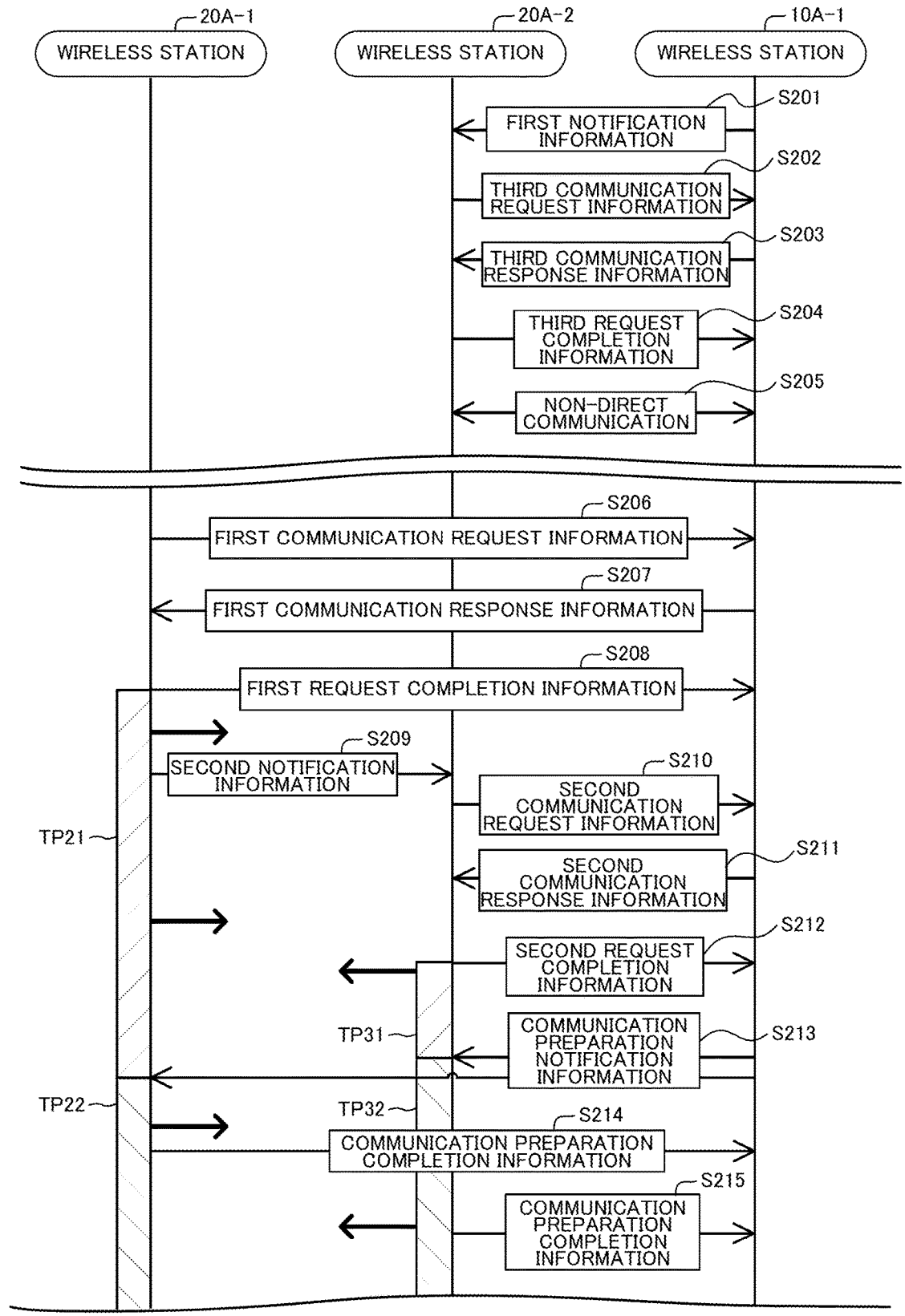
FIG. 21 is a sequence diagram illustrating an operation of a wireless communication system of an example of the third embodiment.

Then, the wireless station 10A-1 transmits the third communication response information that indicates the permission of the communication to the wireless station 20A-2 (step S203 of FIG. 21). In this embodiment, the third communication response information that indicates the permission of the communication is a message called RRC Setup. Consequently, the wireless station 20A-2 receives the third communication response information that indicates the permission of the communication from the wireless station 10A-1.

Next, the wireless station 20A-2 transmits the third request completion information to the wireless station 10A-1 (step S204 of FIG. 21). In this embodiment, the third request completion information is a message called RRC Setup Complete. The wireless station 10A-1 receives the third request completion information from the wireless station 20A-2. The other wireless station 20A then carry out communication (non-direct communication) via the wireless station 10A-1 with the wireless station 20A-2 (step S205 of FIG. 21). The non-direct communication may be regarded as communication between wireless stations 20A constituting the first wireless station group via the wireless station 10A-1 constituting the second wireless station group.

After that, if the user of the wireless station 20A-1 wishes the direct communication with the wireless station 20A-2, the user inputs information representing the direct communication into the wireless station 20A-1. The circumstance where the user of the wireless station 20A-1 wishes the direct communication with the wireless station 20A-2 is assumed to be either the following first or second circumstance. The first circumstance is that the user of the wireless station 20A-1 knows that the user of the wireless station 20A-2 is positioned sufficiently close to the user of the wireless station 20A-1; and the second circumstance is that the user of the wireless station 20A-1 wishes to talk to the user of the wireless station 20A-2 without recognizing the position of the user of the wireless station 20A-2.

Consequently, the wireless station 20A-1 transmits, to the wireless station 10A-1, the first communication request information including wireless station identifying information (i.e., wireless station identifying information to identify the wireless station 20A-2) associated with the information input by the user (step S206 of FIG. 21).

Upon receipt of the first communication request information, the wireless station 10A-1 determines whether the first execution condition is satisfied. In this embodiment, the first execution condition is that the first notification information is not planned to be transmitted to the wireless station 20A-2.

In cases where the first execution condition is satisfied, the wireless station 10A-1 obtains the fundamental information stored in association with the wireless station 20A-2 identified by the wireless station identifying information included in the first communication request information received from the wireless station 20A-1.

Then the wireless station 10A-1 obtains the transmission timing to the wireless station 20A-2 on the basis of the obtained fundamental information and the wireless station identifying information included in the first communication request information received from the wireless station 20A-1. In addition, the wireless station 10A-1 transmits a first communication response information including the transmission timing information representing the obtained transmission timing and indicating that the direct communication is permitted to the wireless station 20A-1, which is the sender of the first communication information (step S207 of FIG. 21).

Consequently, the wireless station 20A-1 receives the first communication response information indicating the permission of the direct communication from the wireless station 10A-1. Then, the wireless station 20A-1 transmits the first request completion information to the wireless station 10A-1 (step S208 of FIG. 21). In addition, at the time when the wireless station 20A-1 transmits the first request completion information (step S208 of FIG. 21), the wireless station 20A-1 sets the subject wireless station 20A-1 to be in the direct communication standby state. Furthermore, at the time when the wireless station 20A-1 transmits the first request completion information, the wireless station 20A-1 starts the transmission of the first beacon signal.

Specifically, during the time periods TP 21 and TP 22, the wireless station 20A-1 repeatedly transmits the first beacon signal each time a predetermined second transmission period elapses. Thereby, the wireless station 20A-2 receives the first beacon signal. In this embodiment, the time period TP starts at the time when the wireless station 20A-1 transmits the first request completion information. Alternatively, the period TP 21 may be started at a time point after a predetermined time from the wireless station 20A-1 transmits the first request completion information. The time period TP21 may be started at the time when the first communication respond information indicating the permission of the direct communication is received.

Furthermore, after receiving the first communication response information indicating the permission of the direct communication, the wireless station 20A-1 obtains the transmission timing represented by the transmission timing information included in the received first communication response information. Next, the wireless station 20A-1 starts the transmission of the second notification information including wireless station identifying information to identify the subject wireless station 20A-1 (step S209 of FIG. 21).

Specifically, during the time period until the predetermined transmission finishing time point, the wireless station 20A-1 repeatedly transmits second notification information to the wireless station 20A-2 at the obtained transmission timing each time a predetermined first transmission period elapses. In this embodiment, the transmission of the second notification information starts at the time point when the wireless station 20A-1 transmits the first request completion information. Alternatively, the transmission of the second notification information may be started at a time point after a predetermined time from the transmission of the first request completion information from the wireless station 20A-1. Further alternatively, the transmission of the second notification information may be started at a time point when the first communication response information is received.

Thereby, the wireless station 20A-2 receives the second notification information. Upon receipt of the second notification information, the wireless station 20A-2 transmits the second communication request information including the wireless station identifying information to identify the subject wireless station 20A-1 to the wireless station 10A-1 (step S210 of FIG. 21).

Consequently, the wireless station 10A-1 receives the second communication request information from the wireless station 20A-2. Upon receipt of the second communication request information, the wireless station 10A-1 determines whether the second execution condition is satisfied.

In cases where the second execution condition is satisfied, the wireless station 10A-1 transmits the second communication response information that indicates the permission of the direct communication to the wireless station 20A-2, which is the sender of the second communication request information (step S211 of FIG. 21).

Consequently, the wireless station 20A-2 receives the second communication response information that indicates the permission of direct communication. Then the wireless station 20A-2 transmits the second request completion information to the wireless station 10A-1 (step S212 of FIG. 21). Furthermore, the wireless station 20A-2 sets the subject wireless station 20A-2 to be in the direct communication standby state at the time point when the wireless station 20A-2 transmits the second request completion information (step S212 of FIG. 21). In addition, the wireless station 20A-2 starts the transmission of the second beacon signal at the time point when the wireless station 20A-2 transmits the second request completion information.

Specifically, during the time periods TP 31 and TP 32, the wireless station 20A-3 repeatedly transmits the second beacon signal each time a predetermined third transmission period elapses. Thereby, the wireless station 20A-1 receives the second beacon signal. In this embodiment, the time period TP 31 starts at the time when the wireless station 20A-2 starts the transmission of the second request completion information. Alternatively, the period TP 31 may be started at a time point after a predetermined time when the wireless station 20A-2 transmits the second request completion information. The time period TP31 may be started at the time when the second communication response information indicating the permission of the direct communication is received.

Consequently, the wireless station 10A-1 receives the second request completion information from the wireless station 20A-2. Then the wireless station 10A-1 transmits the communication preparation notification information individually to the wireless station 20A-1 and the wireless station 20A-2 (step S213 of FIG. 213). Accordingly, the wireless station 20A-1 and the wireless station 20A-2 each receive the communication preparation notification information from the wireless station 10A-1.

At the time point when the wireless station 20A-1 receives the communication preparation notification information (step S213 of FIG. 21), the wireless station 20A-1 sets the subject the wireless station 20A-1 to be in the direct communication connection state. Likewise, at the time when receiving the communication preparation notification information, the wireless station 20A-2 sets the subject wireless station 20A-2 to be in the direction communication connection state.

The wireless station 20A-1 transmits the communication response procedure information to the wireless station 10A-1 (step S214 of FIG. 21) and similarly, the wireless station 20A-2 transmits the communication response procedure information to the wireless station 10A-1 (step S215 of FIG. 21).

Figure 22:
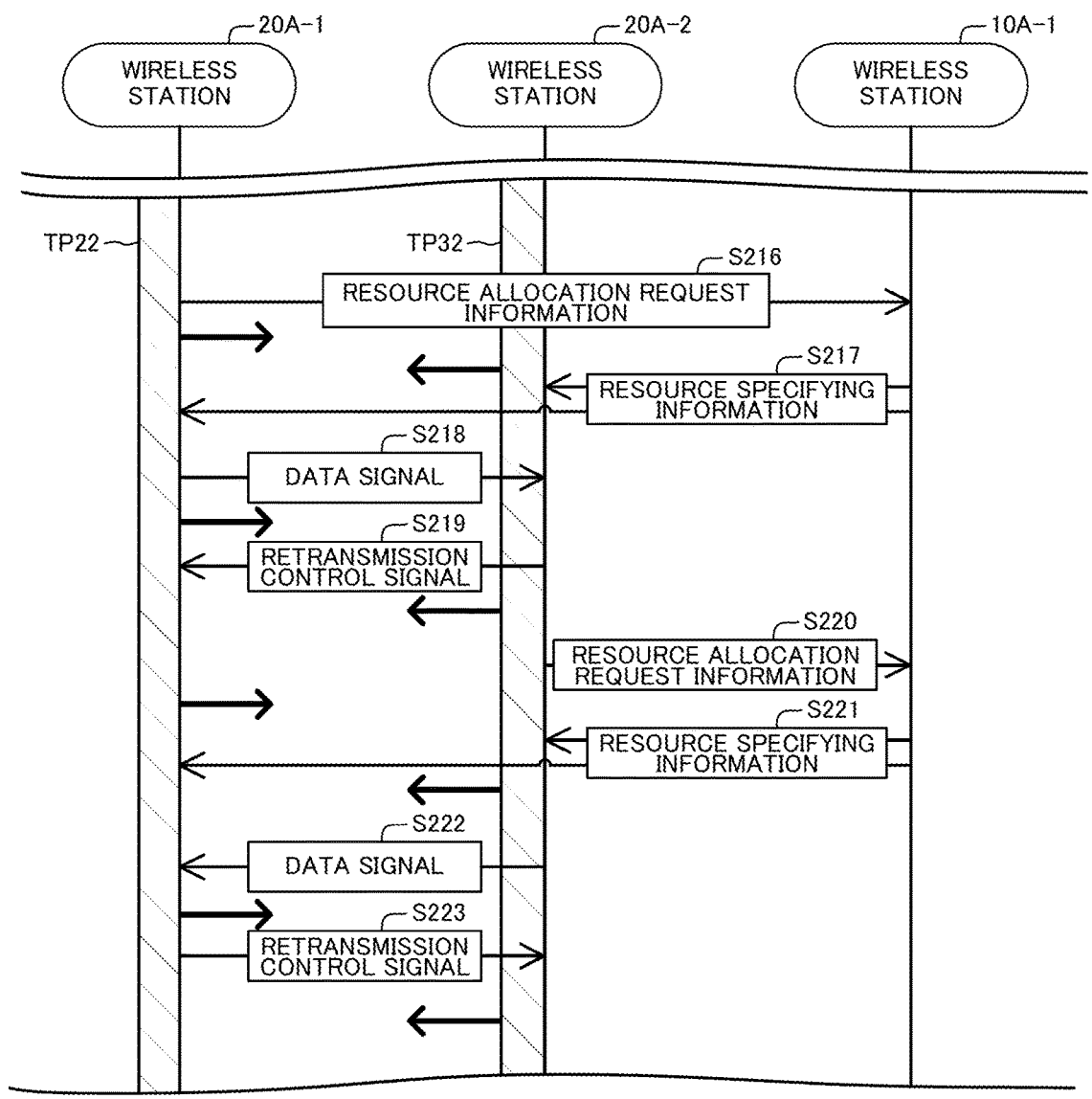
FIG. 22 is a sequence diagram illustrating an operation of a wireless communication system of an example of the third embodiment.

Then the wireless station 20A-1 transmits the resource allocation request information to the wireless station 10A-1 (step S216 of FIG. 22). Consequently, the wireless station 10A-1 receives the resource allocation request information from the wireless station 20A-1.

Upon receipt of the resource allocation request information, the wireless station 10A-1 allocates a wireless resource provided in a cell that the subject wireless station 10A-1 has to the direct communication. Then the wireless station 10A-1 carries out a scrambling process on the resource specifying information that specifies the allocated wireless resource by masking the resource specifying information using the direct communication identifying information included in the communication preparation notification information transmitted in step S213. Then, the wireless station 10A-1 transmits the resource specifying information having undergone the scrambling process individually to the wireless station 20A-1 and the wireless station 20A-2 (step S217 of FIG. 22).

The expression "transmitting individually" may mean that the resource specifying information is transmitted through different channels (PDCCHs) on the physical layer or may mean that the resource specifying information is transmitted through a single channel (PDCCH) on the physical layer. For example, likewise the transmission of the report information, the wireless station 10A-1 may transmit the resource specifying information through a single channel (PDCCH). In this case, the wireless stations 20 of the receiver ends can simultaneously detect the resource specifying information through monitoring the channel.

For example, a segment (subframe) by which a wireless station 20 receives the resource specifying information transmitted through a single channel is assumed to be the same as a segment (subframe) by which the wireless station 20 receives a signal from a counterpart wireless station 20. In this case, the received resource specifying information means that the data from the counterpart wireless station 20 is received by using the wireless resource specified by the resource specifying information (i.e. UL grant).

In contrast to the above, the segment (subframe) by which the counterpart wireless station 20 receives the resource specifying information is a segment (subframe) by which the counterpart wireless station 20 transmits a signal. In this case, the received resource specifying information means that the data destined for the counterpart wireless station 20 is transmitted by using the wireless resource specified by the resource specifying information (i.e., DL assignment).

In this embodiment, the wireless station 10A-1 transmits the resource specifying information for the UL grand to the wireless station 20A-1 and also transmits the resource specifying information for the DL assignment to the wireless station 20A-2. Furthermore, the wireless station 10A-1 may transmit the resource specifying information for the DL assignment to the wireless station 20A-1; and may transmit the resource specifying information for the UL grant to the wireless station 20A-2.

Thereby, the wireless station 20A-1 and the wireless station 20A-2 each receive the resource specifying information from the wireless station 10A-1. After that, the wireless station 20A-1 and the wireless station 20A-2 each carry out a descrambling process on the received resource specifying information on the basis of the direct communication identifying information included in the received communication preparation notification information.

Next, each of the wireless station 20A-1 and the wireless station 20A-2 carries out direct communication including data transmission and data reception by using the wireless resource specified by the resource specifying information having undergone the descrambling process. Specifically, the wireless station 20A-1 transmits a data signal to the wireless station 20A-2 (step S218 of FIG. 18).

The wireless station 20A-2 transmits a retransmission control signal responsive to the data signal received from the wireless station 20A-1 to the wireless station 20A-1 (step 219 of FIG. 22). The retransmission control signal contains information whether the data signal has been correctly received. An example of the retransmission control signal is an Acknowledgement signal or a Negative ACK (NACK) signal.

After that, the wireless station 20A-2 transmits the resource allocation request information to the wireless station 10A-1 (step S220 of FIG. 22). Consequently, the wireless station 10A-1 receives the resource allocation request information from the wireless station 20A-2.

Upon receipt of the resource allocation request information, the wireless station 10A-1 allocates the wireless resource provided in the cell that the subject wireless station 10A-1 has likewise step S217. Furthermore, the wireless station 10A-1 transmits resource specifying information having undergone the scrambling process individually to the wireless station 20A-1 and the wireless station 20A-2 (step S221 of FIG. 22).

In this embodiment, the wireless station 10A-1 transmits the resource specifying information for the UL grand to the wireless station 20A-2 and also transmits the resource specifying information for the DL assignment to the wireless station 20A-1. The wireless station 10A-1 may transmit the resource specifying information for the DL assignment to the wireless station 20A-2; and may transmit the resource specifying information for the UL grant to the wireless station 20A-1.

Thereby, the wireless station 20A-1 and the wireless station 20A-2 each receive the resource specifying information from the wireless station 10A-1. After that, the wireless station 20A-2 transmits a data signal to the wireless station 20A-1 (step S222 of FIG. 22). Then, the wireless station 20A-1 transmits a retransmission control signal responsive to the data signal received from the wireless station 20A-2 to the wireless station 20A-2 (step S223 of FIG. 22).

In cases where the first execution condition is not satisfied at the time point when the wireless station 10A-1 receives the first communication request information, the wireless stations 10A-1 transmits first communication response information indicating the rejection of the direct communication to the wireless station 20A-1. Consequently, the wireless station 20A-1 receives the first communication response information indicating the rejection of the direct communication. In this case, the wireless station 20A-1 does not transmit the second notification information, which means that the direct communication is not executed.

In cases where the second execution condition is not satisfied at the time point when the wireless station 10A-1 receives the second communication request information, the wireless stations 10A-1 transmits second communication response information indicating the rejection of the direct communication to the wireless station 20A-2. Consequently, the wireless station 20A-2 receives the second communication response information indicating the rejection of the direct communication. In this case, the wireless station 10A-1 does not transmit the communication preparation notification information, which means that the direct communication is not executed.

Transmitting and receiving of a data signal between the wireless station 20A-1 and the wireless station 20A-2 is an example of execution of the direct communication between the wireless station 20A-1 and the wireless station 20A-2.

As described above, in the wireless communication system 1A of the third embodiment, the wireless station 20A-1 obtains the transmission timing at which the wireless station 10A-1 transmits the first notification information to the wireless station 20A-2. Furthermore, the wireless station 20A-1 transmits the second notification information to the wireless station 20A-2 at the obtained transmission timing.

Consequently, the second notification information is transmitted at the transmission timing at which the first notification information is transmitted. This can reduce the electric power that the wireless station 20A-2 consumes as compared with cases where the second notification information is transmitted at a different timing from that to transmit the first notification information.

Furthermore, in the wireless communication system 1A of the third embodiment, the wireless station 20A-1 transmits the first communication request information to the wireless station 10A-1. In cases where the first execution condition is satisfied when the wireless station 10A-1 receives the first communication request information from the wireless station 20A-1, the wireless station 10A-1 transmits the first communication response information indicating the permission of the direct communication to the wireless station 20A-1. On the other hand, in cases where the first execution condition is dissatisfied when the wireless station 10A-1 receives the first communication request information from the wireless station 20A-1, the wireless station 10A-1 transmits the first communication response information indicating the rejection of the direct communication to the wireless station 20A-1. In addition, in cases where the wireless station 20A-1 receives the first communication response information indicating the permission of the direct communication from the wireless station 10A-1, the wireless station 20A-1 transmits the second notification information to the wireless station 20A-2. On the other hand, in cases where the wireless station 20A-1 receives the first communication response information indicating the rejection of the direct communication from the wireless station 10A-1, the wireless station 20A-1 does not transmit the second notification information.

Accordingly, whether or not the second notification information is to be transmitted is controlled on the basis of satisfaction or dissatisfaction of the first execution condition. This means that whether or not the second notification information is to be transmitted can be flexibly controlled. For example, setting a condition that the first notification information is not planned to be transmitted for the first execution condition makes it possible to avoid the circumstance where the first notification information and the second notification information are simultaneously transmitted.

The wireless station 10A-1 receives the first communication request information before the second notification information is transmitted. Accordingly, the wireless station 10A-1 can recognize that the wireless station 20A-1 is to transmit the second transmission information at the transmission timing in advance. Consequently, the wireless station 10A-1 can cancel (stop) the transmission of the first notification information, for example, in cases where the second transmission is to be transmitted.

Furthermore, in the wireless communication system 1A of the third embodiment, the first notification information indicates that one of the wireless stations 20A-1, . . . except for the wireless station 20A-2 is to communicate with the wireless station 20A-2 via the wireless station 10A-1. Here, the wireless communication system 1A is configured to transmit the first notification information at the predetermined transmission timing. Accordingly, the wireless communication system 1A can reduce the electric power that the wireless station 20A-2 consumes, surely reserving the timing to transmit the second notification information.

Besides, in the wireless communication system 1A of the third embodiment, in cases where the wireless station 20A-2 receives the second notification information from the wireless station 20A-1, the wireless station 20A-2 transmits the second communication request information that requests the direct communication to the wireless station 10A-1.

This allows the wireless station 10A-1 to recognize that the transmission of the second notification information is to be finished in advance. Consequently, this can avoid a circumstance where the transmission of the first notification information is needlessly stood by, avoiding simultaneous transmission of the first notification information and the second notification information. In the wireless communication system 1A of the third embodiment, the wireless station 10A-1 obtains the fundamental information set for the subject wireless station 10A-1 that is connected the wireless station 20A-2 to on the basis of the wireless station identifying information included in the first communication request information received from the wireless station 20A-1. In addition, the wireless station 10A-1 obtains the transmission timing on the basis of the obtained fundamental information and the wireless station identifying information. Furthermore, the wireless station 10A-1 transmits the first communication response information including the transmission timing information representing the obtained transmission timing to the wireless station 20A-1. Responsively, the wireless station 20A-1 obtains the transmission timing included in the transmission timing information included in the first communication response information received from the wireless station 10A-1.

Here, the wireless station 20A-1 is incapable of recognizing whether UE specific DRX is allocated to the wireless station 20A-2 that is a wireless station 20A except for the subject wireless station 20A-1. On the other hand, the wireless station 10A-1 is capable of recognizing whether UE specific DRX is allocated to the wireless station 20A-2. With the above configuration, the wireless station 20A-1 surely obtains the transmission timing.

In the wireless communication system 1A of the third embodiment, the wireless station 20A-1 repeatedly transmits the second notification information each time the first transmission period elapses, and finishes the transmission of the second notification information at the predetermined transmission finishing time point.

This can avoid needless transmission of the second notification information from the wireless station 20A-1 after the wireless station 20A-2 has received the second notification information from the wireless station 20A-1.

Still furthermore, in the wireless communication system 1A of the third embodiment, the wireless station 10A-1 allocates the wireless resource to the direct communication. In addition, the wireless station 10A-1 carries out a scrambling process on the resource specifying information that specifies the allocated wireless resource by masking the resource specifying information by using the direct communication identifying information, and transmits the processed resource specifying information individually to the wireless station 20A-1 and the wireless station 20A-2. In addition, the wireless station 20A-1 and the wireless station 20A-2 each carry out a descrambling process on the resource specifying information received from the wireless station 10A-1 on the basis of the direct communication identifying information included in the received communication preparation notification information. Finally, the wireless station 20A-1 and the wireless station 20A-2 carry out the direct communication including data transmission and data reception by using the wireless resource specified by the processed resource specifying information.

This allows the wireless station 10A-1 to notify the resource specifying information that specifies the wireless resource allocated to the direct communication of only the wireless station 20A-1 and wireless station 20A-2 that are the wireless stations to carry out the direct communication in question. Consequently, the wireless station 20A-1 and the wireless station 20A-2 surely carry out the direct communication.

Still furthermore, in the wireless communication system 1A of the third embodiment, after transmitting the first request completion information, the wireless station 20A-1 starts the transmission of the first beacon signal to synchronize the communication with the wireless station 20A-2.

Here, at a time point before the first request completion information is transmitted, the wireless station 20A-1 has no need to synchronize the communication with the wireless station 20A-2. For this reason, at a time point before the first request completion information is transmitted, the first beacon signal if being transmitted is not used. Accordingly, the above configuration can avoid needless transmission of the first beacon signal.

Still furthermore, in the wireless communication system 1A of the third embodiment, after transmitting the second request completion information, the wireless station 20A-2 starts the transmission of the second beacon signal to the wireless station 20A-1 in order to synchronize the communication with the wireless station 20A-1.

Here, at a time point before the second request completion information is transmitted, the second beacon signal if being transmitted is hardly used. Accordingly, the above configuration can avoid needless transmission of the second beacon signal.

The wireless communication system 1A of the third embodiment is configured to include the transmission timing information in the first communication response information. Alternatively, the first communication response information may include the entire fundamental information. In this case, the wireless station 20A-1 obtains the transmission timing to the wireless station 20A-2 on the basis of the fundamental information included in the first communication response information and the wireless station identifying information.

The wireless communication system 1A of the third embodiment is configured to include the transmission timing information in the first communication response information. Alternatively, the first communication response information may include UE specific DRX (third element information). In this case, the wireless station 20A-1 obtains the transmission timing to the wireless station 20A-2 on the basis of the third element information included in the first communication response information, the first element information and the second element information included in the report information, and the wireless station identifying information.

The wireless communication system 1A of the third embodiment is configured to include the transmission timing information in the first communication response information. Alternatively, the first communication response information may include neither transmission timing information nor the element information. In this case, the wireless station 20A-1 obtains the transmission timing to the wireless station 20A-2 on the basis of the first element information and the second element information included in the report information and the wireless station identifying information. In particular, in cases where UE specific DRX is not allocated to the wireless station 20A-2, even this configuration allows the wireless station 20A-1 to obtain the correct transmission timing to the wireless station 20A-2.

The wireless communication system 1A may be configured to transmit the second notification information to the wireless station 20A-2 from the wireless station 10A-1 in place of the wireless station 20A-1.

In the wireless communication system 1A of the third embodiment, the wireless station 20A-1 may be configured not to transmit, when receiving the first communication response information indicating the permission of communication, the first request completion information to the wireless station 10A-1. Likewise, in the wireless communication system 1A of the third embodiment, the wireless station 20A-2 may be configured not to transmit, when receiving the second communication response information indicating the permission of the communication, the second request completion information to the wireless station 10A-1.

In the wireless communication system 1A of the third embodiment, the wireless station 20A-1, which is the sender of the second notification information, is configured to transmit the wireless resource allocation request information to the wireless station 10A-1 before transmitting the same information to the wireless station 20A-2 that is the receiver of the second notification information. Alternatively, in the wireless communication system 1A, the wireless station 20A-2, which is the receiver of the second notification information, may be configured to transmit the wireless resource allocation request information to the wireless station 10A-1 before transmitting the same information to the wireless station 20A-1 that is the sender of the second notification information.

The wireless communication system 1A may be configured to transmit the resource allocation request information to the wireless station 10A-1 only from the wireless station 20A-1 that is the sender of the second notification information. Further alternatively, the wireless communication system 1A may be configured to transmit the resource allocation request information to the wireless station 10A-1 only from the wireless station 20A-2 that is the receiver of the second notification information.

Figure 23:
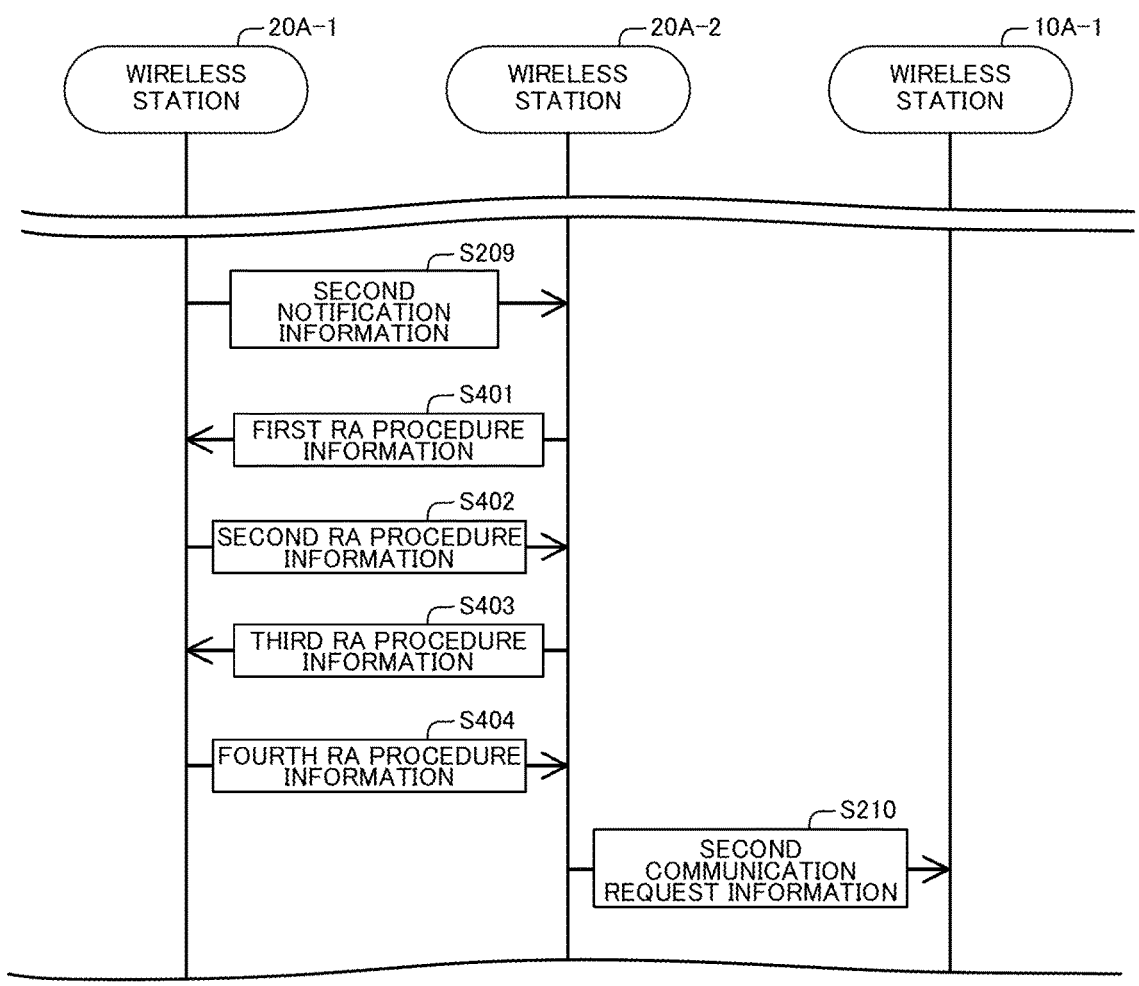
FIG. 23 is a sequence diagram illustrating an operation of a wireless communication system according to an example of a modification to the third embodiment.

As illustrated in FIG. 23, the wireless communication system 1A of the third embodiment may be configured to carry out the process of steps S401 to S404 immediately after the wireless station 20A-2 receives the second notification information (step S209). The process of steps S401 to S404 constitute a Contention Based Random Access Procedure.

Specifically, upon receipt of the second notification information (step S209 of FIG. 23), the wireless station 20A-2 transmits a first Random Access (RA) procedure information to the wireless station 20A-1 (step S401 of FIG. 23). The first RA procedure information is a message called Random Access Preamble. The first RA procedure information is transmitted through a Physical Random Access Channel (PRACH). Even in cases where the PUCCH is not allocated to the wireless station 20A-2, the wireless station 20A-2 can transmit the first RA procedure information.

Consequently, the wireless station 20A-1 receives the first RA procedure information from the wireless station 20A-2. Then, upon receipt of the first RA procedure information, the wireless station 20A-1 transmits second RA procedure information to the wireless station 20A-2 (step S402 of FIG. 23). The second RA procedure information is a message called Random Access Response. Accordingly, the wireless station 20A-2 receives the second RA procedure information from the wireless station 20A-1.

Upon receipt of the second RA procedure information, the wireless station 20A-2 transmits third RA procedure information to the wireless station 20A-1 (step S403 of FIG. 23). The third RA procedure information is a message called Scheduled Transmission or RRC Connection Establishment Request. Accordingly, the wireless station 20A-1 receives the third RA procedure information from the wireless station 20A-2.

Upon receipt of the third RA procedure information, the wireless station 20A-1 transmits fourth RA procedure information to the wireless station 20A-2 (step S404 of FIG. 23). The fourth RA procedure information is a message called Contention Resolution. Accordingly, the wireless station 20A-2 receives the fourth RA procedure information from the wireless station 20A-1.

In this case, this random access procedure may optimize the wireless communication and may notify wireless station identifying information.

Alternatively, the wireless communication system 1A may execute Non-Contention Based Random Access Procedure in place of Contention Based Random Access Procedure.

Furthermore, upon receipt of the fourth RA procedure information, the wireless station 20A-2 transmits the second communication request information to the wireless station 10A-1 (step S210 of FIG. 23).

Here, the transmission finishing time point is the time point when the wireless station 20A-1 recognizes the wireless station 20A-2, which is the counterpart of the RA procedure. Examples of the transmission finishing time point is the time point when the third RA procedure information is received and a time point between the time point when the third RA procedure information is received and the time point when the fourth RA procedure information is transmitted.

Figure 24:
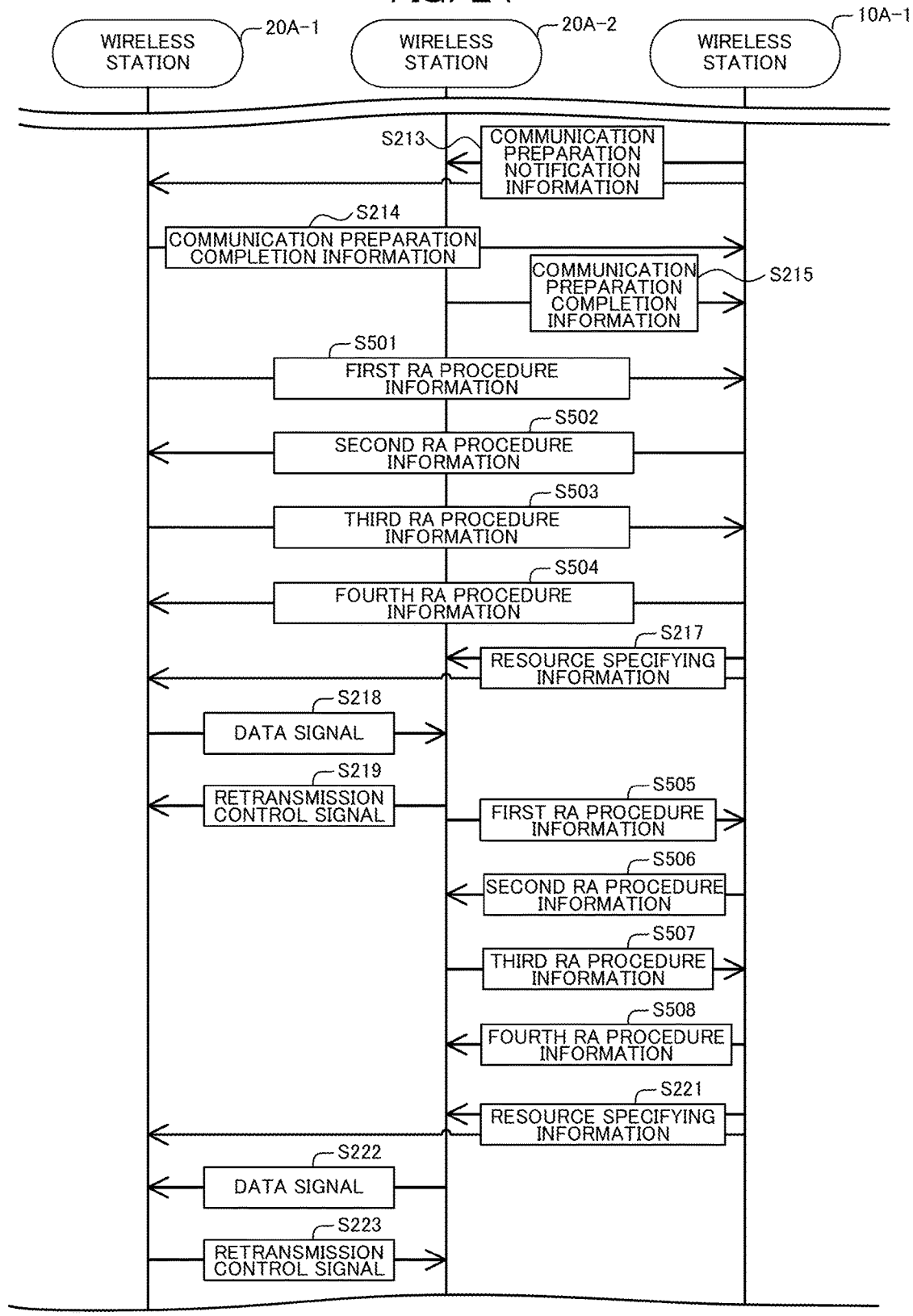
FIG. 24 is a sequence diagram illustrating an operation of a wireless communication system according to another example of a modification to the third embodiment.

As illustrated in FIG. 24, the wireless communication system 1A of the above-described third embodiment may be configured to carry out the process of steps S501 to S504 in place of the process of step S216 of FIG. 22, and to carry out the process of steps S505 to S508 in place of the process of step S220 of FIG. 22. The process of steps S501 to S504 constitute Contention Based Random Access Procedure, and also the process of steps S505 to A508 constitute Contention Based Random Access Procedure.

Specifically, upon transmission of the communication response procedure information (step S214 of FIG. 23), the wireless station 20A-1 transmits the first RA procedure information to the wireless station 10A-1 (step S501 of FIG. 24). The first RA procedure information is transmitted through the PRACH. Even in cases where the PUCCH is not allocated to the wireless station 20A-1, the wireless station 20A-1 can transmit the first RA procedure information.

Consequently, the wireless station 10A-1 receives the first RA procedure information from the wireless station 20A-1. In this case, the first RA procedure information is an example of the resource allocation request information.

Next, upon receipt of the first RA procedure information, the wireless station 10A-1 transmits the second RA procedure information to the wireless station 20A-1 (step S502 of FIG. 24). Consequently, the wireless station 20A-1 receives the second RA procedure information from the wireless station 10A-1.

Next, upon receipt of the second RA procedure information, the wireless station 20A-1 transmits the third RA procedure information to the wireless station 10A-1 (step S503 of FIG. 24). Accordingly, the wireless station 10A-1 receives the third RA information from the wireless station 20A-1.

Upon receipt of the third RA procedure information, the wireless station 10A-1 transmits the fourth RA procedure information to the wireless station 20A-1 (step S504 of FIG. 24). Accordingly, the wireless station 20A-1 receives the fourth RA procedure information from the wireless station 10A-1.

This random access procedure may optimize the wireless communication and may notify wireless station identifying information.

Alternatively, the wireless communication system 1A may execute Non-Contention Based Random Access Procedure in place of Contention Based Random Access Procedure performed in steps S501 to S504.

Upon transmission of the fourth RA procedure information, the wireless station 10A-1 transmits the resource specifying information individually to the wireless station 20A-1 and the wireless station 20A-2 (step S215 of FIG. 24).

Then the wireless station 20A-1 transmits a data signal to the wireless station 20A-2 (step S218 of FIG. 24). Responsively, the wireless station 20A-2 transmits, to the wireless station 20A-1, a retransmission control signal responsive to the data signal received from the wireless station 20A-1 (step S219 of FIG. 24).

After that, the wireless station 20A-2 transmits the first RA procedure information to the wireless station 10A-1 (step S505 of FIG. 24). The first RA procedure information is transmitted through the PRACH. This means that, even in cases where the PUCCH is not allocated to the wireless station 20A-2, the wireless station 20A-2 can transmit the first RA procedure information.

Consequently, the wireless station 10A-1 receives the first RA procedure information from the wireless station 20A-2. The first RA procedure information of this case is an example of a resource allocation request information.

Next, upon receipt of the first RA procedure information, the wireless station 10A-1 transmits the second RA procedure information to the wireless station 20A-2 (step S506 of FIG. 24). Accordingly, the wireless station 20A-2 receives the second RA procedure information from the wireless station 10A-1.

Next, upon receipt of the second RA procedure information, the wireless station 20A-2 transmits the third RA procedure information to the wireless station 10A-1 (step 507 of FIG. 24). Accordingly, the wireless station 10A-1 receives the third RA procedure information from the wireless station 20A-2.

Next, upon receipt of the third RA procedure information, the wireless station 10A-1 transmits the fourth RA procedure information to the wireless station 20A-2 (step S508 of FIG. 24). Consequently, the wireless station 20A-2 receives the fourth RA procedure information from the wireless station 10A-1.

This random access procedure may optimize the wireless communication and may notify wireless station identifying information.

Alternatively, the wireless communication system 1A may execute Non-Contention Based Random Access Procedure in place of Contention Based Random Access Procedure.

Upon transmission of the fourth RA procedure information, the wireless station 10A-1 transmits the resource specifying information individually to the wireless station 20A-1 and the wireless station 20A-2 (step S221 of FIG. 24).

After that, the wireless station 20A-2 transmits a data signal to the wireless station 20A-1 (step S222 of FIG. 24). Then, the wireless station 20A-1 transmits, to the wireless station 20A-2, a retransmission control signal responsive to the data signal received from the wireless station 20A-2 (step S223 of FIG. 24).

Figure 25:
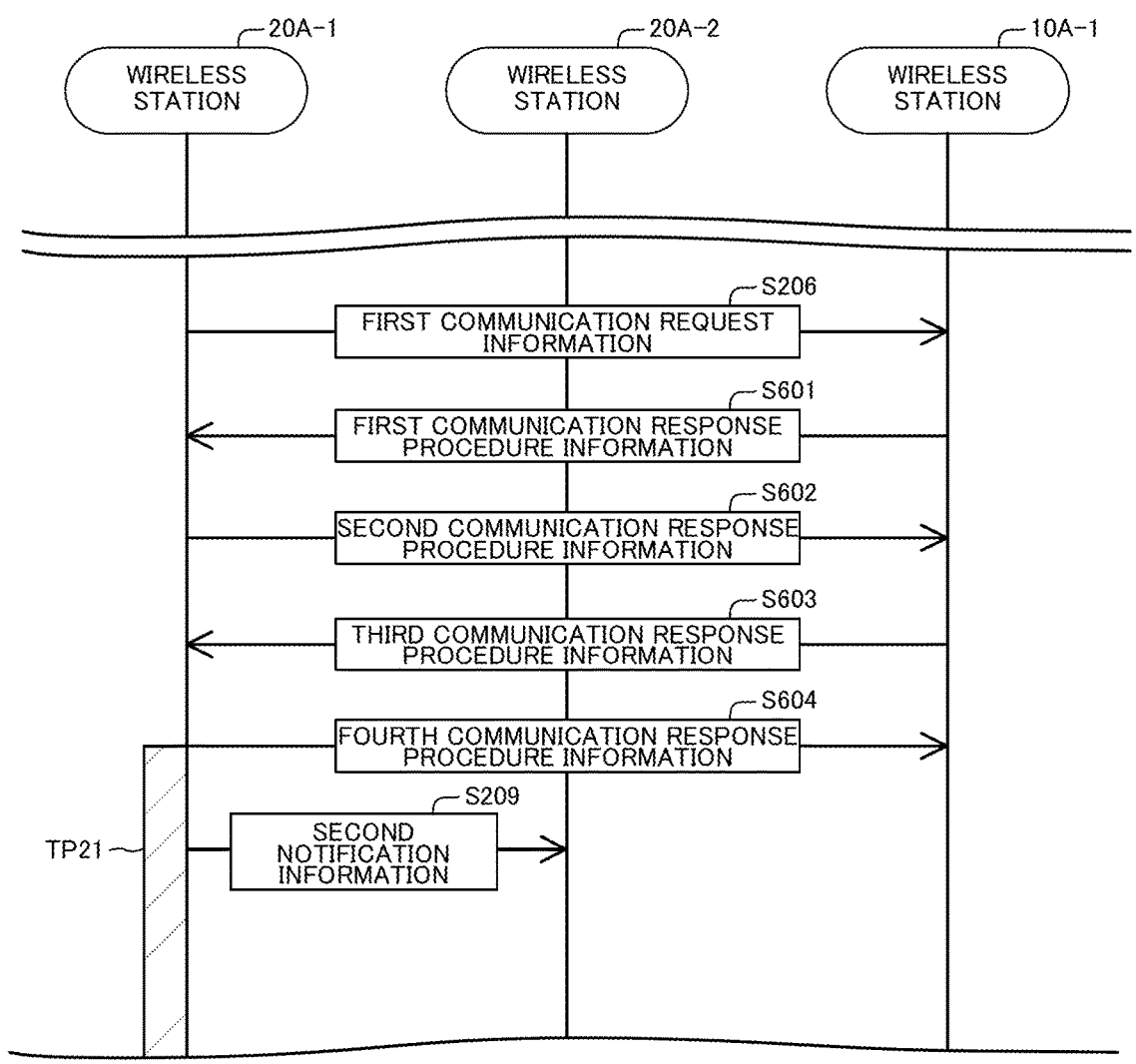
FIG. 25 is a sequence diagram illustrating an operation of a wireless communication system according to an example of an additional modification to the third embodiment.

As illustrated in FIG. 25, the wireless communication system 1A of the third embodiment may be configured to carry out the process of steps S601 to S604 in place of the process of steps S207 and S208 of FIG. 21. The process of steps S601 to S604 constitute the first communication response procedure.

Specifically, upon receipt of the first communication request information from the wireless station 20A-1 (step S206 of FIG. 25), the wireless station 10A-1 transmits the first communication response procedure information to the wireless station 20A-1 (step S601 of FIG. 25). In this example, the first communication response procedure information is a message called RRC D2D Setup. Accordingly, the wireless station 20A-1 receives the first communication response procedure information from the wireless station 10A-1.

Next, upon receipt of the first communication response procedure information from the wireless station 10A-1, the wireless station 20A-1 transmits second communication response procedure information to the wireless station 10A-1 (step S602 of FIG. 25). In this embodiment, the second communication response procedure information is a message called RRC D2D Setup Complete. Accordingly, the wireless station 10A-1 receives the second communication response procedure information from the wireless station 20A-1.

Then, upon receipt of the second communication response procedure information from the wireless station 20A-1, the wireless station 10A-1 transmits third communication response procedure information to the wireless station 20A-1 (step S603 of FIG. 25). In this example, the third communication response procedure information includes the transmission timing information. The third communication response procedure information here is a message called RRC Connection Reconfiguration. Accordingly, the wireless station 20A-1 receives the third communication response procedure information from the wireless station 10A-1. The third communication response procedure information of this case is an example of a first communication response information indicating the permission of the communication.

Upon receipt of the third communication response procedure information from the wireless station 10A-1, the wireless station 20A-1 transmits fourth communication response procedure information to the wireless station 10A-1 (step S604 of FIG. 25). In this example, the fourth communication response procedure information is a message called RRC Connection Reconfiguration Complete. Accordingly, the wireless station 10A-1 receives the fourth communication response procedure information from the wireless station 20A-1.

In this example, the transmission of the second notification information starts when the wireless station 20A-1 transmits the fourth communication response procedure information. Alternatively, the transmission of the second notification information may be started at the time point when the first communication response procedure information is received, at the time point when the second communication response procedure information is transmitted, or at the time point when the third communication response procedure information is received.

Likewise, the time period TP21 during which the wireless station 20A-1 is set to be in the direct communication standby state in this embodiment is started at the time point when the wireless station 20A-1 transmits the fourth communication response procedure information. Alternatively, the time period TP21 may be started at the time point when the first communication response procedure information is transmitted, at the time point the second communication response procedure information is transmitted, or the time point when the third communication response procedure information is received.

The wireless communication system 1A of the third embodiment may be configured to carry out, after the wireless station 10A-1 receives the second communication request information, the process of steps S601 to S604 of FIG. 25 in place of the process steps S211 and S212 of FIG. 21. In this case, the time period TP31 during which the wireless station 20A-2 is set to be in the direct communication standby state is preferably started at the time point when the wireless station 20A-2 transmits the fourth communication response procedure information. Alternatively, the time period TP31 may be started at the time point when the first communication response procedure information is received, at the time point when the second communication response procedure information is transmitted, or at the time point when the third communication response procedure information is received.

The wireless station 20A-1 and the wireless station 20A-2 of the wireless communication system 1A of the third embodiment may be configured not to transmit communication response procedure information to the wireless station 10A-1 in cases where the respective station receives the communication preparation notification information.

Here, the wireless communication system 1A of the third embodiment is configured to allocate wireless resource to the direct communication in conformity with the Dynamic Scheduling (DS) scheme. Alternatively, the wireless communication system 1A of the third embodiment may be configured to allocate wireless resource to the direct communication in conformity with the Semi-Persistent Scheduling (SPS) scheme.

Figure 26:
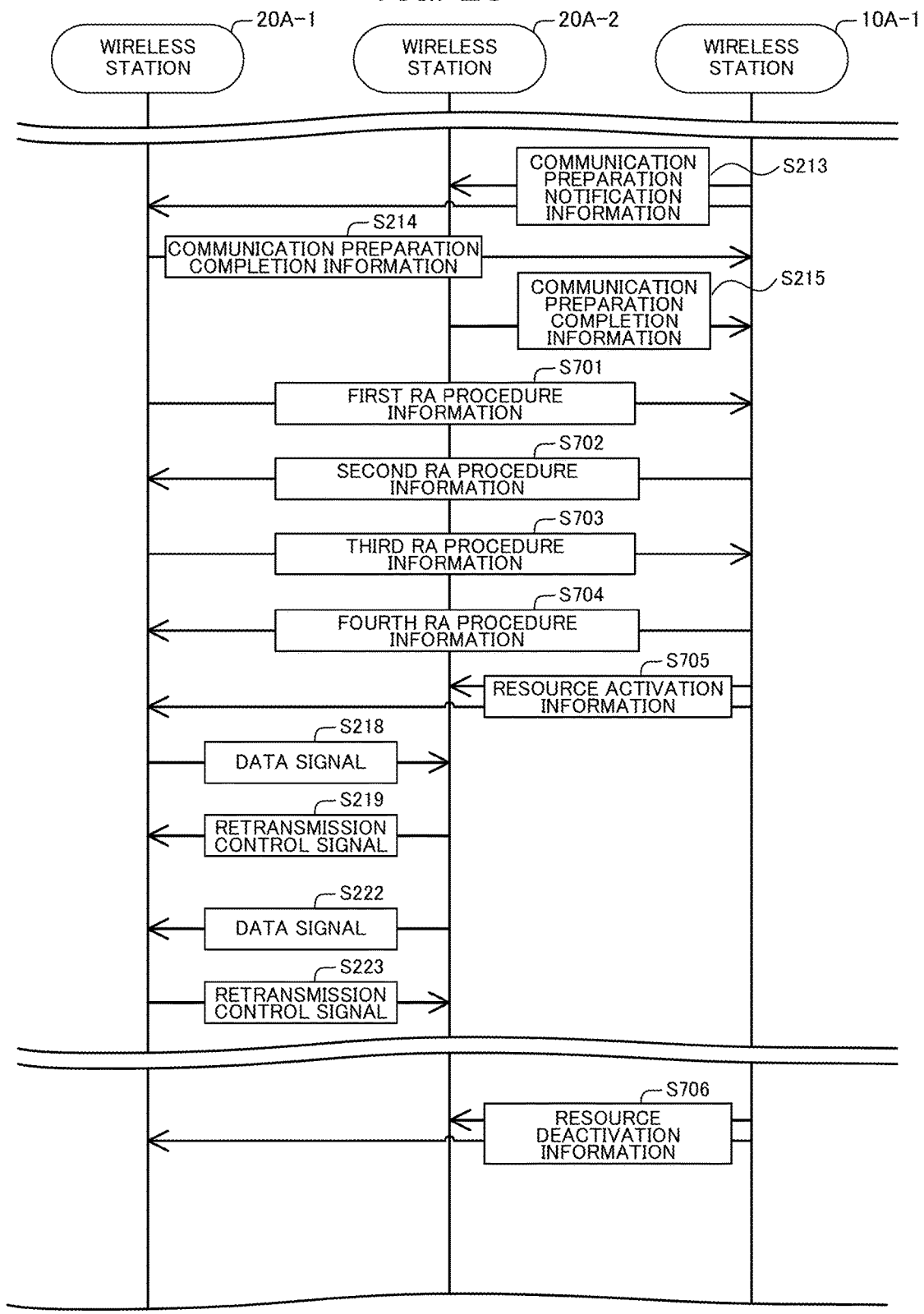
FIG. 26 is a sequence diagram illustrating an operation of a wireless communication system according to an example of a further modification to the third embodiment.

In this case, the wireless communication system 1A may be configured to, as illustrated in FIG. 26, carry out a process of steps S701 to S705 in place of the process of steps S216-S217 of FIG. 26; omit a process of steps S220 to S221 of FIG. 22; and further carry out a process of step S706 after step S223 of FIG. 22. The process of steps S701 to S704 constitute a Contention Based Random Access Procedure.

Specifically, when the communication response procedure information is transmitted (steps S214 and S215 of FIG. 26), the wireless communication system 1A transmits and receives the first to fourth RA procedure information (steps S701 to S704 of FIG. 26) likewise the steps S401 to S404 of FIG. 23.

Then the wireless station 10A-1 transmits resource activation information individually to the wireless station 20A-1 and the wireless station 20A-2 (step S705 of FIG. 26). The resource activation information indicates the permission for the use of the wireless resource allocated in conformity with the SPS scheme. In this embodiment, the resource activation information is a message called D2D-SPS activation.

Alternatively, the wireless communication system 1A may be set a time period during which the wireless resource allocated in conformity with the SPS scheme between step S215 and step S705. For example, the wireless station 10A-1 may transmit information representing the above time period individually to the wireless station 20A-1 and the wireless station 20A-2.

Then, the wireless station 20A-1 transmits a data signal to the wireless station 20A-2 (step S218 of FIG. 26). In succession, the wireless station 20A-2 transmits, to the wireless station 20A-1, a retransmission control signal responsive to the data signal received from the wireless station 20A-1 (step S219 of FIG. 26).

Then, the wireless station 20A-2 transmits a data signal to the wireless station 20A-1 (step S222 of FIG. 26). In succession, the wireless station 20A-1 transmits, to the wireless station 20A-2, a retransmission control signal responsive to the data signal received from the wireless station 20A-2 (step S223 of FIG. 26).

After that, the wireless station 10A-1 transmits resource deactivation information individually to the wireless station 20A-1 and the wireless station 20A-2 (step S706 of FIG. 26). The resource deactivation information indicates suspension (or stop) the use of the wireless resource allocated in conformity with the SPS scheme. The resource deactivation information of this embodiment is a message called D2D-SPS deactivation.

In the wireless communication system 1A of the third embodiment, the wireless station 20A-1 may finish the transmission of the first beacon signal at the time point when the state of the subject wireless station 20A-1 is changed from the direct communication standby state to the direct communication connection state. Similarly, the wireless station 20A-2 may finish the transmission of the first beacon signal at the time point when the state of the subject wireless station 20A-2 is changed from the direct communication standby state to the direct communication connection state.

Fourth Embodiment

Next, a wireless communication system of a fourth embodiment of the present invention will now be described.

The fourth embodiment may be regarded as a materialized example of the first or the second embodiment. The feature of the communication scheme of the first or the second embodiment can be used in combination with the method n to be disclosed in the fourth embodiment. The feature of the device disclosed in the first or the second embodiment is allowed to be incorporated in the device to be disclosed in the fourth embodiment.

The wireless communication system of the fourth embodiment is different from the wireless communication system of the third embodiment in the point that, in cases where the quality of the communication between the first wireless station and the second wireless station is low, the transmission of the second notification information is suspended. This means that, except for the above difference, the wireless communication system of the fourth embodiment is configured the same as that of the wireless communication system of the third embodiment. The following description will focus on the difference. Like reference numbers in the fourth embodiment designate the same or the substantially same parts and elements of the third embodiment.

Figure 27:
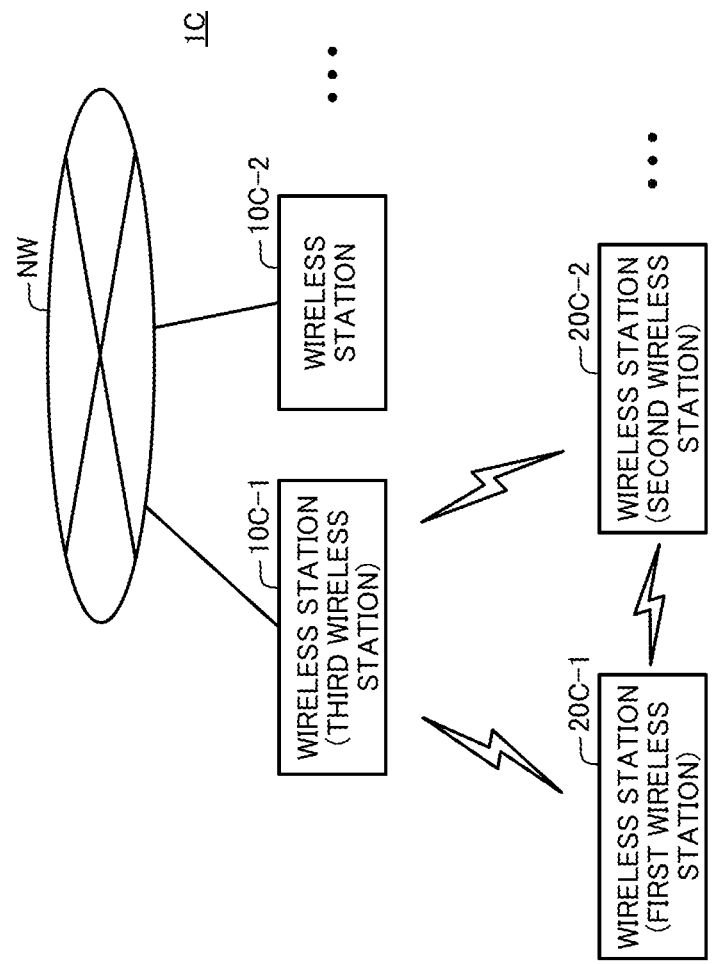
FIG. 27 is a diagram illustrating the configuration of a wireless communication system according to an example of a fourth embodiment.

As illustrated in FIG. 27, the wireless communication system 1C according to the fourth embodiment includes a wireless station 10C in place of the wireless station 10A of the third embodiment and also includes wireless stations 20C in place of the wireless stations 20A of the third embodiment. In this embodiment, the wireless station 20C-1 is an example of the first wireless station; the wireless station 20C-1 is an example of the second wireless station; and the wireless station 10C-1 is an example of the third wireless station.

Figure 28:
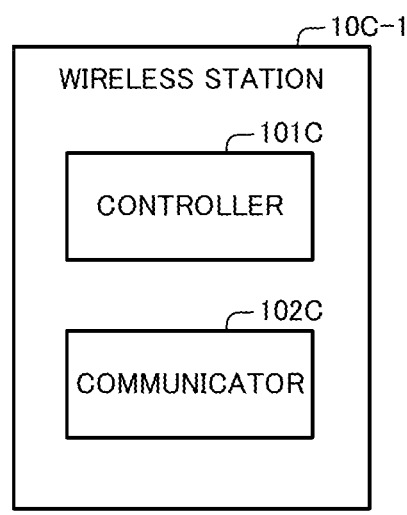
FIG. 28 is a diagram schematically illustrating a function of a third wireless station of an example of the fourth embodiment.

As illustrated in FIG. 28, the function of the wireless station 10C is a controller 101C and a communicator 102C respectively in place of the controller 101A and the communicator 102A of the wireless station 10A of the third embodiment. The controller 101C has the same function as the controller 101A except for the configuration to determine whether direct communication quality is lower than a predetermined threshold. The communicator 102C has the same function as the communicator 102A except for the configuration to transmit measurement instruction information and transmit communication setting information. The above differences are to be detailed below.

Figure 29:
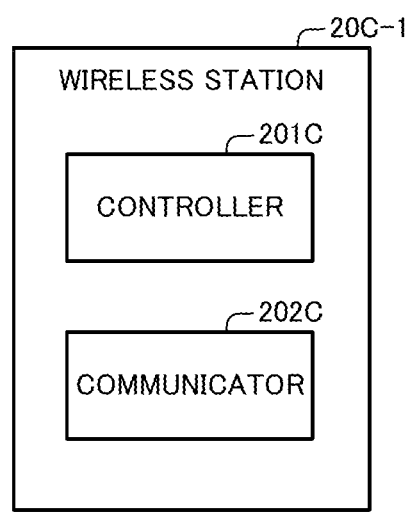
FIG. 29 is a diagram schematically illustrating a function of a first wireless station of an example of the fourth embodiment.

As illustrated in FIG. 29, the function of the wireless station 20C-1 is a controller 201C and a communicator 202C respectively in place of the controller 201A and the communicator 202A of the function of the wireless station 20C-1 (sic, correctly 20A-1) of the third embodiment. The controller 201C is the same as the controller 201A except for the function to measure direct communication quality. The communicator 202C has the same function as the communicator 202A except for the point of transmitting communication quality information, instruction response information, and setting response information and the point of the difference in condition to transmit the second notification information. The above differences will be detailed below.

Figure 30:
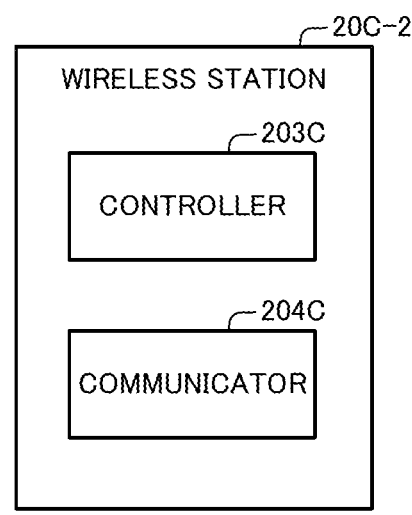
FIG. 30 is a diagram schematically illustrating a function of a first wireless station of an example of the fourth embodiment.

As illustrated in FIG. 30, the function of the wireless station 20C-2 is a controller 203C and a communicator 204C respectively in place of the controller 203A and the communicator 204A of the function of the wireless station 20C-2 (sic, correctly 20A-2) of the third embodiment. The controller 203C is the same as the controller 203A except for the function to measure the direct communication quality. The communicator 204C has the same function as the communicator 204A except for the point of transmitting communication quality information, instruction response information, and setting response information. The above differences will be detailed below.

Hereinafter, description will now be made in relation to the above differences.

Upon receipt of the first request completion information, the communicator 102C transmits measurement instruction information (measure control) to instruct to measure the direct communication quality individually to the wireless station 20C-1 and the wireless station 20C-2. On the other hand, the communicator 102C does not transmit measurement instruction information unless receiving the first request completion information.

The direct communication quality represents the quality of direct communication between the wireless station 20C-1 and the wireless station 20C-2. The measurement instruction information instructs to determine the setting to measure the direct communication quality. In this embodiment, the measurement instruction information is a message called RRC Connection Reconfiguration. The measurement instruction information may include the transmission timing information.

Examples of the direct communication quality are a Channel Quality Indicator (CQI), Reference Signal Received Power (RSRP), a Signal to Interference plus Noise Power Ratio (SINR), a Path Loss, and Reference Signal Received Quality (RSRQ). Alternatively, the direct communication quality is an arbitrary combination including two or more of RSRP, SINR, Path Loss, CQI, and RSRQ.

Upon receipt of the measurement instruction information from the wireless station 10C-1, the communicator 202C transmits the instruction response information. The instruction response information indicates that the setting to measure the direct communication quality is completed. The instruction response information of this embodiment is a message called RRC Connection Reconfiguration Complete.

Furthermore, upon receipt of the measurement instruction information from the wireless station 10C-1, the controller 201C repeatedly measures the direct communication quality each time a predetermined first measuring period elapses. Specifically, the controller 201C measures the direct communication quality on the basis of the second beacon signal transmitted from the wireless station 20C-2.

In this embodiment, the time period during which the first beacon signal is transmitted is started at the time point when the wireless station 20C-1 receives the measurement instruction information from the wireless station 10C-1. Alternatively, the time period may be started the time point after a predetermined time from the time point when the measurement instruction information is received, the time point when the wireless station 20C-1 transmits the first request completion information, or the time point when the wireless station 20C-1 receives the first communication response information.

The communicator 202C transmits communication quality information representing the measured direct communication quality to the 10C-1 each time the controller 201C measures the direct communication quality.

Likewise the communicator 202C, upon receipt of the measurement instruction information, the communicator 204C transmits the instruction response information to the wireless station 10C-1.

Further, if receiving the measurement instruction information from the wireless station 10C-1, the controller 203C repeatedly measures the direct communication quality each time a predetermined second measuring period elapses. Specifically, the controller 203C measures the direct communication quality on the basis of the first beacon signal transmitted from the wireless station 20C-1.

In this embodiment, the time period during which the second beacon signal is transmitted is started when the wireless station 20C-2 receives the measurement instruction information from the wireless station 10C-1. Alternatively, the time period may be started at a predetermined time after the time point when the wireless station 20C-2 receives the measurement instruction information.

The communicator 204C transmits communication quality information representing the measured direct communication quality each time when the controller 203C measures the direct communication quality.

If receiving communication quality information from the wireless station 20C-1 and the wireless station 20C-2, the controller 101C determines whether the direct communication quality represented by the received communication quality information is lower than the predetermined threshold. In cases where the direct communication quality is lower than the threshold, the communicator 102C transmits communication setting information indicating the suspension of the direct communication individually to the wireless station 20C-1 and the wireless station 20C-2. The communication setting information instructs to make setting as to whether the direct communication is to be carried out. The communication setting information indicating the suspension of the direct communication can be regarded as information that instructs the suspension of the transmission of the second notification information.

The communication setting information of this embodiment is a message called RRC Connection Reconfiguration.

On the other hand, if the direct communication quality is higher than the threshold, the communicator 102C transmits communication setting information indicating the permission for the direct communication individually to the wireless station 20C-1 and the wireless station 20C-2. The communication setting information indicating the permission for the direct communication can be regarded as information permitting for the transmission of the second notification information.

Upon receipt of the communication setting information from the wireless station 10C-1, the communicator 202C transmits setting response information to the wireless station 10C-1. The setting response information indicates that the setting as to whether the direct communication is completed. In this embodiment, the setting response information is a message called RRC Connection Reconfiguration Complete.

If receiving the communication setting information from the wireless station 10C-1, the communicator 204C transmits, likewise the communicator 202C, the setting response information to the wireless station 10C-1.

In this embodiment, if receiving both the first communication response information and the communication setting information indicating the permission for the direct communication from the wireless station 10C-1, the communicator 202C transmits the second notification information to the wireless station 20C-2 at the transmission timing obtained by the controller 201C. In contrast, if not receiving at least one of the first communication response information and the communication setting information indicating the permission for the direct communication from the wireless station 10C-1, the communicator 202C does not transmit the second notification information.

(Operation)

Next, the description will now be made in relation to the wireless communication system 1C with reference to FIG. 31.

This embodiment assumes the positions of the wireless station 20C-1 and the wireless station 20C-2 are included in the cell that the wireless station 10C-1 has and both wireless station 20C-1 and the wireless station 20C-2 are connected to the wireless station 10C-1.

Figure 31:
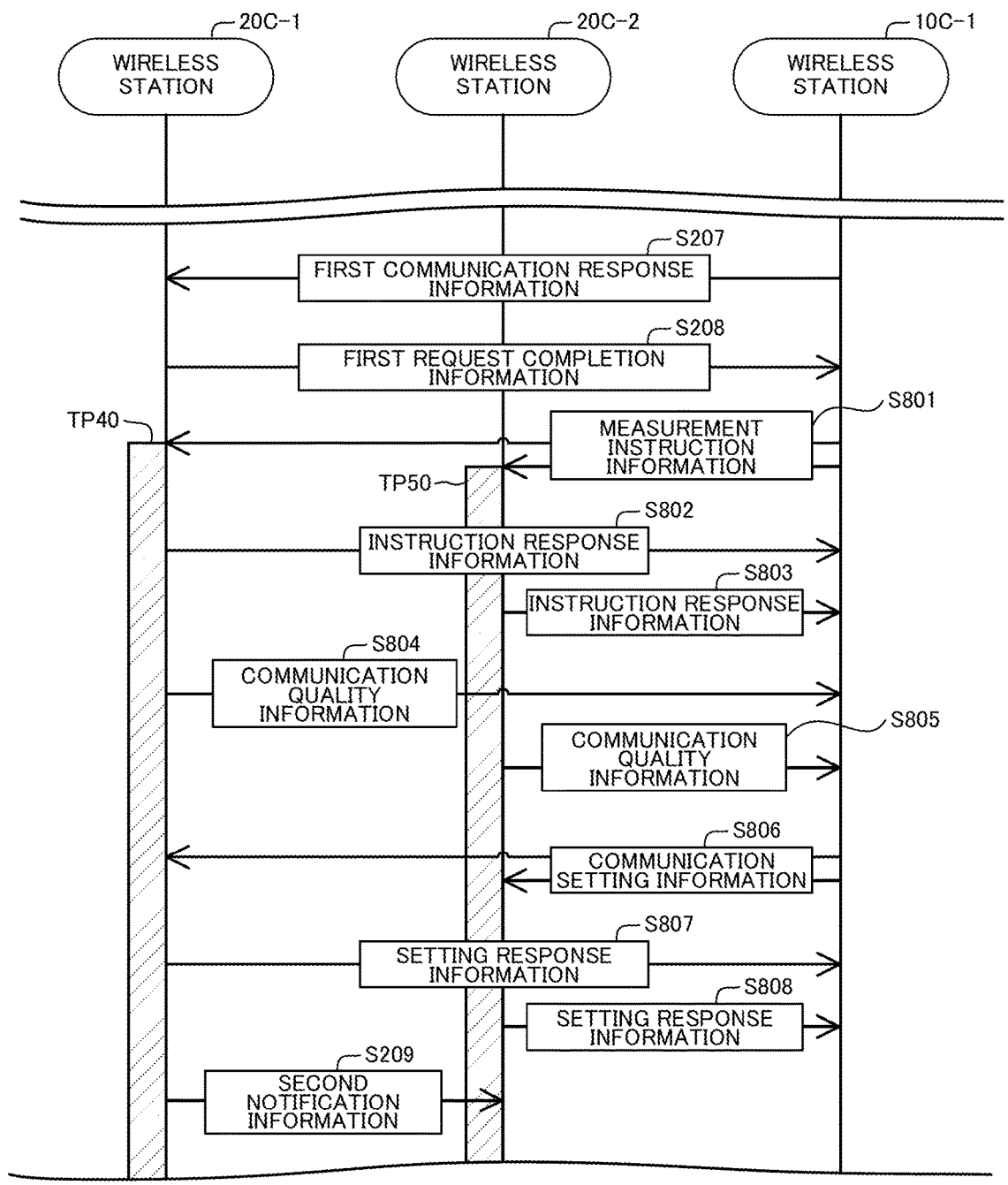
FIG. 31 is a sequence diagram illustrating an operation of a wireless communication system of an example of the fourth embodiment.

In this case, upon receipt of the first request completion information (step S208 of FIG. 31), the wireless station 10C-1 transmits the measurement instruction information individually to the wireless station 20C-1 and the wireless station 20C-2 (step S801 of FIG. 31). Thereby, the wireless station 20C-1 and the wireless station 20C-2 each receive the measurement instruction information from the wireless station 10C-1.

In this case, the wireless station 20C-1 starts the transmission of the first beacon signal at the time point when measurement instruction information is received from the wireless station 10C-1 (step S801 of FIG. 31). Specifically, the wireless station 20C-1 repeatedly transmits the first beacon signal each time a predetermined second transmission period elapses in a time period TP40.

Likewise, the wireless station 20C-2 starts the transmission of the second beacon signal at the time when the measurement instruction information is received from the wireless station 10C-1 (step S801 of FIG. 31). Specifically, the wireless station 20C-2 repeatedly transmits the second beacon signal each time a predetermined third transmission period elapses in a time period TP50.

The wireless station 20C-1 then transmits the instruction response information to the wireless station 10C-1 (step S802 of FIG. 31). Likewise, the wireless station 20C-2 transmits the instruction response information to the wireless station 10C-1 (step S803 of FIG. 31).

The wireless station 20C-1 may start the transmission of the first beacon signal at the time when transmitting the instruction response information. Likewise, the wireless station 20C-2 may start the transmission of the second beacon signal at the time when transmitting the instruction response information.

Then, the wireless station 20C-1 measures the direct communication quality on the basis of the second beacon signal transmitted from the wireless station 20C-2 and transmits the communication quality information representing the measured direct communication quality to the wireless station 10C-1 (step S804 of FIG. 31). Likewise, the wireless station 20C-2 measures the direct communication quality on the basis of the first beacon signal transmitted from the wireless station 20C-1 and transmits the communication quality information representing the measured direct communication quality to the wireless station 10C-1 (step S805 of FIG. 31).

Consequently, the wireless station 10C-1 receives the communication quality information from each of the wireless station 20C-1 and the wireless station 20C-2. Then, the wireless station 10C-1 determines whether the direct communication quality represented by the received communication quality information is lower than the predetermined threshold.

If the direct communication quality is higher than the threshold, the wireless station 10C-1 transmits communication setting information indicating the permission for the direct communication individually to the wireless stations 20C-1 and 20C-2 (step S806 of FIG. 31).

Then, the wireless station 20C-1 transmits setting response information to the wireless station 10C-1 (step S807 of FIG. 31). Likewise, the wireless station 20C-2 transmits setting response information to the wireless station 10C-1 (step S808 of FIG. 31).

Then, the wireless station 20C-1 starts the transmission of the second notification information to the wireless station 20C-2 (step S209 of FIG. 31).

In contrast, if the direct communication quality is lower than the threshold, the wireless station 10C-1 transmits communication setting information indicating the suspension of the direct communication individually to the wireless stations 20C-1 and 20C-2. Consequently, the wireless station 20C-1 receives the communication setting information representing the suspension of the direct communication from the wireless station 10C-1. In this event, the wireless station 20C-1 does not transmit the second notification information to the wireless station 20C-2, which means that the direct communication is not carried out.

As described above, the wireless communication system 1C of the fourth embodiment attains the same effects and advantages as those of the wireless communication system 1A of the third embodiment.

Furthermore, in the wireless communication system 1C of the fourth embodiment, the wireless stations 20C-1 and 20C-2 each measure the direct communication quality and transmit communication quality information representing the measured direct communication quality to the wireless station 10C-1. Furthermore, if the received communication quality information received by the wireless station 10C-1 indicates the direct communication quality information being lower than the predetermined threshold, the wireless station 10C-1 transmits the communication setting information indicating the suspension of the direct communication to the wireless station 20C-1.

Consequently, in cases where the direct communication quality is lower than the threshold, it is possible to avoid execution of the direct communication.

In the wireless communication system 1C of the fourth embodiment, the wireless station 20C-1 may be configured not to transmit, if receiving the measurement instruction information, the instruction response information to the wireless station 10C-1. Likewise, the wireless station 20C-2 may be configured not to transmit, if receiving the measurement instruction information, the instruction response information to the wireless station 10C-1.

The reception of the measurement instruction information at the wireless station 20C-2 (step S801) may be regarded as a trigger for the need of starting the direct communication at the wireless station 20C-2. Specifically, receipt of the measurement instruction information starts controlling the wireless stations 20C-1 and 20C-2 to carry out the direct communication therebetween.

Here, it is assumed that the direct communication is carried out at the uplink frequency that the wireless station 10C-1 uses. In this case, the wireless station 20C-1 monitors at the uplink frequency of the wireless station 10C-1, a signal that the wireless station 20C-2 transmits. In other words, the wireless station 20C-1 switches the frequency band to be monitored by the receiver (i.e., RF processor) from the downlink frequency to the uplink frequency. On the other hand, the wireless station 20C-2 switches the frequency band to be monitored by the receiver (i.e., RF processor) from the downlink frequency band to the uplink frequency band. The process of step S801 may be used as the trigger for this switching.

The above switching of the frequency band is not limited to being triggered by the process of step S801. For example, the control by the wireless station 10C-1 to carry out the direct communication may be triggered by another signal in the neighborhood of step S801. Examples of the signal are an L1 control signal (PDCCH) that activates the direct communication, an L2 control signal (MAC Control Element, RLC Control Element, PDCP Control PDU), an L3 control signal (RRC signaling), and the report information.

In the wireless communication system 1C of the fourth embodiment, both the wireless stations 20C-1 and 20C-2 are configured to measure the direct communication quality. Alternatively, either the wireless stations 20C-1 or 20C-2 may be configured to measure the direct communication quality.

The wireless station 10C-1 of the wireless communication system 1C of the fourth embodiment is configured to transmit communication setting information individually to the wireless stations 20C-1 and 20C-2. Alternatively, the wireless station 10C-1 may be configured to transmit the communication setting information only to the wireless station 20C-1, which is the sender of the first communication request information.

Alternatively, the wireless communication system 1C may be configured to determine, on the basis of the direct communication quality measured by multiple time points, whether the second notification information is to be transmitted. For example, the wireless communication system 1C may determine the transmission of the second notification information on the basis of whether the average of direct communication quality measured at multiple time points is lower than the threshold.

Further alternatively, the wireless communication system 1C of the fourth embodiment may be configured that the wireless station 10C-1, in place of the wireless station 20C-1, transmits the second notification information to the wireless station 20C-2.

Fifth Embodiment

Next, description will now be made in relation to a wireless communication system according to a fifth embodiment.

The fifth embodiment may be regarded as a materialized example of the first or the second embodiment. The feature of the communication scheme of the first or the second embodiment can be used in combination with the method to be disclosed in the fifth embodiment. The feature of the device disclosed in the first or the second embodiment is allowed to be incorporated in the device to be disclosed in the fifth embodiment.

The wireless communication system of the fifth embodiment is different from the wireless communication system of the third embodiment in the point that, in cases where the quality of the communication between the first wireless station and the second wireless station is low, the transmission of the second notification information is suspended. This means that, except for the above difference, the wireless communication system of the fifth embodiment is configured the same as that of the wireless communication system of the third embodiment. The following description will focus on the difference. Like reference numbers in the fifth embodiment designate the same or the substantially same parts and elements of the third embodiment.

Figure 32:
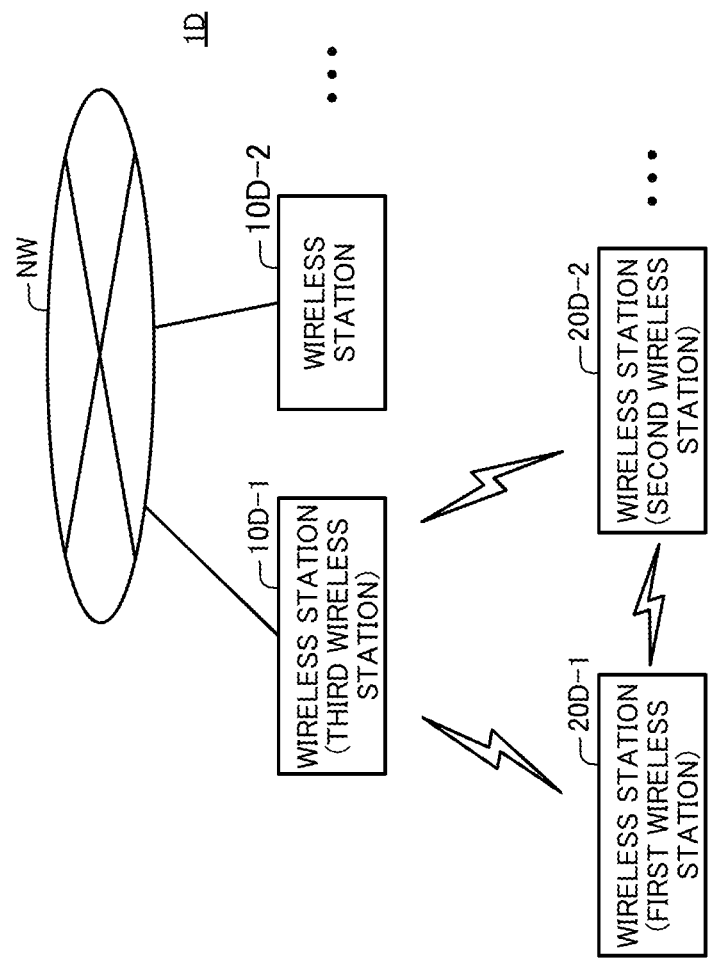
FIG. 32 is a diagram illustrating the configuration of a wireless communication system according to an example of a fifth embodiment.

As illustrated in FIG. 32, the wireless communication system 1D according to the fifth embodiment includes a wireless station 10D in place of the wireless station 10A of the third embodiment, and also includes wireless stations 20D in place of the wireless stations 20A. In this embodiment, the wireless station 20D-1 is an example of the first wireless station; the wireless station 20D-1 is an example of the second wireless station; and the wireless station 10D-1 is an example of the third embodiment.

Figure 33:
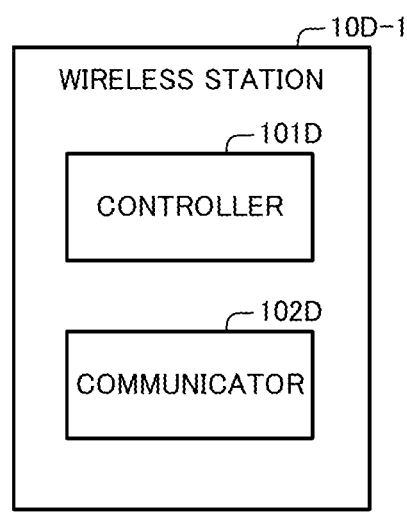
FIG. 33 is a diagram schematically illustrating a function of a third wireless station of an example of the fifth embodiment.

As illustrated in FIG. 33, the function of the wireless station 10D is a controller 101D and a communicator 102D respectively in place of the controller 101A and the communicator 102A of the wireless station 10A of the third embodiment. The controller 101D has the same function as the controller 101A. The communicator 102D has the same function as the communicator 102A except for the configuration to transmit the second notification information. The above differences are to be detailed below.

Figure 34:
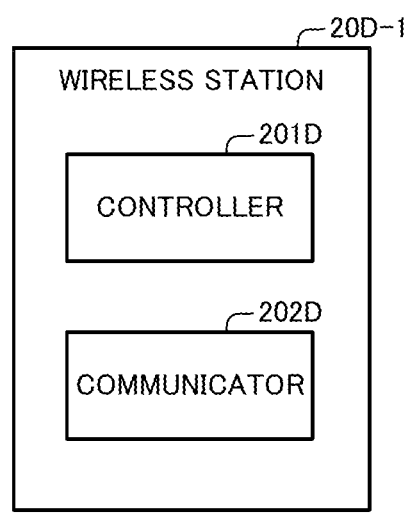
FIG. 34 is a diagram schematically illustrating a function of a first wireless station of an example of the fifth embodiment.

As illustrated in FIG. 34, the function of the wireless station 20D-1 is a controller 201D and a communicator 202D respectively in place of the controller 201A and the communicator 202A of the function of the wireless station 20D-1 (sic, correctly 20A-1) of the third embodiment. The controller 201D is the same as the controller 201A. The communicator 202D has the same function as the communicator 202A except for the point of not transmitting the second notification information. The above differences will be detailed below.

Figure 35:
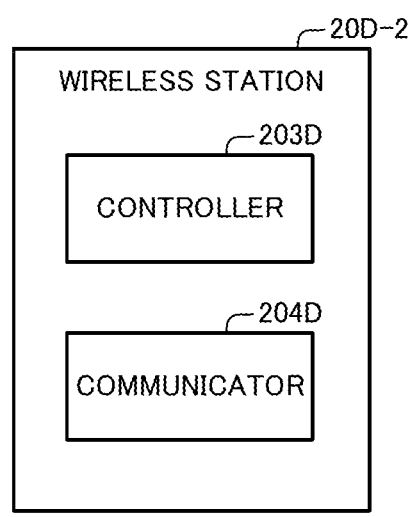
FIG. 35 is a diagram schematically illustrating a function of a second wireless station of an example of the fifth embodiment.

As illustrated in FIG. 35, the function of the wireless station 20D-2 is a controller 203D and a communicator 204D respectively in place of the controller 203A and the communicator 204A of the function of the wireless station 20D-2 (sic, correctly 20A-2) of the third embodiment. The controller 203D is the same as the controller 203A. The communicator 204D has the same function as the communicator 204A.

Hereinafter, description will now be detailed in relation to the above differences.

Upon receipt of the first request completion information, the communicator 102D transmits the second notification information to the wireless station 20D-2 at the transmission timing obtained by the controller 101D for the wireless station 20D-2. In this embodiment, the communicator 102D does not transmit the transmission timing information to the wireless station 20D-1.

As illustrated in FIG. 36, the second notification information of this embodiment includes flag information indicating whether the second notification information is a paging signal to carry out the direct communication. The flag information may be regarded as information indicating whether the wireless station 10D-1 triggers the paging. In this embodiment, the flag information is information called d2d-indication.

In this embodiment, the communicator 102D transmits a paging signal as the second notification information for the direct communication to the wireless station 20D-2 without being instructed to transmit the paging signal by a superordinate exchanger or an MME (which means that the superordinate exchanger or the MME triggers the paging).

Specifically, during a time from the receipt of the first request completion information to a predetermined transmission finishing time point, the communicator 102D repeatedly transmits the second notification information to the wireless station 20D-2 each time a predetermined first time period elapses. The predetermined transmission finishing time point of this embodiment is a time point when the second communication request information is received from the wireless station 20D-2.

The predetermined transmission finishing time point may be set by the wireless station 10D-1 or may be predetermined by the communication standard.

The communicator 102D may measure the time that has elapsed since the first request completion information has been received or since the transmission of the second notification information has been started and use the time point when the measured time comes to be equal to or more than a predetermined threshold as the transmission finishing time point.

Even in cases where receiving the first communication response information indicting the permission for the direct communication from the wireless station 10D-1, the wireless station 20D-2 does not transmit the second notification information.

(Operation)

Next, description will now be made in relation to the above wireless communication system 1D with reference to FIG. 37.

This embodiment assumes the positions of the wireless station 20D-1 and the wireless station 20D-2 are included in the cell that the wireless station 10D-1 has and both wireless station 20D-1 and the wireless station 20D-2 are connected to the wireless station 10D-1.

Figure 37:
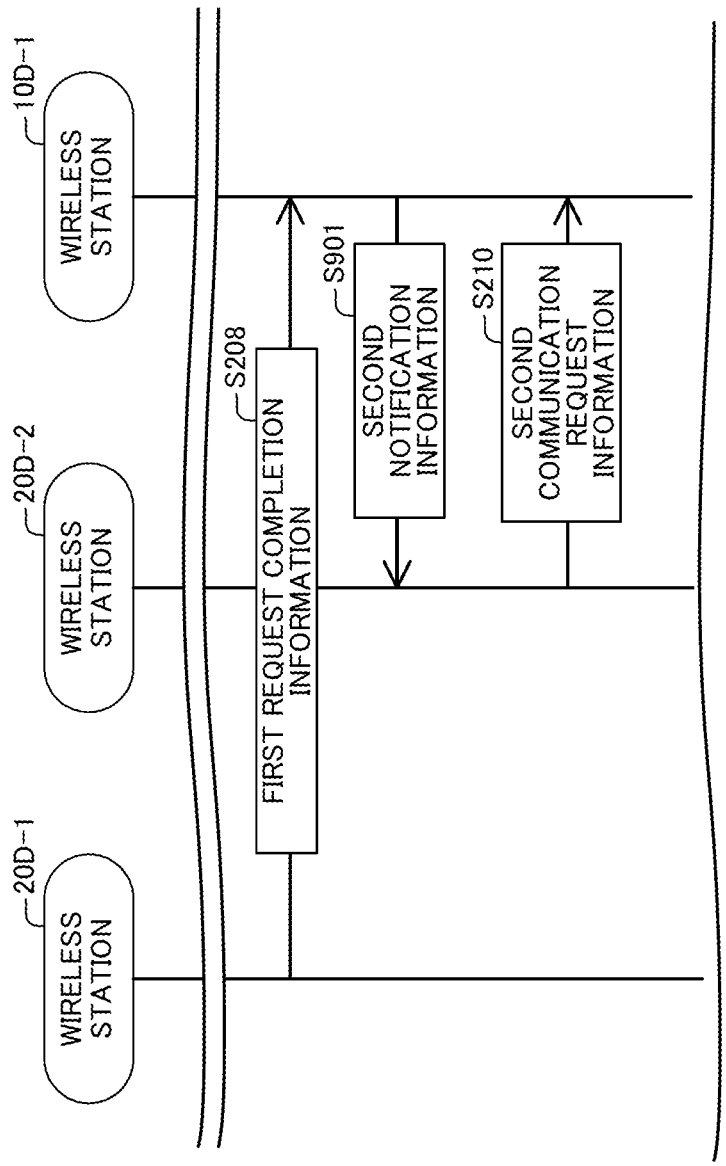
FIG. 37 is a sequence diagram illustrating an operation of a wireless communication system of an example of the fifth embodiment.

In this case, upon receipt of the first request completion information (step S208 of FIG. 37), the wireless station 10D-1 starts the transmission of the second notification information (step S901 of FIG. 37).

Specifically, the wireless station 10D-1 repeatedly transmits the second notification to the wireless station 20D-2 at the obtained transmission timing each time a predetermined first transmission period elapses until the above transmission finishing time point comes. In this embodiment, the transmission of the second notification information is started at the time point when the wireless station 10D-1 receives the first request completion information. Alternatively, the transmission of the second notification information may be started at a predetermined time after the time point when the wireless station 10D-1 receives the first request completion information, or may be started at the time point when the first communication response information indicating the permission for the direct communication is transmitted.

Consequently, the wireless station 20D-2 receives the second notification information. Upon receipt of the second notification information, the wireless station 20D-2 transmits the second communication request information to the wireless station 10D-1 (step S210 of FIG. 37). After that, the wireless communication system 1D carries out the same process of step S211 and the subsequent steps of FIG. 21.

In order to execute the direct communication, the distance (proximity) between the wireless station 20D-1 and the wireless station 20D-2 need to be measured. For this purpose, it is preferred that the wireless communication system 1D measures the direct communication quality between the process of step S208 and the process of step S901 and determines whether the direct communication is executable on the basis of the result of measurement. The direct communication quality represents the quality of direct communication between the wireless station 20D-1 and the wireless station 20D-2.

Further in this case, it is preferred that the wireless communication system 1D transmits the second notification information in cases where the measured direct communication quality is equal to or higher than the threshold but does not transmit the second notification information in cases where the measured direct communication quality is lower than the threshold.

As described above, the wireless communication system 1D of the fifth embodiment ensures the same effects and advantages as those of the wireless communication system 1A of the third embodiment.

In addition, since the wireless station 20D-1 does not have to transmit the second notification information, the electric power that the wireless station 20D-1 consumes can be reduced.

Sixth Embodiment

Next, description will now be made in relation to a wireless communication system of the sixth embodiment.

The sixth embodiment may be regarded as a materialized example of the first embodiment. The feature of the communication scheme of the first embodiment can be used in combination with the method to be disclosed in the sixth embodiment. The feature of the device disclosed in the first embodiment is allowed to be incorporated in the device to be disclosed in the sixth embodiment.

The wireless communication system of the sixth embodiment is different from the wireless communication system of the second embodiment in the point that, in cases where the second wireless station is connected to a fourth wireless station, which is different from the third wireless station connected to the first wireless station, the first wireless station obtains the transmission timing to the second wireless station. The wireless communication system of the sixth embodiment is configured the same as wireless communication system except for the above difference. Hereinafter, the description will focus on the difference. Like reference numbers in the sixth embodiment designate the same or the substantially same parts and elements of the second embodiment.

Figure 38:
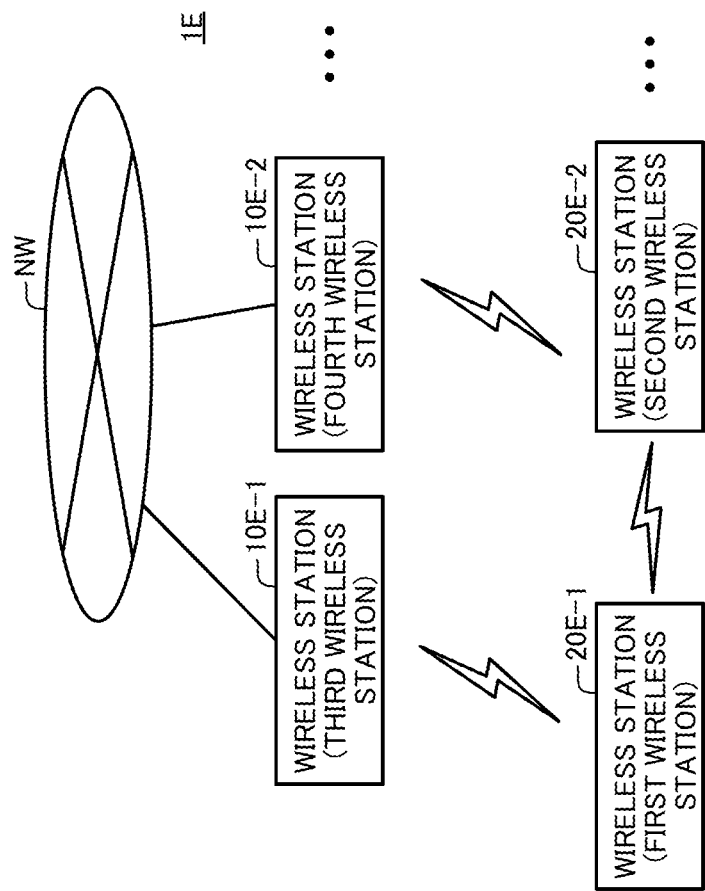
FIG. 38 is a diagram illustrating the configuration of a wireless communication system according to an example of a sixth embodiment.

As illustrated in FIG. 38, a wireless communication system 1E of the sixth embodiment includes wireless stations 10E in place of the wireless stations 10 of the second embodiment and also includes wireless station 20E in place of the wireless stations 20 of the second embodiment. In this example, a wireless station 20E-1 is an example of the first wireless station; a wireless station 20E-2 is an example of the second wireless station; a wireless station 10E-1 is an example of the third wireless station; and the wireless station 10E-2 is an example of a fourth wireless station.

An example of each wireless station 10E is a base station. Each wireless station 10E may be called a wireless device. An example of each wireless station 20E is a terminal. Another example of each wireless station 20E is a mobile station. Each wireless station 20E may be called a wireless terminal or a user terminal. Examples of a terminal are devices such as a mobile phone, a smart phone, and a meter (measure). The terminal may be carried by the user or may be carried by or installed in a mobile article such as a vehicle.

Figure 39:
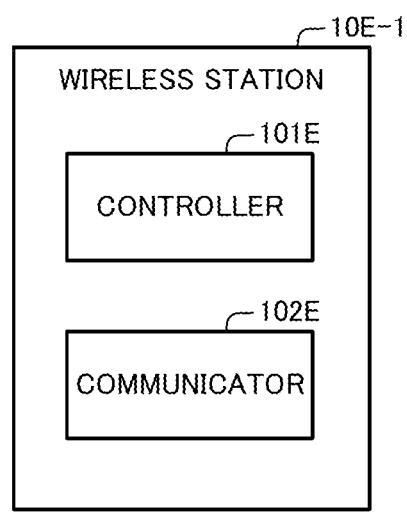
FIG. 39 is a diagram illustrating the configuration of a third wireless station of an example of the sixth embodiment.

As illustrated in FIG. 39, the wireless station 10E-1 has functions of a controller 101E and a communicator 102E respectively in place of the controller 101 and the communicator 102 of the wireless station 10 of the second embodiment.

The controller 101E has the same function as the controller 101. The communicator 102E has the same function as the communicator 102 except for the point that the communicator 102E transmits and receives fundamental information to and from the wireless stations 10E-2, . . . except for the local wireless station 10E-1. The difference will be detailed below.

Figure 40:
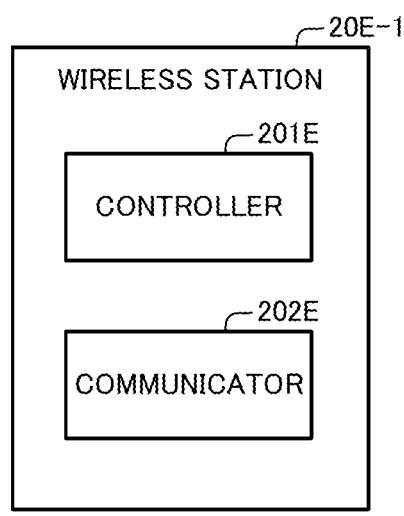
FIG. 40 is a diagram illustrating the configuration of a first wireless station of an example of the sixth embodiment.

As illustrated in FIG. 40, the wireless station 20E-1 has the functions of a controller 201E and a communicator 202E respectively in place of the controller 201 and the communicator 202 of the wireless station 20E-1 (sic, correctly 20) of the second embodiment. The controller 201E has the same function as the controller 201 and the communicator 202E has the same function as the communicator 202.

Figure 41:
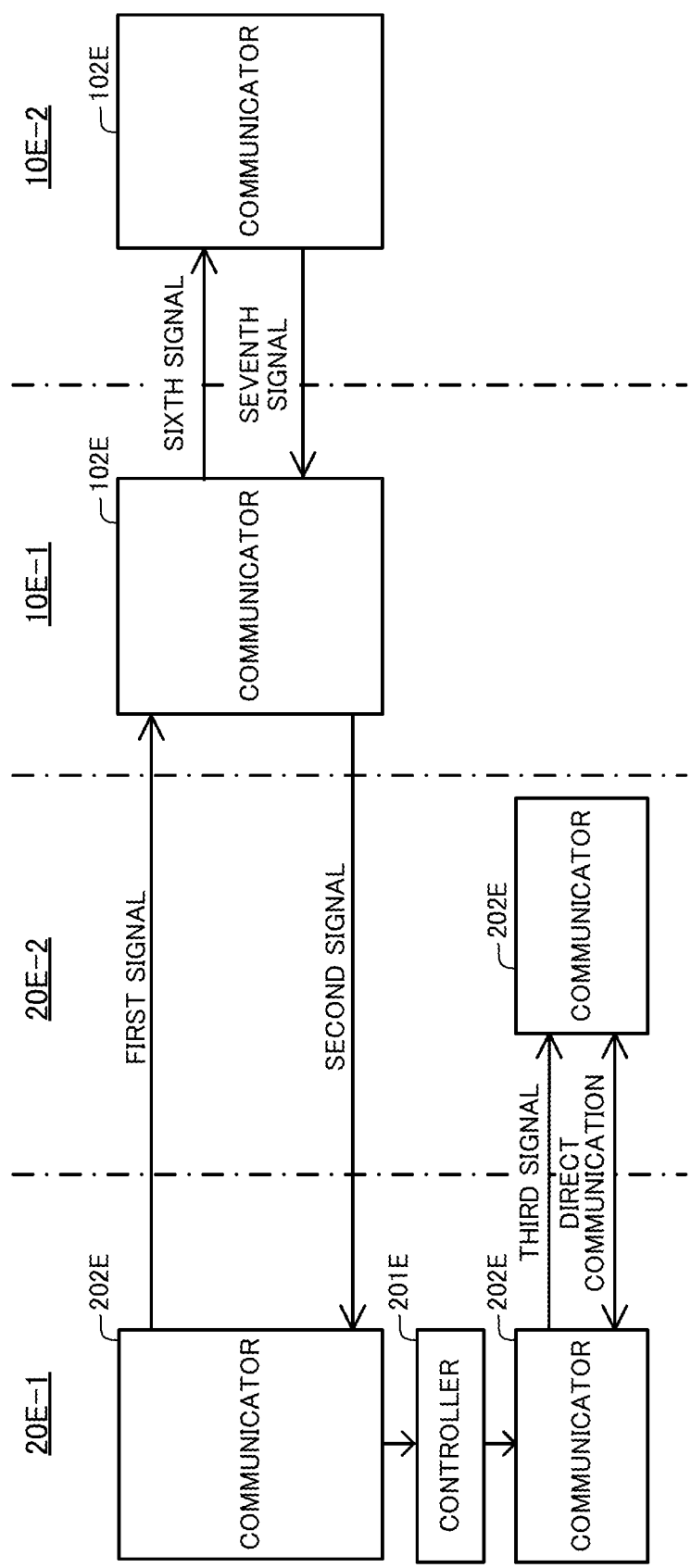
FIG. 41 is a diagram schematically illustrating a function of a wireless communication system of an example of the sixth embodiment.

Hereinafter, description will now be made in relation to the operation of the wireless communication system 1E with reference FIGS. 41 and 42 for understanding the function of wireless communication system 1E.

This embodiment assumes that the wireless station 20E-1 is communicably connected to the wireless station 10E-1 and the wireless station 20E-2 is communicably connected to the wireless station 10E-2.

Upon receipt of a first signal (step S101 of FIG. 42), the communicator 102E of the wireless station 10E-1 transmits a sixth signal to the wireless station 10E-2, to which the wireless station 20E-2 identified by the wireless station identifying information included in the first signal (step S105 of FIG. 42) is connected. The sixth signal requests the direct communication between the wireless station 20E-1 and the wireless station 20E-2, and may be referred to as fourth communication request information. In this embodiment, the sixth signal includes wireless station identifying information to identify the wireless station 20E-2. In this embodiment, the wireless station identifying information identifies (specifies) one wireless station from the first wireless station group including the wireless stations 20E-1, 20E-2, . . . .

Figure 42:
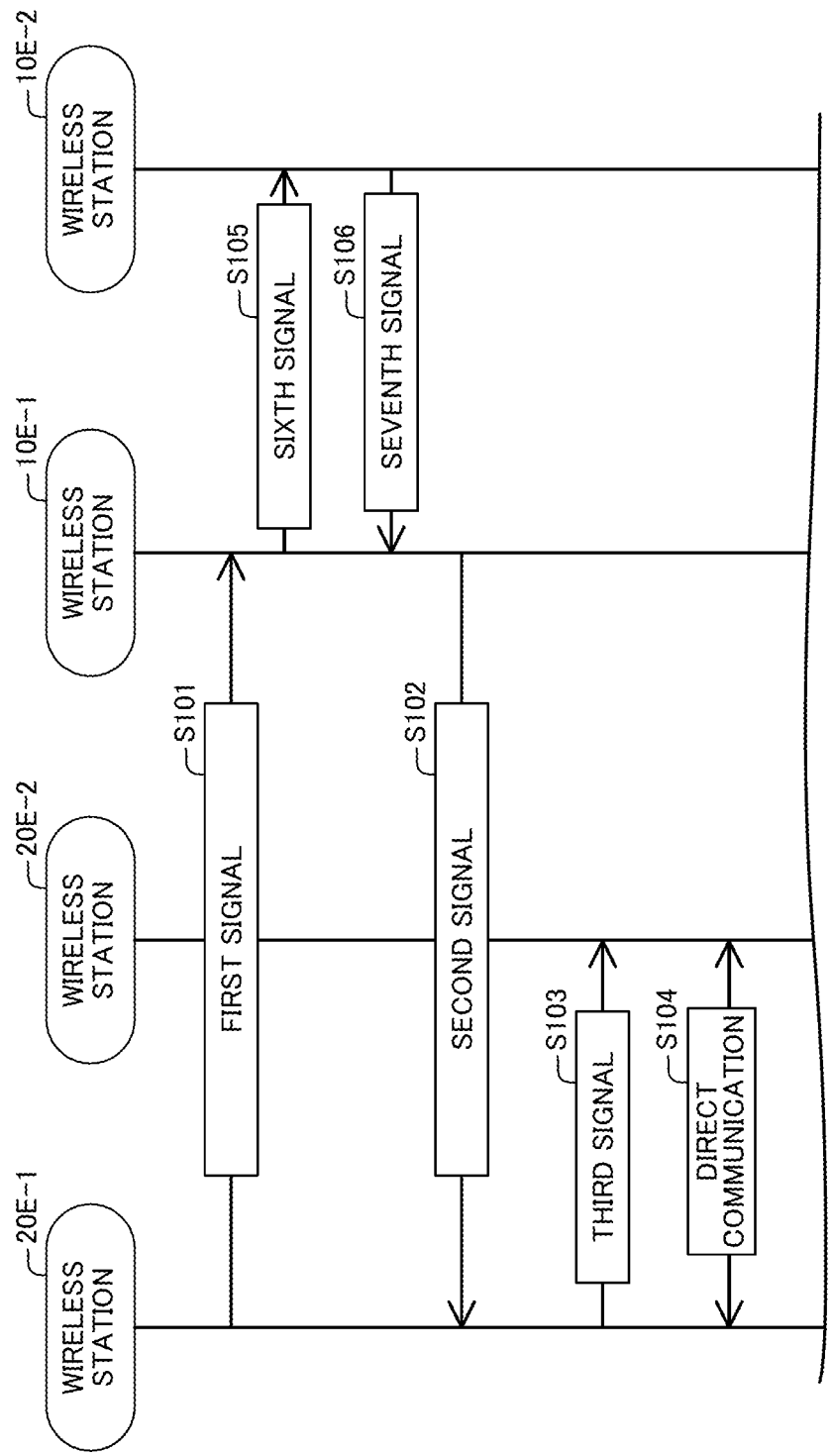
FIG. 42 is a sequence diagram illustrating an operation of a wireless communication system of an example of the sixth embodiment.

Consequently, the wireless station 10E-2 receives the sixth signal, and then transmits a seventh signal including fundamental information associated with the wireless station 20E-2 identified by the wireless station identifying information included in the sixth signal to the wireless station 10E-1, which is the sender of the sixth signal (step S106 of FIG. 42). The seventh signal indicates that the wireless station 10E-2 permits the direct communication. The seventh signal may be referred to as fourth communication response information, information related to the direct communication, or D2D reception information.

Consequently, the wireless station 10E-1 receives the seventh signal from the wireless station 10E-2 and thereby obtains the fundamental information included in the seventh signal. Then, the wireless station 10E-1 obtains the transmission timing to the wireless station 20E-2 on the basis of the obtained fundamental information and the wireless station identifying information included in the first signal received from the wireless station 20E-1.

After that, the wireless station 10E-1 transmits a second signal including the transmission timing information representing the obtained transmission timing to the wireless station 20E-1, which is the sender of the first signal (step S102 of FIG. 42).

In succession, as illustrated in FIG. 42, the wireless communication system 1E carries out the same process as the step S103 and the subsequent steps of FIG. 13.

As described above, in the wireless communication system 1E of the sixth embodiment, the wireless station 20E-1 obtains a transmission timing at which the wireless station 10E-2 transmits a fourth signal to the wireless station 20E-2. Furthermore, the wireless station 20E-1 transmits the third signal to the wireless station 20E-2 at the obtained transmission timing.

Consequently, the fifth signal is transmitted at the transmission timing at which the fourth signal is transmitted. This can reduce the electric power that the wireless station 20E-2 consumes as compared with cases where the fifth signal is transmitted at a timing different from the transmission timing for the fourth signal.

Alternatively, in the wireless communication system 1E of the sixth embodiment, the wireless station 10E-2 may obtain the transmission timing to the wireless station 20E-2 and may put transmitting timing information representing the obtained transmission timing into the seventh signal, which is then transmitted to the wireless station 10E-1.

Further alternatively, in the wireless communication system 1E of the sixth embodiment, the wireless station 10E-1 may transmit the second signal including the fundamental information without obtaining the transmission timing and the wireless station 20E-1 may obtain the transmission timing on the basis of the fundamental information.

Still further alternatively, the wireless communication system 1E of the sixth embodiment may be configured such that the wireless station 10E-2 in place of the wireless station 10E-1 transmits the third signal to the wireless station 20E-2.

Seventh Embodiment

Next, description will now be made in relation to a wireless communication system according to a seventh embodiment of the present invention.

The seventh embodiment may be regarded as a materialized example of the first or sixth embodiment. The feature of the communication scheme of the first or sixth embodiment can be used in combination with the method to be disclosed in the seventh embodiment. The feature of the device disclosed in the first or sixth embodiment is allowed to be incorporated in the device to be disclosed in the seventh embodiment.

The wireless communication system of the seventh embodiment is different from the wireless communication system of the third embodiment in the point that, in cases where the second wireless station is connected to a fourth wireless station, which is different from the third wireless station connected to the first wireless station, the first wireless station obtains the transmission timing to the second wireless station. The wireless communication system of the seventh embodiment is configured the same as the wireless communication system of the third embodiment except for the above difference. Hereinafter, the description will focus on the difference. Like reference numbers in the seventh embodiment designate the same or the substantially same parts and elements of the third embodiment.

Figure 43:
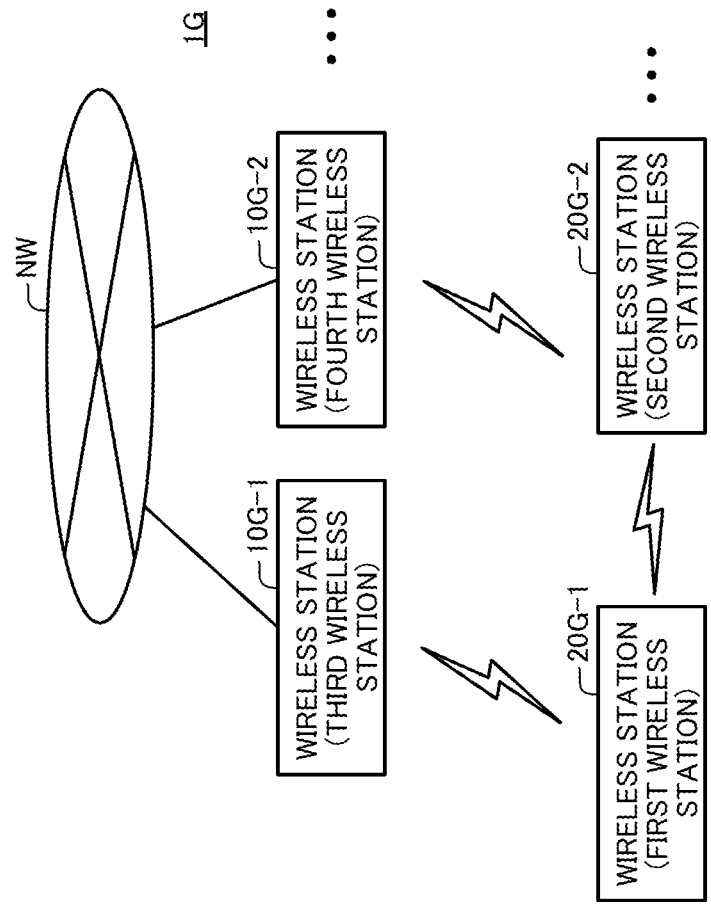
FIG. 43 is a diagram illustrating the configuration of a wireless communication system according to an example of a seventh embodiment.

As illustrated in FIG. 43, a wireless communication system 1G of the seventh embodiment includes wireless stations 10G in place of the wireless stations 10A of the third embodiment, and also includes wireless stations 20G in place of the wireless stations 20A of the third embodiment. In this embodiment, a wireless station 20G-1 is an example of the first wireless station; and a wireless station 20G-2 is an example of the second wireless station. Likewise, a wireless station 10G-1 is an example of the third wireless station; and the wireless station 10G-2 is an example of a fourth wireless station.

Hereinafter, the function of the wireless communication system 1G will now be described with reference to FIGS. 44-48.

Figure 44:
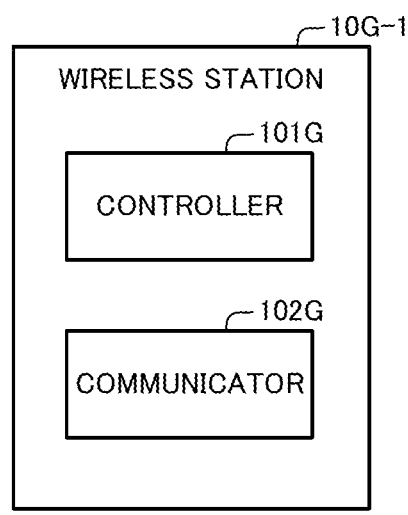
FIG. 44 is a diagram illustrating the function of a third wireless station of an example of the seventh embodiment.

As illustrated in FIG. 44, a wireless station 10G-1 has a function of a controller 101G and a communicator 102G respectively in place of the controller 101A and the communicator 102A of the wireless station 10A of the third embodiment. The controller 101G has the same function as the controller 101A except for the point that the controller 101G obtains the transmission timing on the basis of fundamental information obtained from the wireless station 10G-2. The communicator 102G has the same function as the communicator 102A except for the point that the communicator 102G receives the fundamental information from the wireless station 10G-2. The differences will be detailed below.

Figure 45:
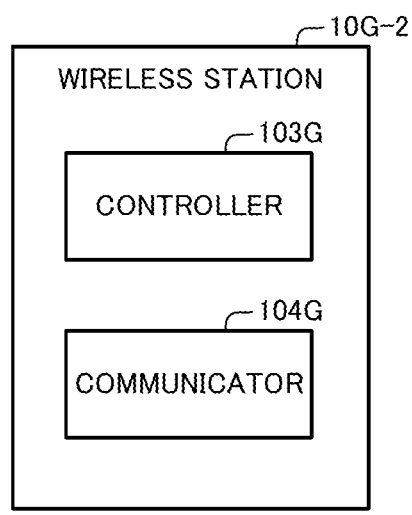
FIG. 45 is a diagram illustrating the function of a fourth wireless station of an example of the seventh embodiment.

As illustrated in FIG. 45, the wireless station 10G-2 has the function of a controller 103G and a communicator 104G respectively in place of the controller 101A and the communicator 102A of the wireless station 10A of the third embodiment. The controller 103G has the same function as the controller 101A except for the point that the communicator 102G obtains, when receiving fourth communication request information, the fundamental information. The communicator 102G (sic, correctly 104G) has the same function as the communicator 102 except for the point that the communicator 104G transmits the fundamental information to the wireless station 10G-1. The differences will be detailed below.

Figure 46:
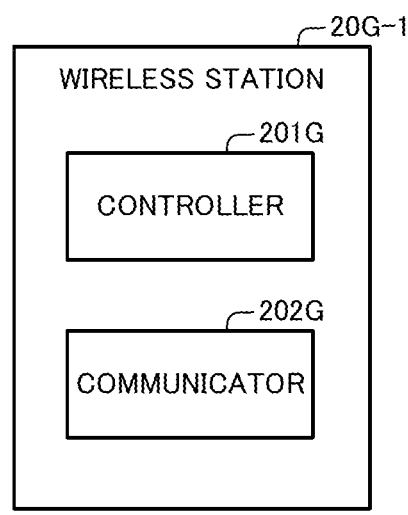
FIG. 46 is a diagram illustrating the function of a first wireless station of an example of the seventh embodiment.

As illustrated in FIG. 46, the wireless station 20G-1 has the function of a controller 201G and a communicator 202G respectively in place of the controller 201A and the communicator 202A of the wireless station 20G-1 (sic, correctly 20A-1) of the third embodiment. The controller 201G has the same function as the controller 201A. The communicator 202G has the same function as the communicator 202A.

Figure 47:
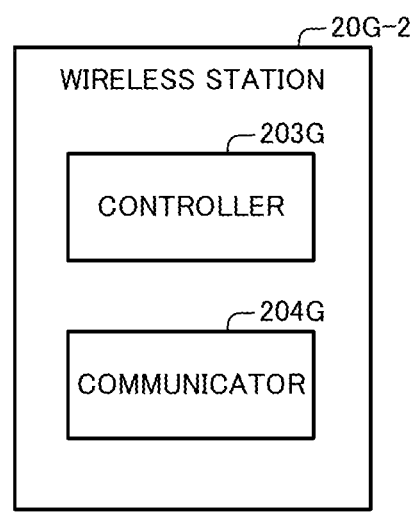
FIG. 47 is a diagram illustrating the function of a second wireless station of an example of the seventh embodiment.

As illustrated in FIG. 47, the wireless station 20G-2 has the function of a controller 203G and a communicator 204G respectively in place of the controller 203A and the communicator 204A of the wireless station 20G-2 (sic, correctly 20A-2) of the third embodiment. The controller 203G has the same function as the controller 203A. The communicator 204G has the same function as the communicator 204A.

Figure 48:
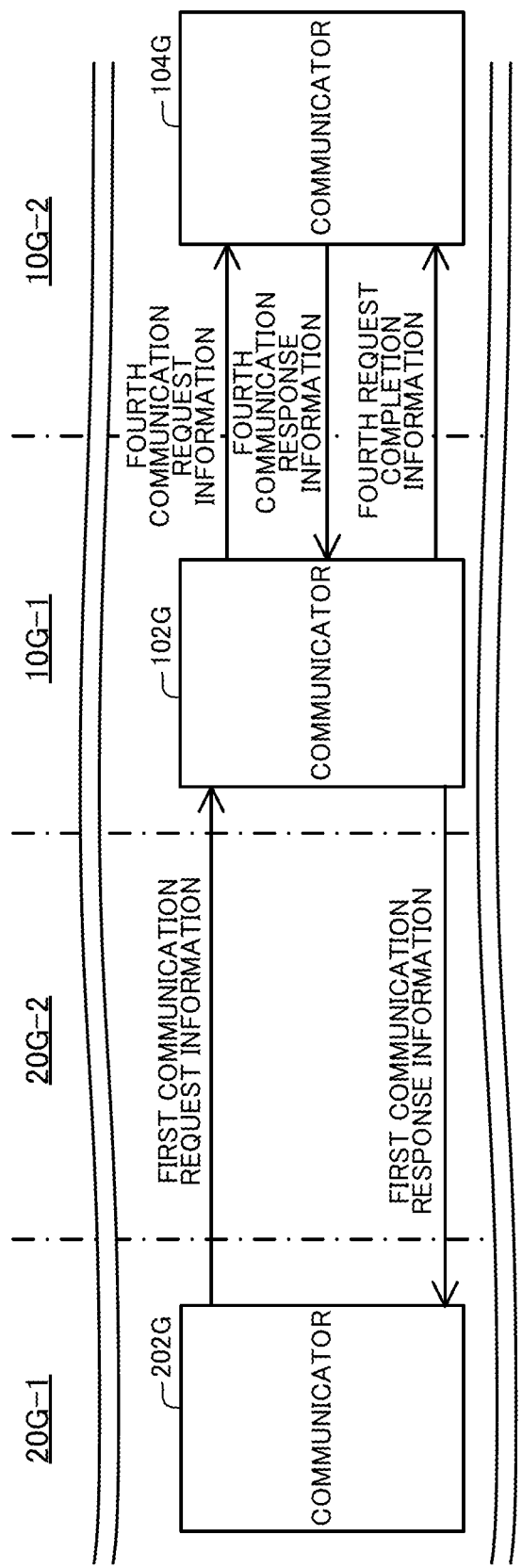
FIG. 48 is a diagram schematically illustrating a function of a wireless communication system of an example of the seventh embodiment.

Hereinafter, the description will now be made mainly in relation to the above differences in the respective functions with reference to FIG. 48.

Upon receipt of the first communication request information from the wireless station 20G-1, the communicator 102G transmits fourth communication request information to the wireless station 10G-2 to which the wireless station 20G-2 identified by the wireless station identifying information included in the first communication request information. The fourth communication request information of this embodiment includes wireless station identifying information included in the first communication request information. In this embodiment, the fourth communication request information requests transmission of the fundamental information and is a message called D2D Setup Request.

Upon receipt of the fourth communication request information from a wireless station 10G-1, except for the local wireless station 10G-2, the controller 103G obtains the fundamental information stored in association with the wireless station 20G-2, which is identified by the wireless station identifying information included in the fourth communication request information. The communicator 104G transmits fourth communication response information including the obtained fundamental information to the wireless station 10G-1, which is the sender of the fourth communication request information. In this embodiment, the fourth communication response information is a message called RRC D2D Setup.

Upon receipt of the fourth communication response information from a wireless station 10G-2, . . . except for the local wireless station 10G-1, the communicator 102G transmits fourth request completion information to the wireless station 10G-2, which is the sender of the fourth communication response information. The fourth request completion information is a message called RRC D2D Setup Complete.

Besides, upon receipt of the fourth communication response information from a wireless station 10G-2, . . . except for the local wireless station 10G-1, the controller 101G obtains the fundamental information included in the fourth communication response information. The controller 101G obtains the transmission timing to the wireless station 20G-2 on the basis of the obtained fundamental information and the wireless station identifying information included in the first communication request information received from the wireless station 20G-1.

(Operation)

Next, the operation of the above wireless communication system 1G will now be detailed with reference to FIG. 49.

This embodiment assumes that the wireless station 20G-1 is communicably connected to the wireless station 10G-1 and the wireless station 20G-2 is communicably connected to the wireless station 10G-2.

Figure 49:
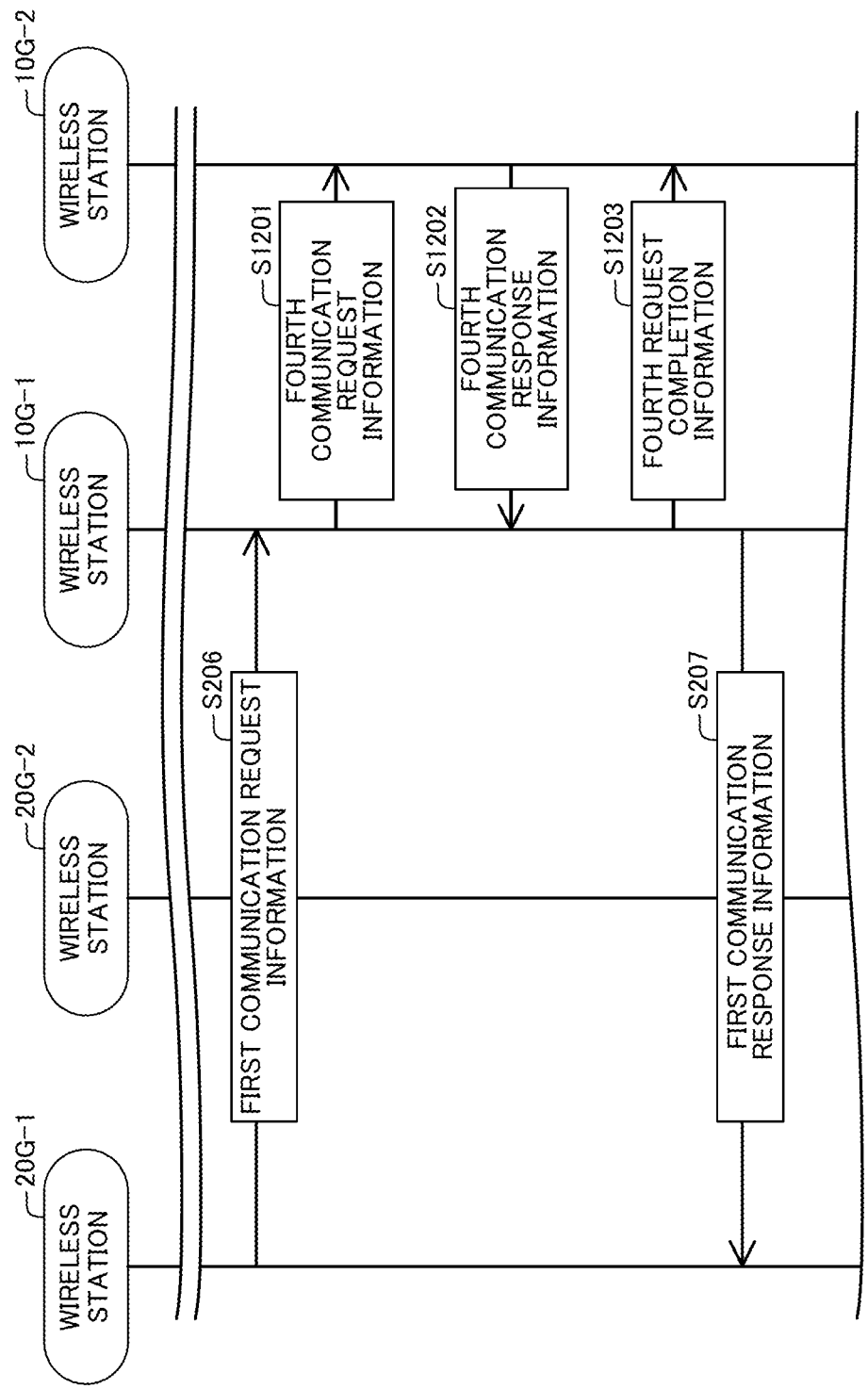
FIG. 49 is a sequence diagram illustrating an operation of a wireless communication system of an example of the seventh embodiment.

Upon receipt of the first communication request information (step S206 of FIG. 49), the wireless station 10G-1 transmits the fourth communication request information to the wireless station 10G-2, to which the wireless station 20G-2 identified by the wireless station identifying information included in the first communication request information is connected (step S1202 of FIG. 49).

Consequently, the wireless station 10G-2 receives the fourth communication request information. Then the communicator 102G transmits the fourth communication response information including the fundamental information associated with the wireless station 20G-2 identified by the wireless station identifying information included in the fourth communication request information to the wireless station 10G-1, which is the sender of the fourth communication request information (step S1202 of FIG. 49).

Consequently, the wireless station 10G-1 receives the fourth communication response information from the wireless station 10G-2. Then, the wireless station 10G-1 transmits the fourth request completion information to the wireless station 10G-2, which is the sender of the fourth communication response information (step S1203 of FIG. 49).

Then the wireless station 10G-1 obtains the fundamental information included in the fourth communication response information. In succession, the wireless station 10G-1 obtains the transmission timing to the wireless station 20G-2 on the basis of the obtained fundamental information and the wireless station identifying information included in the first communication request information received from the wireless station 20G-1.

Then the wireless station 10G-1 transmits the first communication response information including the transmission timing information representing the obtained transmission timing to the wireless station 20G-1, which is the sender of the first communication request information (step S207 of FIG. 49).

After that, the wireless communication system 1G carries out the same process as the step S208 and the subsequence steps of FIG. 21.

As described above, in the wireless communication system 1G of the seventh embodiment, the wireless station 20G-1 obtains the transmission timing at which the wireless station 10G-2 transmits the first notification information to the wireless station 20G-2; and the wireless station 20G-1 transmits the second notification information to the wireless station 20G-2 at the obtained transmission timing.

Accordingly, the second notification information is transmitted at the transmission timing at which the first notification information is transmitted. This allows the wireless station 20G-2 to consume less power than cases where the second notification information is transmitted at a timing different from the transmission timing for the first notification information.

In the wireless communication system 1G of the seventh embodiment, the wireless station 10G-2 may alternatively obtain the transmission timing to the wireless station 20G-2, put the transmission timing information representing the obtained transmission timing into the fourth communication response information, and transmit the obtained transmission timing being included in the fourth communication response information to the wireless station 10G-1. In this case, the fourth communication request information is information that requests transmission of the transmission timing information.

Alternatively, in the wireless communication system 1G of the seventh embodiment, the wireless station 10G-1 may transmit the first communication response information including the fundamental information to the wireless station 20G-1, not obtaining the transmission timing, and responsively, the wireless station 20G-1 may obtain the transmission timing on the basis of the fundamental information.

Further alternatively, in the wireless communication system 1G of the seventh embodiment, the wireless station 10G-2 may be configured to transmit, if receiving the fourth communication request information, predetermined instruction information to the wireless station 20G-2. For example, the wireless station 10G-2 transmits the instruction information to the wireless station 20G-2 at the transmission timing to the wireless station 20G-2. In this case, the wireless station 20G-2 is configured to switch, upon receipt of the instruction information, the state of the subject wireless station 20G-2 from the direct communication standby state to the direct communication connection state.

Further alternatively, the wireless station 20G-2 may be configured to transmit, upon receipt of the instruction information, instruction response information to the wireless station 10G-2. In this case, the wireless station 10G-2 is configured to transmit, if receiving the instruction response information, the fourth communication response information to the wireless station 10G-1 but not transmit, if not receiving the instruction response information, the fourth communication response information.

Still further alternatively, the wireless communication system 1G of the seventh embodiment may be configured to transmit the second notification information to the wireless station 20G-2 from the wireless station 10G-2 in place of the wireless station 20G-1.

Eighth Embodiment

Next, an eighth embodiment of the present invention will now be described.

The eighth embodiment may be regarded as a materialized example of the first embodiment. The feature of the communication scheme of the first embodiment can be used in combination with the method to be disclosed in the eighth embodiment. The feature of the device disclosed in the first embodiment is allowed to be incorporated in the device to be disclosed in the eighth embodiment.

A wireless communication system of the eighth embodiment has both the function of the wireless communication system of the second embodiment and the function of the wireless communication system of the sixth embodiment. Like reference numbers in the eighth embodiment designate the same or the substantially same parts and elements of the second and sixth embodiments.

Figure 50:
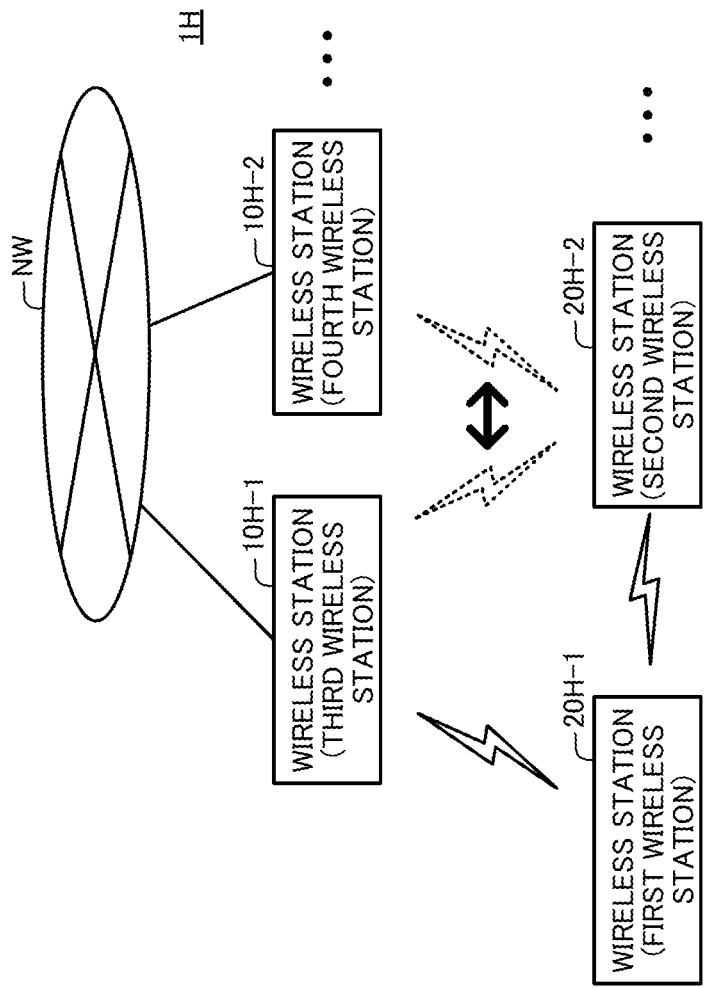
FIG. 50 is a diagram illustrating the configuration of a wireless communication system according to an example of an eighth embodiment.

As illustrated in FIG. 50, a wireless communication system 1H of the eighth embodiment includes wireless stations 10H and wireless stations 20H respectively in place of the wireless station 10 and the wireless stations 20 of the second embodiment. In this embodiment, a wireless station 20H-1 is an example of the first wireless station, and a wireless station 20H-2 is an example of the second embodiment. Likewise, a wireless station 10H-1 is an example of the third wireless station, and a wireless station 10H-2 is an example of the fourth wireless station.

Upon receipt of the first communication request information from the wireless station 20H-1, the wireless station 10H-1 determines whether the wireless station 20H-2, which is identified by the wireless station identifying information included in the first communication request information from the wireless station 20H-1, is connected to the subject wireless station 10H-1.

If determining that the wireless station 20H-1 is connected to the subject wireless station 10H-1, the wireless station 10H-1 operates in the same manner as the wireless communication system 1 of the second embodiment. Specifically, in this event, the wireless communication system 1H executes the same process as that denoted in FIG. 13.

If not determining that the wireless station 10H-1 is not connected to the subject wireless station 10H-1(, which means that the wireless station 20H-2 is connected to another wireless station 10H-2, . . . except for the subject wireless station 10H-1), the wireless station 10H-1 operates in the same manner as the wireless communication system 1E of the sixth embodiment. Specifically, in this event, the wireless communication system 1H executes the same process as that denoted in FIG. 42.

As described above, the wireless communication system 1H of the eighth embodiment allows the wireless station 20H-1 to obtain the transmission timing irrespective of a wireless station 10H to which the wireless station 20H-2 is connected. Namely, both in cases where the wireless station 20H-2 is connected to the wireless station 10H-1, to which the wireless station 20H-1 is also connected, and in cases where the wireless station 20H-2 is connected to the wireless station 10H-2, which is different from the wireless station 10H that the wireless station 20H-1 is connected to, the wireless station 20H-1 can obtain the transmission timing.

Ninth Embodiment

Next, a wireless communication system of a ninth embodiment will now be described.

The ninth embodiment may be regarded as a materialized example of the first, second, third, sixth or seventh embodiment. The feature of the communication scheme of the first, second, third, sixth or seventh embodiment can be used in combination with the method to be disclosed in the ninth embodiment. The feature of the device disclosed in the first, second, third, sixth or seventh embodiment are allowed to be incorporated in the device to be disclosed in the ninth embodiment.

A wireless communication system of the ninth embodiment has both the function of the wireless communication system of the third embodiment and the function of the wireless communication system of the seventh embodiment. Like reference numbers in the ninth embodiment designate the same or the substantially same parts and elements of the third and seventh embodiments.

Figure 51:
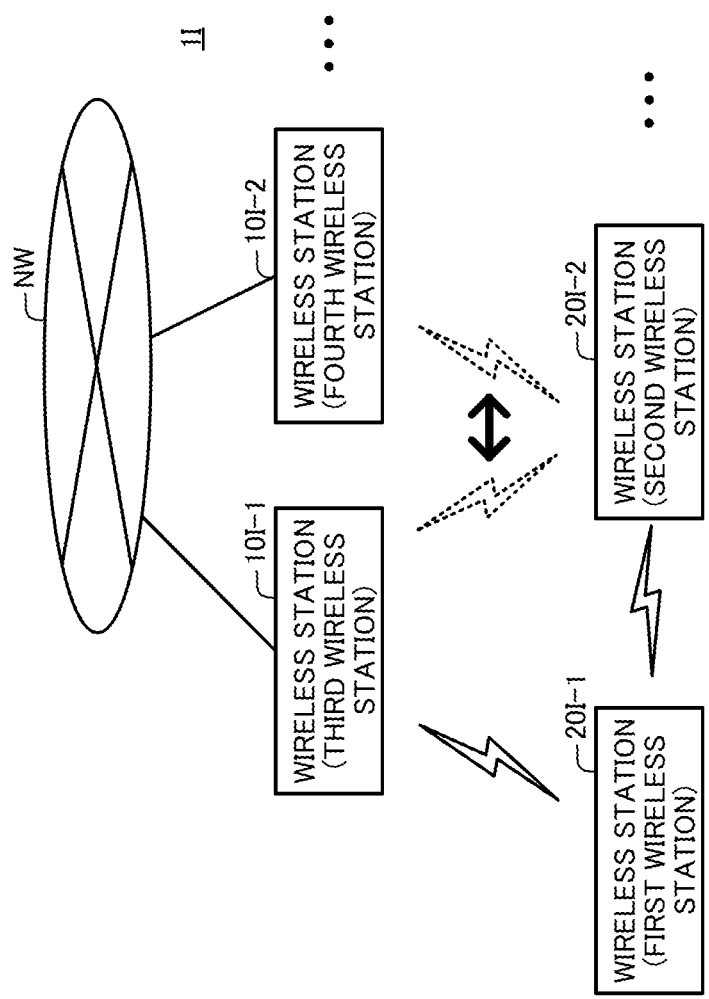
FIG. 51 is a diagram illustrating the configuration of a wireless communication system according to an example of a ninth embodiment.

As illustrated in FIG. 51, a wireless communication system 1I of the ninth embodiment includes wireless stations 10I and wireless stations 20I respectively in place of the wireless stations 10A and the wireless stations 20A of the third embodiment. In this embodiment, a wireless station 20I-1 is an example of the first wireless station, and a wireless station 20I-2 is an example of the second embodiment. Likewise, a wireless station 10I-1 is an example of the third wireless station, and a wireless station 10I-2 is an example of the fourth wireless station.

Upon receipt of the first communication request information from the wireless station 20I-1, the wireless station 10I-1 determines whether the wireless station 20I-2, which is identified by the wireless station identifying information included in the first communication request information, is connected to the subject wireless station 10I-1.

If determining that the wireless station 20I-2 is connected to the subject wireless station 10I-1, the wireless station 10I-1 operates in the same manner as the wireless communication system 1A of the third embodiment. Specifically, in this event the wireless communication system 1I executes the same process as that denoted in FIGS. 21 and 22.

If not determining that the wireless station 20I-2 is not connected to the subject wireless station 10I-1 (, which means that the wireless station 20I-2 is connected to another wireless station 10I-2, . . . except for the subject wireless station 10I-1), the wireless station 10I-1 operates in the same manner as the wireless communication system 1G of the seventh embodiment. Specifically, in this event, the wireless communication system 1I executes the same process as that denoted in FIG. 42.

As described above, the wireless communication system 1I of the ninth embodiment allows the wireless station 20I-1 to obtain the transmission timing irrespective of a wireless station 10I to which the wireless station 20I-2 is connected. Namely, both in cases where the wireless station 20I-2 is connected to the wireless station 10I-1, to which the wireless station 20I-1 is also connected, and in cases where the wireless station 20I-2 is connected to the wireless station 10I-2, which is different from the wireless station 10I-1 that the wireless station 20I-1 is connected to, the wireless station 20I-1 can obtain the transmission timing.

The wireless communication system may have both the function of the wireless communication system 1C of the fourth embodiment and the function of the wireless communication system 1E or 1G of the sixth or seventh embodiment. Alternatively, the wireless communication system may have both the function of the wireless communication system 1D of the fifth embodiment and the function of the wireless communication system 1E or 1G of the sixth or seventh embodiment.

The present invention is described by referring to the embodiments. However, the present invention should by no means be limited to the foregoing embodiments. Various changes and modifications that can be understood by those skilled in the art can be suggested within the scope of the present invention.

In the above embodiments, the first notification information indicates that the third wireless station is to communicate with the second wireless station. Alternatively, the first notification information may indicate that the third wireless station is to transmit common information to multiple wireless stations (e.g., the wireless stations constituting the first wireless station group) using the common wireless resource.

For example, the first notification information may be information that a wireless station interested in peer-to-multicast communication can receive. Such information is exemplified by System Information Block 13 (SIB-13), which controls Multimedia Broadcast and Multicast Service (MBMS).

In this case, the wireless communication system is configured to transmit the first notification information at a predetermined transmission timing. Accordingly, such a wireless communication system ensures the transmission timing of the second notification information and also reduces the electric power that the second wireless station consumes.

The above configuration has a possibility that the second notification information transmitted from the first wireless station is received by multiple wireless stations including the second wireless station. In this event, the first wireless station simultaneously carries out the direct communication with each of multiple wireless stations. For example, the first wireless station simultaneously transmits the same information to each of the multiple wireless stations. This can be said that the wireless communication system executes peer-to-multicast communication.

In the above embodiments, the respective functions of each wireless station are achieved by hardware such as a circuit. Alternatively, each wireless station may include a computer including a processor and a memory device that stores a program (software) and may be configured to achieve the functions by the processor executing the program. In this case, the program may be stored in a computer-readable storing medium. Examples of the recording medium is a portable medium, such as a flexible disk, an optical disk, a magneto-optical disk, and a semiconductor memory.

The above embodiments and modifications can be arbitrarily combined, as additional modifications, within the scope of the present invention.

According to the disclosed wireless station system, it is possible to reduce the electric power that each wireless station consumes and carry out effective paging.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication system comprising a plurality of wireless stations including a first wireless station, a second wireless station, and a third wireless station, the wireless communication system comprising:
   a first controller that obtains a transmission timing at which the third wireless station transmits first notification information to the second wireless station, the first notification information indicating that the third wireless station is to communicate with the second wireless station; and
a first communicator that transmits second notification information to the second wireless station at the obtained transmission timing, the second notification information indicating that the first wireless station is to directly communicate with the second wireless station, wherein:
   the first communicator transmits first communication request information to the third wireless station, the first communication request information requesting direct communication between the first wireless station and the second wireless station;
   the third wireless station comprises a second communicator that transmits, when the first communication request information is received from the first wireless station and a first execution condition is satisfied, first communication response information indicating permission for the direct communication to the first wireless station and transmits, when the first communication request information is received from the first wireless station and the first execution condition is not satisfied, first communication response information indicating rejection for the direct communication to the first wireless station; and
   the first communicator transmits, when the first communication response information indicating the permission for the direct communication is received from the third wireless station, the second notification information to the second wireless station, and does not transmit, when the first communication response information indicating the rejection for the direct communication is received from the third wireless station, the second notification information.

2. The wireless communication system according to claim 1, wherein
the transmission timing is determined based on fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station;
the third wireless station comprises a second controller that obtains, based on the first wireless station identifying information contained in the first communication request information received from the first wireless station, the fundamental information set in the at least one of the first and third wireless station connected to the second wireless station, and obtains the transmission timing based on the obtained fundamental information and the first or second wireless station identifying information;
the second communicator transmits the first communication response information including transmission timing information representing the obtained transmission timing to the first wireless station; and
the first controller obtains the transmission timing represented by the transmission timing information included in the first communication response information received from the third wireless station.

3. The wireless communication system according to claim 1, wherein
the transmission timing is determined based on fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station;
the third wireless station comprises a second controller that obtains, based on the first wireless station identifying information included in the first communication request information received from the first wireless station, the fundamental information set in the at least one of the first and third wireless station connected to the second wireless station;
the second communicator transmits the first communication response information including at least part of the obtained fundamental information to the first wireless station and transmits a remaining part of the obtained fundamental information to the first wireless station; and
the first controller obtains, based on the fundamental information received from the third wireless station and the first or second wireless station identifying information, the transmission timing.

4. A method for wireless communication in a wireless communication system including a plurality of wireless stations including a first wireless station, a second wireless station, and a third wireless station, the method comprising:
obtaining a transmission timing at which the third wireless station transmits first notification information to the second wireless station, the first notification information indicating that the third wireless station is to communicate with the second wireless station; and
transmitting second notification information to the second wireless station at the obtained transmission timing, the second notification information indicating that the first wireless station is to directly communicate with the second wireless station, wherein:
at the first wireless station,
transmitting first communication request information to the third wireless station, the first communication request information requesting direct communication between the first wireless station and the second wireless station;
at the third wireless station,
transmitting, when the third wireless station receives the first communication request information from the first wireless station and a first execution condition is satisfied, first communication response information indicating permission for the direct communication to the first wireless station and transmitting, when the third wireless station receives the first communication request information from the first wireless station and a first execution condition is not satisfied, first communication response information indicating rejection for the direct communication to the first wireless station; and
in the transmitting of the second notification information,
transmitting, when the first wireless station receives the first communication response information indicating the permission for the direct communication from the third wireless station, the second notification information to the second wireless station, and not transmitting, when the first wireless station receives the first communication response information indicating the rejection for the direct communication from the third wireless station, the second notification information.

5. The method according to claim 4, wherein:
the transmission timing is determined based on fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station; and
the method further comprises
at the third wireless station, in the transmitting of the first communication response information, obtaining, based on the first wireless station identifying information included in the first communication request information received from the first wireless station, the fundamental information set in the at least one of the first and third wireless station connected to the second wireless station, obtaining the transmission timing based on the obtained fundamental information and the first or second wireless station identifying information, and transmitting the first communication response information including transmission timing information representing the obtained transmission timing to the first wireless station, and
at the first wireless station, in the obtaining of the transmission timing, obtaining the transmission timing represented by the transmission timing information included in the first communication response information received from the third wireless station.

6. The method according to claim 4, wherein:
the transmission timing is determined based on fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station; and
the method further comprises
at the third wireless station, in the transmitting of the first communication response information, obtaining, based on the first wireless station identifying information contained in the first communication request information received from the first wireless station, the fundamental information set in the at least one of the first and third wireless station connected to the second wireless station, and transmitting the first communication response information including at least part of the obtained fundamental information to the first wireless station,
at the third wireless station, transmitting a remaining part of the obtained fundamental information to the first wireless station; and
at the first wireless station, in the obtaining of the transmission timing, obtaining, based on the fundamental information received from the third wireless station and the first or second wireless station identifying information, the transmission timing.

7. A third wireless station that communicates with a plurality of wireless stations including a first wireless station and a second wireless station, comprising:
a controller that obtains a transmission timing at which first notification information indicating that the third wireless station is to communicate with the second wireless station is transmitted, or fundamental information based on which the transmission timing is determined; and
a communicator that transmits the obtained transmission timing or the obtained fundamental information to the first wireless station, or that transmits second notification information to the second wireless station at the obtained transmission timing, the second notification information indicating that the first wireless station is to directly communicate with the second wireless station, wherein
in a case where first communication request information is received from the first wireless station, the first communication request information requesting direct communication between the first wireless station and the second wireless station,
the communicator causes, when a first execution condition is satisfied, the first wireless station to transmit second notification information indicating that the first wireless station is to directly communicate with the second wireless station at the transmission timing by transmitting first communication response information indicating permission for the direct communication to the first wireless station, and
the communicator transmits, when the first execution condition is not satisfied, first communication response information indicating rejection for the direct communication to the first wireless station.

8. The third wireless station according to claim 7, wherein
the transmission timing is determined based on the fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station;
the controller obtains, based on the first wireless station identifying information included in the first communication request information received from the first wireless station, the fundamental information set in the at least one of the first and third wireless station connected to the second wireless station, and obtains the transmission timing based on the obtained fundamental information and the first or second wireless station identifying information; and
the communicator transmits the first communication response information including transmission timing information representing the obtained transmission timing to the first wireless station.

9. The third wireless station according to claim 7, wherein:
the transmission timing is determined based on the fundamental information set in at least one of the first and third wireless station connected to the second wireless station and first or second wireless station identifying information to identify a wireless station from the first wireless station and the second wireless station;
the first communication request information includes the second wireless station identifying information to identify the second wireless station;
the controller obtains, based on the first wireless station identifying information contained in the first communication request information received from the first wireless station, the fundamental information set in the at least one of the first and third wireless station connected to the second wireless station; and
the communicator transmits the first communication response information including at least part of the obtained fundamental information to the first wireless station and transmits a remaining part of the obtained fundamental information to the first wireless station.

* * * * *